United States Patent
Murray et al.

(10) Patent No.: US 11,603,597 B2
(45) Date of Patent: Mar. 14, 2023

(54) PRODUCTION OF CHEMICAL PRODUCTS USING ELECTROCHEMICAL FLOW SYSTEMS AND MEDIATORS AND ASSOCIATED METHODS

(71) Applicant: Massachusetts Institute of Technology, Cambridge, MA (US)

(72) Inventors: Alexander Murray, Canterbury (GB); Sahag Voskian, Cambridge, MA (US); Trevor Alan Hatton, Sudbury, MA (US); Yogesh Surendranath, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 599 days.

(21) Appl. No.: 16/450,847

(22) Filed: Jun. 24, 2019

(65) Prior Publication Data
US 2020/0056291 A1    Feb. 20, 2020

Related U.S. Application Data

(60) Provisional application No. 62/718,745, filed on Aug. 14, 2018.

(51) Int. Cl.
*C25B 1/00*    (2021.01)
*C25B 1/30*    (2006.01)
*C25B 9/19*    (2021.01)

(52) U.S. Cl.
CPC . *C25B 1/30* (2013.01); *C25B 9/19* (2021.01)

(58) Field of Classification Search
CPC .................................. C25B 1/30; C25B 9/19
See application file for complete search history.

(56) References Cited

U.S. PATENT DOCUMENTS

| | | | |
|---|---|---|---|
| 2,234,908 A | 3/1941 | Gustav et al. | |
| 4,067,787 A | 1/1978 | Kastening et al. | |
| 4,124,462 A | 11/1978 | Reinhardt et al. | |
| 6,274,114 B1 | 8/2001 | Ledon et al. | |
| 2007/0012578 A1* | 1/2007 | Edvinsson Albers | C01B 15/022 |
| | | | 205/466 |

(Continued)

FOREIGN PATENT DOCUMENTS

| | | |
|---|---|---|
| CN | 1056194 C | 9/2000 |
| GB | 2512818 A | 10/2014 |

OTHER PUBLICATIONS

Song et al., Polyanthraquinone as a Reliable Organic Electrode for Stable and Fast Lithium Storage. Angew Chem Int Ed Engl. Nov. 16, 2015;54(47):13947-51. doi: 10.1002/anie.201506673. Epub Sep. 28, 2015. PMID: 26411505.

(Continued)

*Primary Examiner* — Zulmariam Mendez
(74) *Attorney, Agent, or Firm* — Wolf, Greenfield & Sacks, P.C.

(57) ABSTRACT

Systems and methods for electrochemically producing chemical products are provided. In certain cases, the systems and methods described herein are capable of producing chemical products such as hydrogen peroxide in solutions with relatively low concentrations of electrolyte or other dissolved species at high efficiencies and/or low energetic cost. In some cases, redox mediators are used to spatially decouple direct electrochemical processes from the production of the chemical product.

20 Claims, 24 Drawing Sheets

(56) References Cited

U.S. PATENT DOCUMENTS

| | | |
|---|---|---|
| 2014/0004391 A1 | 1/2014 | Knuckey et al. |
| 2016/0068973 A1 | 3/2016 | Stephens et al. |
| 2017/0113182 A1 | 4/2017 | Voskian et al. |
| 2020/0056298 A1 | 2/2020 | Voskian et al. |

OTHER PUBLICATIONS

Kirkaldy et al., A practical, organic-mediated, hybrid electrolyser that decouples hydrogen production at high current densities. Chem Sci. Jan. 10, 2018;9(6):1621-1626. doi: 10.1039/c7sc05388f. eCollection Feb. 14, 2018.

International Search Report and Written Opinion dated Sep. 30, 2019 for PCT/US2019/038766.

International Search Report and Written Opinion dated Dec. 10, 2019 for PCT/US2019/038761.

Invitation to Pay Additional Fees dated Oct. 18, 2019 for PCT/US2019/038761.

[No Author Listed] TEMPO, 2,2,6,6-Tetramethylpiperidinyloxy. Organic Chemistry Portal. 2020. Retrieved from https://www.organic-chemistry.org/chemicals/oxidations/tempo-2,2,6,6-tetramethylpiperidinyloxy.shtm on Mar. 16, 2020.

Anson et al., Cooperative Electrocatalytic 0(2) Reduction Involving Co(salophen) with p-Hydroquinone as an Electron-Proton Transfer Mediator. J Am Chem Soc. Dec. 27, 2017;139(51):18472-18475. doi: 10.1021/jacs.7b11362. Epub Dec. 8, 2017.

Chen et al., Development of a reactor with carbon catalysts for modular-scale, low-cost electrochemical generation of H2O2. React. Chem. Eng. 2017;2:239-245.

Edwards et al., Advances in the direct synthesis of hydrogen peroxide from hydrogen and oxygen. Catal. Today. 2015;248:3-9.

Francke et al., Redox catalysis in organic electrosynthesis: basic principles and recent developments. Chem Soc Rev. Apr. 21, 2014;43(8):2492-521. doi: 10.1039/c3cs60464k. Epub Feb. 5, 2014. Erratum in: Chem Soc Rev. Sep. 7, 2014;43(17):6471.

Hage et al., Applications of transition-metal catalysts to textile and wood-pulp bleaching. Angew Chem Int Ed Engl. Dec. 23, 2005;45(2):206-22.

Huskinson et al., A metal-free organic-inorganic aqueous flow battery. Nature. Jan. 9, 2014;505(7482):195-8. doi: 10.1038/nature12909.

Kwabi et al., Alkaline Quinone Flow Battery with Long Lifetime at pH 12. Joule. 2018;2:1894-1906.

Liu et al., High-yield electrosynthesis of hydrogen peroxide from oxygen reduction by hierarchically porous carbon. Angew Chem Int Ed Engl. Jun. 1, 2015;54(23):6837-41. doi: 10.1002/anie.201502396. Epub Apr. 17, 2015.

Miner et al., Electrochemical oxygen reduction catalysed by i3(hexaiminotriphenylene)2. Nat Commun. Mar. 8, 2016;7:10942. doi: 10.1038/ncomms10942.

Murray et al., Electrosynthesis of Hydrogen Peroxide by Phase-Transfer Catalysis. Joule. Dec. 18, 2019;3(12):P2942-P2954.

Rausch et al., A bio-inspired, small molecule electron-coupled-proton buffer for decoupling the half-reactions of electrolytic water splitting. J Am Chem Soc. Sep. 18, 2013;135(37):13656-9. doi:10.1021/ja4071893. Epub Sep. 6, 2013.

Russo et al., Chemical and Technical Aspects of Propene Oxide Production via Hydrogen Peroxide (HPPO Process). Ind. Eng. Chem. Res. 2013;52,:1168-1178.

Saveant, Molecular catalysis of electrochemical reactions. Mechanistic aspects. Chem Rev. Jul. 2008;108(7):2348-78. doi: 10.1021/cr068079z.

Scott, A model of a phase transfer catalyst liquid/liquid electrochemical membrane reactor. Electrochemical Engineering Energy. Eds: Storck. 1994. 197-206.

Siahrostami et al., Enabling direct H2O2 production through rational electrocatalyst design. Nat Mater. Dec. 2013;12(12):1137-43. doi:10.1038/nmat3795. Epub Nov. 17, 2013. Erratum in: Nat Mater. Feb. 2014;13(2):213. Nat Mater. Jan. 2014;13(1):97. Stephens, Ifan E [corrected to Stephens, Ifan E LS].

Symes et al., Decoupling hydrogen and oxygen evolution during electrolytic water splitting using an electron-coupled-proton buffer. Nat Chem.May 2013;5(5):403-9. doi: 10.1038/nchem.1621. Epub Apr. 14, 2013.

Yamamoto et al., Poly(anthraquinone)s Having a .pi.-Conjugation System along the Main Chain. Synthesis by Organometallic Polycondensation, Redox Behavior, and Optical Properties. Macromolecules. 1995;28(9):3371-3379.

Yang et al., Toward the Decentralized Electrochemical Production of H2O2: A Focus on the Catalysis. ACS Catal. 2018;8(5):4064-4081.

\* cited by examiner

PRODUCTION OF CHEMICAL PRODUCTS USING ELECTROCHEMICAL FLOW SYSTEMS AND MEDIATORS AND ASSOCIATED METHODS

RELATED APPLICATIONS

This application claims priority under 35 USC 119(e) to U.S. Provisional Application No. 62/718,745, filed Aug. 14, 2018, and entitled "PRODUCTION OF CHEMICAL PRODUCTS USING ELECTROCHEMICAL FLOW SYSTEMS AND MEDIATORS AND ASSOCIATED METHODS," which is incorporated herein by reference in its entirety for all purposes.

GOVERNMENT SUPPORT

This invention was made with Government support under DE-76RL01830 awarded by the U.S. Department of Energy. The Government has certain rights in the invention.

TECHNICAL FIELD

The generation of chemical products via electrochemical flow processes using mediators is generally described.

BACKGROUND

The electrochemical generation of chemical products is often accomplished using traditional heterogeneous catalysis involving surface-mediated reactivity using an active electrode material and performing inner-sphere electron transfer at the surface. From a separations perspective, traditionally, heterogeneous catalysis can be favorable. In electrochemical systems, heterogeneous catalysis is traditionally used for the synthesis of gaseous molecules such as hydrogen or carbon monoxide. However, for the electrochemical production of dissolved liquid products that are not readily purified by phase separation, a traditional heterogeneous catalysis approach (i.e., involving direct production of the product at or in close proximity to the electrode in the electrolyte solution) can be problematic, especially due to the mixing of product streams with co-dissolved supporting electrolyte. An electrosynthetic methodology for the production of chemical products, including liquid or dissolved products, with high-efficiency separation is therefore desirable.

An example of a desirable chemical product is hydrogen peroxide, which is a relatively unstable commodity chemical that is difficult to transfer. Hydrogen peroxide is a strong but relatively kinetically inert chemical oxidant that can be used for water treatment and disinfection, wood pulping, wound cleaning, and in the production of value-added chemicals. An efficient process for the electrochemical production of hydrogen peroxide in solutions with low concentrations of contaminants such as supporting electrolyte is also therefore desirable.

SUMMARY

Systems and methods for electrochemically producing chemical products are provided. In certain cases, the systems and methods described herein are capable of producing chemical products such as hydrogen peroxide in solutions with relatively low concentrations of electrolyte and/or other dissolved species at high efficiencies and/or low energetic cost. In some cases, redox mediators are used to spatially decouple direct electrochemical processes from the production of the chemical product. The subject matter of the present invention involves, in some cases, interrelated products, alternative solutions to a particular problem, and/or a plurality of different uses of one or more systems and/or articles.

In some embodiments, a system for producing a chemical product is provided. In some embodiments, the system comprises an electrochemical cell comprising a first electrode, a second electrode, a first inlet, and a first outlet. The system may also comprises a first module fluidically connected to the electrochemical cell. In some embodiments, the first module comprises a first inlet, a first outlet, a second inlet, and a second outlet, and is configured to contact solution from a first fluid stream with solution from a second fluid stream. In some instances, the solution from the first stream is essentially immiscible with the solution from the second fluid stream. In some cases, the first module is configured to contact solution from a first fluid stream with solution from a second fluid stream such that an active form of a redox mediator is transferred from the first fluid stream to the second fluid stream.

In some embodiments, a system for producing a chemical product is described. In some embodiments, the system comprises an electrochemical cell comprising a first electrode, a second electrode, a first inlet, and a first outlet. In some instances, the system comprises a first module, wherein the first module comprises a first inlet, a first outlet, a second inlet, and a second outlet. In some cases, the first outlet of the electrochemical cell is fluidically connected to the first inlet of the first module. In some embodiments, the first module comprises a mixer-settler and/or comprises a hollow tubule comprising a porous wall.

In some aspects, a method for producing a chemical product is described. In some embodiments, the method comprises applying, in an electrochemical cell, an electrochemical potential to a first electrode in contact with solution from a first fluid stream, the solution comprising a redox mediator, such that an active form of the redox mediator is generated. In some embodiments, the method further comprises contacting the solution from the first fluid stream with solution from a second fluid stream, the solution from the first fluid stream being essentially immiscible with the solution from the second fluid stream, such that the active form of the redox mediator reacts with a reactant to produce the chemical product.

In some embodiments, a method for producing a solution containing at least 20 mM $H_2O_2$ and less than 5 mM of dissolved ionic species, at a pH between 5 and 7, is described. In some embodiments, the method comprises reacting a reactant with oxygen gas to generate $H_2O_2$ and a product. In some cases, the method comprises regenerating the reactant. In some embodiments, the overall energy input required to produce the solution and regenerate the reactant is less than or equal to 250 kJ/mol of $H_2O_2$ produced.

In some aspects, a method comprising electrochemically generating, in flow, a solution containing at least 20 mM $H_2O_2$ and less than 5 mM of ionic species, at a pH between 5 and 7 is described.

In some aspects, a method comprising electrochemically generating a solution containing at least 20 mM $H_2O_2$ from a reactant pool essentially free of $H_2$ is described.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
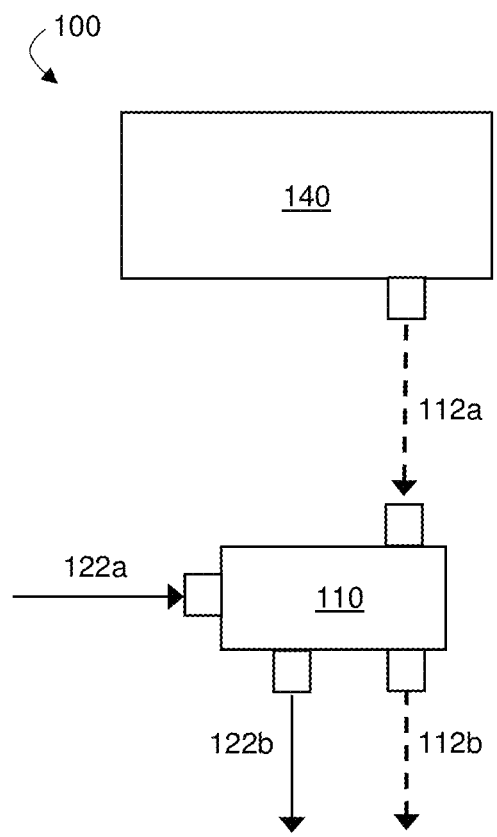
FIG. 1A shows an exemplary schematic of an electrochemical flow system, according to certain embodiments.
Figure 1B:
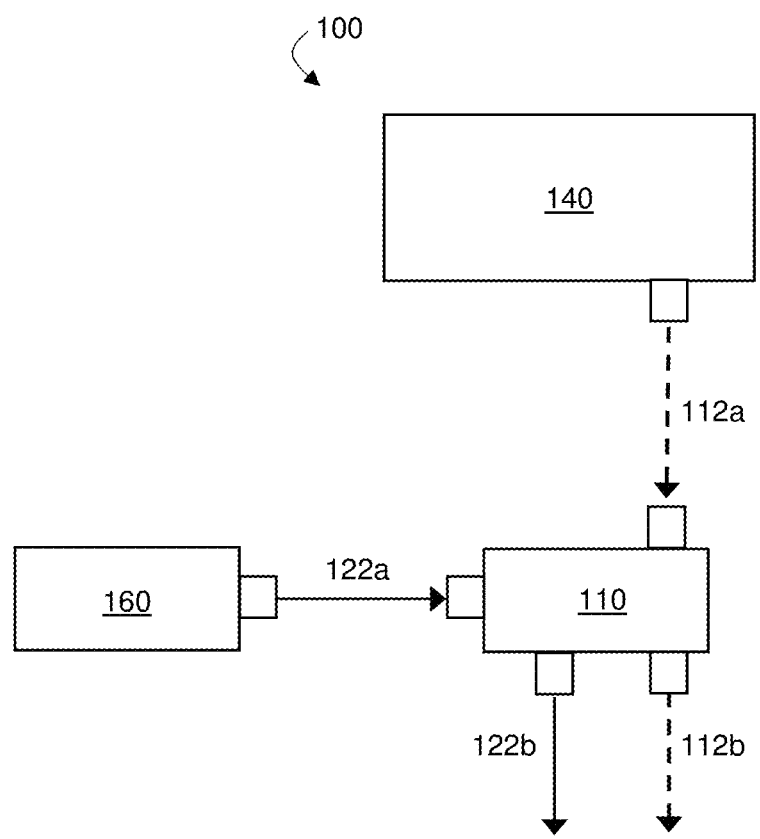
FIG. 1B shows an exemplary schematic of an electrochemical flow system, according to certain embodiments.

Systems and methods for electrochemically producing chemical products are generally described.

Certain embodiments relate to the use of redox mediators to spatially decouple direct electrochemical processes from the production of a chemical product via the use of separate phases (e.g., essentially immiscible liquids) and, in some cases one or more phase transfers. Such spatial decoupling may allow for the production, in a relatively portable system, of a chemical product in a solution relatively free of other dissolved species, thereby limiting or avoiding the need for expensive or laborious separation or purification processes (e.g., distillation, reverse osmosis, etc.). In some cases, the active form of a redox mediator is generated at an electrode in the solution of a first fluid stream (e.g., an aqueous electrolyte), and subsequently the solution of the first fluid stream is contacted with the solution of a second fluid stream (e.g., an essentially water-immiscible organic solution) in, for example, a first module (e.g., a mixer-settler), resulting ultimately in the formation of the chemical product. In some, but not necessarily all embodiments, at least a portion of the active form of the redox mediator transfers from the solution of the first fluid stream to the solution of the second fluid stream, which is subsequently contacted with the solution of a third fluid stream comprising a reactant and relatively few other dissolved species (e.g., water comprising little to no electrolyte), in, for example, a second module (e.g., a second mixer-settler). The active form of the redox mediator may react with the reactant to form the chemical product in the solution of the third fluid stream, which is relatively free of contaminants such as supporting electrolyte. In a non-limiting exemplary embodiment, a redox mediator (e.g., a quinone-based species such as an optionally-substituted anthraquinone) is used to shuttle reducing equivalents (e.g., 2 electrons and two protons) from an electrolyte solution in an electrochemical cell to a separate solution (e.g., water) comprising a reactant (e.g., oxygen gas) to generate a chemical product (e.g., hydrogen peroxide).

Certain other embodiments relate to the use of redox mediators immobilized on electrodes to temporally decouple direct electrochemical processes from the production of a chemical product via the use of a sequence of slugs containing distinct solutions (e.g., one slug comprising an electrolyte solution and another slug comprising a solution comprising a reactant but having a relatively low concentration of dissolved contaminants). Such temporal decoupling may also allow for the production, in a relatively portable system, of a chemical product in a solution relatively free of other dissolved species, which, as mentioned above and herein, can be advantageous. In some cases, the active form of an immobilized redox mediator disposed on an electrode is generated at the electrode (e.g., a first electrode) via the application of an electrical potential while the electrode is in contact with a first slug (e.g., a slug comprising an aqueous electrolyte). In some cases, at least a portion of the first slug is subsequently replaced by a second slug comprising a reactant capable of reacting with the active form of the redox mediator to produce the chemical product in the solution of the second slug, which may have a relatively low concentration of contaminants such as supporting electrolyte. In some embodiments, a sequence of essentially immiscible slugs including the first slug, an inert slug, and the second slug, is flowed through an electrochemical cell and contacted with a first electrode (e.g., in a first electrode compartment) comprising the immobilized redox mediator while, at least a portion of the time, an electrical potential is applied to the first electrode. In a non-limiting exemplary embodiment, a redox mediator (e.g., a redox-active polymer comprising optionally-substituted anthraquinone) is immobilized on an electrode and accepts reducing equivalents (e.g., 2 electrons and two protons) from an electrode and from an electrolyte solution of a first slug (e.g., comprising an aqueous catholyte solution), and then, after at least a portion of the first slug is replaced with a second slug comprising a reactant (e.g., an aqueous solution containing oxygen gas), the immobilized redox mediator reacts with the reactant to generate a chemical product (e.g., hydrogen peroxide).

Certain of the systems and methods described herein can provide one or more advantages over traditional methods of producing certain chemical products. Traditional electrosynthesis of chemical products often involves either heterogeneous or homogeneous catalysis. In electrochemical systems, traditional heterogeneous electrocatalysis (e.g., catalysis directly at an electrode) is often employed for the production of gaseous products (e.g., $H_2$, CO, etc.), but are non-ideal for cases in which the desired chemical products are not readily-purified by phase separation. Examples of such products include liquid products such as hydrogen peroxide, formic acid, or methanol. For example, direct production of a chemical product (e.g., a liquid product) at an electrode often results in the mixing of the product streams with co-dissolved electrolyte. The systems and methods described herein, however, provide a way to use electrochemical methods to generate chemical products in solutions that may not require further purification or separation (e.g., from dissolved ionic species such as electrolyte). In doing so, the systems and methods described herein provide an indirect electrosynthetic methodology (e.g., via the use of redox mediators and, in some cases one or more phase transfer or slug flow steps) for the production of liquid or dissolved products with high-efficiency separation.

One exemplary chemical product that can be produced using the systems and methods described herein is hydrogen peroxide. Hydrogen peroxide is predominantly synthesized for commercial use via a process involving the anthraquinone-mediated combination of $H_2$ and $O_2$ to form $H_2O_2$. This traditional anthraquinone-based process requires the use of complex production plants, as well as a stoichiometric homogeneous mediator (the anthraquinone). While in some cases the anthraquinone process can involve regeneration of the mediator, such a process is energy-intensive. Direct synthesis of $H_2O_2$ is therefore desirable. Direct $H_2O_2$ synthesis, including direct electrochemical synthesis of $H_2O_2$, results in the $H_2O_2$ being co-dissolved with contaminants such as supporting electrolyte, and such methods on commercial scales often require either the presence of $H_2$ as a reactant, and therefore coupling to large-scale steam reformers, or require the use of precious-metal-rich water electrolyzers. The systems and methods described herein, which in some cases involve the use of redox mediators and one or more phase transfer or slug flow processes provide for a down-scalable, portable, energy efficient methodology for the production of $H_2O_2$. Moreover, the systems and methods described herein, in some embodiments, provide for methods for producing $H_2O_2$, in a solution with a relatively low concentration of other dissolved species, from a reactant pool essential free of $H_2$.

In one set of embodiments, certain systems and methods related to producing a chemical product are generally described.

In some embodiments, an electrochemical flow system involving contacting multiple liquid phases is described. The electrochemical flow system may be used to produce a chemical product, such as, but not limited to, hydrogen peroxide. In some embodiments, the system comprises an electrochemical cell. Referring to FIG. 1A, exemplary system 100 comprises electrochemical cell 140. The electrochemical cell can be used to generate certain active species, as described below (e.g., via applying an electrical potential while a solution is in contact with one or more electrodes).

Figure 3:
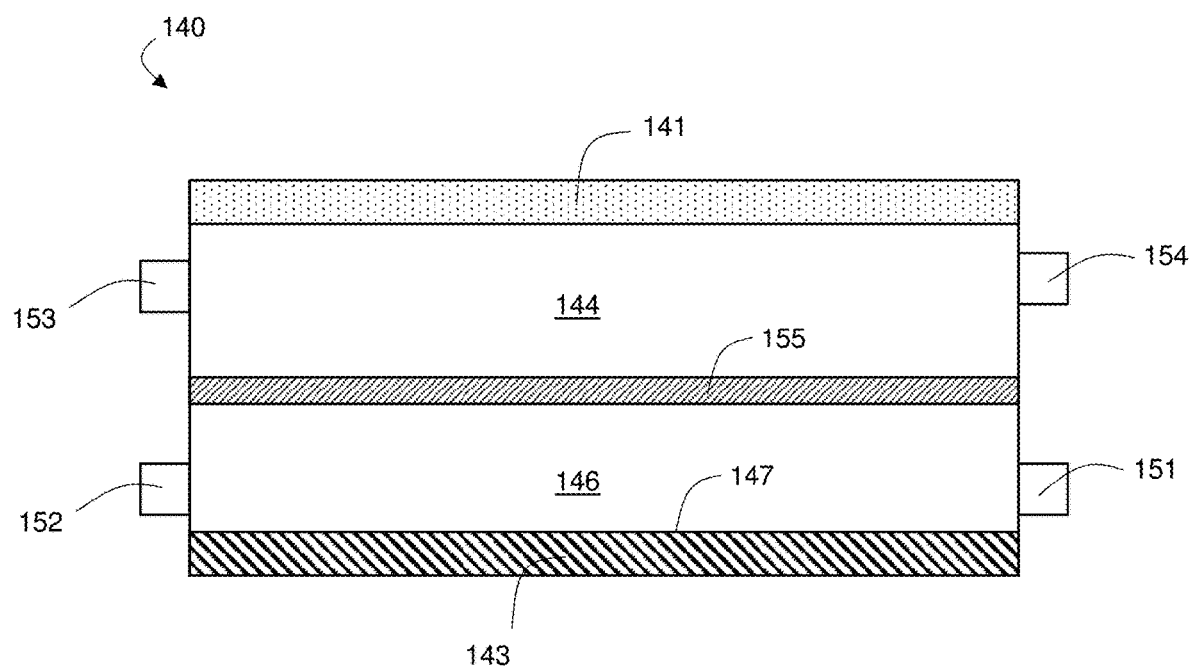
FIG. 3 shows an exemplary schematic of an electrochemical cell, according to certain embodiments.
Figure 4:
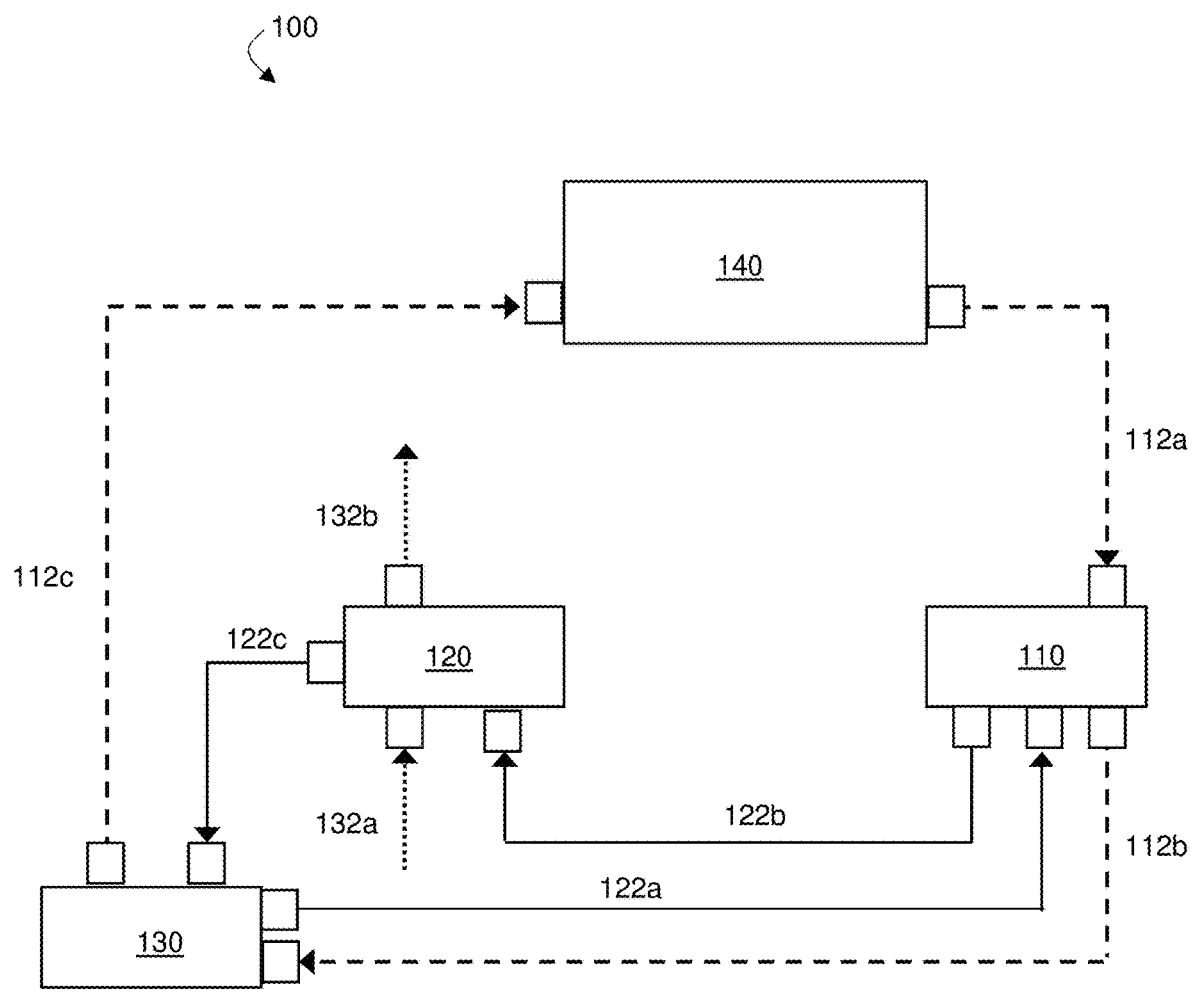
FIG. 4 shows an exemplary schematic of an electrochemical flow system, according to certain embodiments.

In some embodiments, the electrochemical cell comprises a first electrode. Referring to FIG. 3, for example, electrochemical cell 140 comprises first electrode 143, according to certain embodiments. The first electrode typically comprises at least one electrically conductive component, as well as an electrode active material. As used herein, an "electrode active material" is used to described any electrochemically active species associated with an electrode. In some cases, the electrode active material is the electronically conductive component of the first electrode. For example, in some cases, the first electrode comprises an electronically conductive carbon material (e.g., carbon felt) capable of acting as an electrode active material. The first electrode can be used, in some cases, to generate an active species (e.g., the active form of a redox mediator). To do so, the first electrode can be contacted with a solution. For example, some embodiments comprise applying, in an electrochemical cell, an electrical potential to a first electrode in contact with solution from a first fluid stream. The solution from the first stream can, for example, be a liquid, such as an aqueous solution comprising dissolved electrolytes. In some cases, the solution of the first stream comprises a redox mediator, as described in more detail below. Referring again to FIG. 3, an active species (e.g., the active form of a redox mediator) can be generated by applying an electrical potential to electrochemical cell 140 while contacting a solution (e.g., the solution of the first stream) with first electrode 143, according to certain embodiments.

In some embodiments, the first electrode is a cathode. That is, during operation of the electrochemical system described herein, the first electrode may reduce species (i.e., serve as a source of electrons) dissolved in solutions that are in contact with the first electrode. One of ordinary skill in the art, with the benefit of this disclosure, is readily capable of choosing a suitable cathode, depending on, for example, the desired electrical potential windows to be employed during operation of the system, chemical compatibility, cost, desire for modification such as coating with catalysts, etc. Examples include carbon (e.g., glassy carbon, pyrolytic carbon, graphite, carbon nanostructures, carbon cloth, etc.), boron-doped diamond, gold, platinum, palladium, mercury, metals, conductive polymers, conductive oxides, and the like. Having the first electrode as a cathode may be beneficial in cases in which it is desired that application of an electrical potential to the first electrode in contact with solution from a first fluid stream generate the active form of a species (e.g., the active form of redox mediator), where the active form is a reduced species. In other embodiments, the first electrode is an anode. In other words, in some cases, the first electrode may oxidize species (i.e., serve as an electron sink) dissolved in solutions that are in contact with the first electrode. As in the case of the a cathode, one of ordinary skill, with the benefit of this disclosure, would be capable of selecting a suitable anode for use in the systems described herein. Examples include anodes made of carbon (e.g., glassy carbon, pyrolytic carbon, graphite, carbon nanostructures, carbon cloth, etc.), boron-doped diamond, gold, platinum, palladium, mercury, metals, conductive polymers, conductive oxides, etc. Such a configuration, wherein the first electrode is an anode, may be useful in cases in which generating the active form of a species in the solution of the first stream involves oxidizing the species.

In some cases, the first electrode is an inert electrode. For example, in some embodiments, first electrode 143 is an inert electrode. Generally, an inert electrode is an electrode that does not directly participate in chemical reactions; rather, an inert electrode serves as an electron source or electron sink. The use of an inert electrode as the first electrode, may, in some embodiments, allow for fast and efficient generation of the active form of a species dissolved in the solution of the first stream, without passivation of the electrode due to chemical processes and/or adsorption of species, particularly in electrochemical flow systems. Examples of inert electrodes include, but are not limited to, electrodes comprising carbon (e.g., glassy carbon, pyrolytic carbon, graphite, carbon nanostructures, carbon cloth, etc.), boron-doped diamond, mercury, and/or precious metal electrodes. Carbon electrodes may be particularly attractive, in some cases, due to their low cost and low environmental risk. However, in some cases, the first electrode is not an inert electrode. Having a first electrode that is not an inert electrode may be beneficial in cases in which it is desired that the first electrode participate in bond-breaking or bond-forming reactions would species dissolved in, for example, the solution of the first stream.

In some embodiments, the electrochemical cell comprises a second electrode. For example, FIG. 3 depicts exemplary electrochemical cell 140 comprising second electrode 141. As in the case of the first electrode, the second electrode typically comprises at least one electrically conductive component, as well as an electrode active material. In some cases, the electrode active material is the electronically conductive component of the second electrode. The second electrode, in some embodiments, is an anode. In other embodiments, the second electrode is a cathode. Typically, when the first electrode is a cathode, the second electrode is an anode, and when the first electrode is an anode, the second electrode is a cathode. According to certain embodiments, in electrochemical cell 140, first electrode 143 is a cathode and second electrode 141 is an anode.

In some, but not necessarily all embodiments, the second electrode is not an inert electrode. For example, the second electrode may participate in certain chemical reactions (e.g., during the application of the electrical potential). In some cases, the second electrode comprises a catalytically active component. In such a way, the second electrode may, in certain cases, be able to perform electrocatalytic reactions (e.g., heterogeneous electrocatalytic reactions), as described in more detail below. One of ordinary skill, with the benefit of this disclosure, is capable of choosing a suitable second electrode. Examples include carbon (e.g., glassy carbon, pyrolytic carbon, graphite, carbon nanostructures, carbon cloth, etc.), boron-doped diamond, gold, platinum, palladium, mercury, metals such as stainless steel, conductive polymers, conductive oxides, and the like, any of which may, in certain embodiments, be modified with a catalytic material, as described below.

In some embodiments, the electrochemical cell comprises a first inlet and a first outlet. By having a first inlet and/or a first outlet, the electrochemical cell can be configured to have a solution flowed into and/or out of the electrochemical cell. Referring to FIG. 3, electrochemical cell 140 comprises first inlet 152 and/or first outlet 151, according to certain embodiments. One of ordinary skill in the art, with the benefit of this disclosure, is capable of choosing suitable materials, designs, fittings, etc. for use as inlets and/or outlets in the electrochemical cell (as well as other components of the systems described herein that may include inlets and/or outlets). Examples include opening and/or fittings capable of being coupled to conduits (e.g., tubes, channels, etc.) or directly to other inlets and/or outlets. In some cases, the electrochemical cell is configured to flow the first fluid stream introduced above out of the first outlet of the electrochemical cell. For example, referring to FIG. 1A, system 100 comprises electrochemical cell 140, which is configured to flow first fluid stream 112 out of the first outlet of electrochemical cell 140. In having such a configuration, the system can be configured to generate the active form of the species (e.g., the active form of a redox mediator) in the solution of a first fluid stream by contacting the solution of the first fluid stream with a first electrode while applying a certain electrical potential (i.e., an electrical potential of sufficient magnitude to cause the generation of the active species), and then flow the first fluid stream, comprising the active species, out of the electrochemical cell. In doing so, in some embodiments, the system can be configured to provide an active species (e.g., a species capable of undergoing a desired further chemical reaction, such as a redox mediator) that is spatially separated from the electrode where it was generated. The first inlet of the electrochemical cell can, in some cases, be used to flow in a solution from a fluid stream (e.g., a different portion of the first fluid stream, or a different fluid stream) to replace the first fluid stream as the first fluid stream is flowed out of the electrochemical cell. The inlet and/or outlet of the electrochemical cell can, in some cases be fittings made out of suitable materials, such as polymers (e.g., polypropylene, polytetrafluoroethylene, etc.), ceramics, metals, and/or combinations or composites thereof.

As mentioned above, some embodiments comprise applying an electrical potential to a first electrode in contact with the solution of the first fluid stream. When a solution, such as the solution from the first fluid stream, is in contact with an electrode (e.g., the first electrode), it is not necessary that the entirety of the first electrode be in contact with the solution. For example, in some cases, a solution is in contact with a portion of an electrode when the solution wets at least that portion of a surface of the electrode (e.g., the surface of the electrode that is facing one or more other electrodes in an electrochemical cell). Referring to FIG. 3, first electrode 143 comprises surface 147, wherein surface 147 faces second electrode 141 in electrochemical cell 140. The surface of an electrode can include other components besides electrode active material and/or the electronically conductive components, such as a coating on the surface of the electrode. In some cases, when the solution of the first fluid stream is in contact with the first electrode, the solution wets at least 10%, at least 15%, at least 20%, at least 30%, at least 40%, at least 50%, at least 60%, at least 75%, at least 90%, or more of the surface of the first electrode. In some embodiments, when the solution of the first fluid stream is in contact with the first electrode, the solution wets up to 100%, up to 99%, up to 98%, up to 95%, up to 90%, up to 85%, up to 80%, or less of the surface of the first electrode. Combinations of these ranges are possible. For example, in some embodiments, when the first fluid stream is in contact with the first electrode, the solution wets at least 10% and up to 100%, or at least 75% and up to 100%, of the surface of the first electrode. Having the solution of the first fluid stream being contact with a relatively large percentage of the surface of the first electrode (e.g., wetting a relatively large percentage of the surface of the first electrode) may allow increased access of reactive species such as redox mediators to the surface of the electrode, thereby increasing the rate of generation of active species such as the active form of the redox mediator.

Applying an electrical potential to a first electrode in contact with the solution of the first fluid stream may result in the generation of the active form of species dissolved in the solution of the first fluid stream. For example, in cases where the first electrode is a cathode, applying in electrical potential to the cathode a result in a species dissolved in the solution of the first fluid stream being reduced, thereby generating an active species. This case may occur when the elected chemical potential applied to the first electrode is more negative than the standard reduction potential of the species.

In some embodiments, the solution of the first fluid stream comprises a redox mediator. Generally, a redox mediator is a chemical species that is capable of transferring reducing or oxidizing equivalents from an electrode to a different species. A redox mediator may transfer reducing equivalents, for example, by being reduced by an electrode (e.g., accepting electrons from an electrode) and, subsequently, reducing another species (and regenerating the original form of the redox mediator). Similarly, the redox mediator may transfer oxidizing equivalents, for example, by being oxidized by the electrode (e.g., injecting electrons into an electrode/accepting holes from an electrode) and, subsequently, oxidizing another species. Redox mediators can be useful in electrochemical reactions, such as those described herein, for a number of reasons. Redox mediators can accelerate electrochemical reactions (such as in cases where the direct reaction between a reactant and an electrode is relatively slow). Redox mediators can also provide selectivity for desired products in electrochemical reactions (such as in cases where the direct reaction between a reactant and an electrode is unselective, but the reaction between the active form of a redox mediator and the reactant is selective for the desired product). Additionally, redox mediators can allow for the generation of the ultimate product of an electrochemical process to be decoupled (e.g., spatially decoupled) from the electrochemical cell and/or the electrode (i.e., allows for an indirect electrochemical reaction, as opposed to a direct electrochemical reaction).

In some embodiments, the total concentration of redox mediator (i.e. the sum of the concentration of the active and non-active forms of the redox mediator) in the solution of the first fluid stream is at least 1.0 μM, at least 5.0 μM, at least 10 μM, at least 20 μM, at least 50 μM, at least 100 μM, at least 200 μM, at least 500 μM, at least 1.0 mM, at least 5.0 mM, at least 5.0 mM, at least 10 mM, at least 20 mM, at least 50 mM, or more. In some embodiments, the total concentration of redox mediator in the first fluid stream is less than or equal to 1.0 M, less than or equal to 0.5 M, less than or equal to 0.2 M, less than or equal to 0.1 M, or less. Combinations of these ranges are possible. For example, in some embodiments, the total concentration of redox mediator in the first fluid stream is at least 1.0 μM and less than or equal to 1.0 M, or at least 1.0 mM and less than or equal to 0.1 M. Other ranges are possible.

Redox mediators, as described herein, may serve as outer sphere redox mediators. In such cases, the redox mediators act as electron shuttles, accepting or donating electrons to and from an electrode and another species without undergoing bond-making and/or bond-breaking processes. However, in some embodiments, redox mediators may be capable of undergoing bond-making and/or bond breaking-processes during operation. For example, in some embodiments, the redox mediator may accept reducing equivalents in the form of both electrons and protons (e.g., via a proton-coupled electron transfer process). As a more specific example, in some embodiments, the redox mediator may accept two electrons from an electrode during the application of electrical potential, while also accepting (in either a concerted or stepwise manner) protons from solution, resulting in a net transfer two electrons and two protons to the redox mediator. An example of a redox mediator capable of such reactivity is a quinone that can accept two electrons and two protons to form a hydroquinone. The redox mediator then, subsequently, may transfer the two electrons and the two protons to another species and solution, thereby regenerating the original form of the redox mediator while producing a two-electron, two proton, reduced-species in the solution. Other types of non-outer sphere redox mediators are possible. For example, in some embodiments, the redox mediator is oxidized by an electrode and, as a result, accepts an oxygen atom. The oxidized redox mediator may then transfer the oxygen atom to the species and solution, thereby mediating ineffective oxygen atom transfer reaction between an electrode and a species and solution.

In facilitating electrochemical reactions between an electrode into species in solution involving the transfer of electrons and or atoms, redox mediators can be useful in controlling energy transfer and mass transfer during the production of chemical products, such as in the systems and methods described herein. Any suitable redox mediators may be used, depending on the desired chemical products and or the conditions used (e.g., solvents, temperature, electrode material, etc.).

As used herein, redox mediators have an active form. The active form of a redox mediator is the product between the redox mediator and the electrode during operation of the electrochemical cell (e.g., during the application of electrical potential to the electrode) that is then capable of reacting with the desired species (e.g., reactant) to produce the desired chemical product without requiring any further chemical transformation prior to the reaction with the desired species. For example, if the redox mediator is used to facilitate the reduction of a reactant in solution to make a product by shuttling electrons from an electrode to the reactant, then the reduced redox mediator (i.e., the product of the reduction of the redox mediator by the electrode) is the active form of the redox mediator. Similarly, if the redox mediator is used to facilitate the reduction of a reactant in solution to make a product by transferring both electrons and protons from a combination of the electrode and the solution to the reactant, then the active form of the redox mediator is the form that has accepted both electrons and protons, as opposed to an intermediate that has accepted either just electrons or just protons. For example, in some embodiments, quinone is used as a redox mediator to facilitate the two-electron, two proton-reduction of a reactant (e.g., $O_2$) to form a product (e.g., $H_2O_2$), and the corresponding hydroquinone is the active form of the redox mediator, rather than an intermediate such as the corresponding semiquinone.

In some embodiments, applying an electrical potential to the first electrode while it is in contact with a solution from a first fluid stream comprising a redox mediator results in the generation of an active form of the redox mediator. In particular, the active form of the redox mediator with respect to the production of the chemical product may be generated. Referring to FIG. 3, in some embodiments, the electrical potential is applied to first electrode 143 in electrochemical cell 140, first electrode 143 being in contact with solution from a first fluid stream, the solution comprising a redox mediator, such that an active form of the redox mediator is generated. In some such cases, the first fluid stream, after contacting the first electrode during the application of an electrical potential to the first electrode, comprises the active form of the redox mediator. In some embodiments, a portion of the first fluid stream, comprising solution containing the active form of the redox mediator, is flowed out of the electrochemical cell (e.g., via the first outlet of the electrochemical cell). For example, referring to FIG. 1A, portion of first fluid stream 112a comprises the active form of the redox mediator and is flowed out of electrochemical cell 140, according to certain embodiments. More specifically, in accordance with certain embodiments, the first fluid stream, after contacting the first electrode in the application of the electrical potential to the first electrode, comprises a hydroquinone.

The redox mediator may be chosen based on an ability to selectively form a desired chemical product. That is to say, in some embodiments, the system comprises a redox mediator and a reactant, and the reaction between the active form of the redox mediator and the reactant is selective for the chemical product. Having a redox mediator that is selective for the production of the desired chemical product can be beneficial, for example, by increasing the faradaic and consequently the energetic efficiency of the electrochemical production of the chemical product, or reducing the presence of unwanted side products or competing reactions.

In some embodiments, the reaction between the active form of the redox mediator and the reactant is selective for the chemical product by controlling the possible number of electrons and/or other atoms that can be transferred (e.g., controlling the number of electrons and protons that can be transferred). As one non-limiting example, the direct electrochemical reduction of oxygen gas ($O_2$) at an electrode in the presence of protons can, in some cases, result in the formation of either hydrogen peroxide (the two-electron, two-electron product) or $H_2O$ (the four-electron, four-electron product). Using a redox mediator capable of only transferring two electrons and two protons (such as a quinone that forms a hydroquinone), instead of reducing the $O_2$ directly at the electrode, can reduce or even eliminate the production of $H_2O$, while selectively forming hydrogen peroxide.

In some embodiments, the reaction between the active form of the redox mediator and the reactant is selective for the chemical product by controlling the thermodynamic driving force for the reaction between the reactant in the redox mediator. For example, in some cases, a reactant may be capable of forming multiple different products, with those different products having different standard potentials. Applying a relatively large electrical potential (i.e., relatively negative for reduction processes or relatively positive for oxidation processes) may accelerate the rate of the electrochemical reaction, but if the applied potential is beyond that of both of the different products that the reactant can form, in a redox mediator is present, then a mixture of products may be obtained. However, the use of a redox mediator having a standard potential between those of the multiple different products can allow for a relatively large electrical potential to be applied having a lower magnitude of standard potential than the redox mediator. For example, the first product has a standard reduction potential of −0.5 V and a second product has a standard reduction potential of −1.0 V, then using a redox mediator having a standard potential of −0.75 V may allow for a relatively negative potential to be applied (e.g., −1.5 V), while only the first product, because the redox mediator is thermodynamically incapable of forming the second product. Therefore, judicious selection of the redox mediator may provide multiple routes toward selectivity for the desired product.

The redox mediator may be in the form of a variety of different types. In some embodiments, the redox mediator is or comprises a molecular species (i.e., a small molecule). However, in some embodiments the redox mediator is or comprises an oligomer or a polymer. In other cases, the redox mediator is a particle (e.g., a microparticle or a nanoparticle). Having a molecular redox mediator may be beneficial in cases where precise control of the structure and/or functionalization of the redox mediator is desired (e.g., for the purpose of controlling solubility in various solvents or selectivity for various products). In some cases, the redox mediator comprises a metal. For example, the redox mediator may comprise a coordination complex containing a metal. In other cases, the redox mediator comprises an organic molecule. For example, in some embodiments the redox mediator is an organic small molecule. In some cases the redox mediator is a charged molecule both in its active form and in its non-active form. For example, in some cases the redox mediator is anionic both in its active form and in its non-active form. Similarly, in some cases the redox mediator is cationic both in its active form and in its non-active form.

In some embodiments, the redox mediator is a species in which the active form of the redox mediator is a reduced form of the redox mediator. Such a species might be chosen when using the electrochemical system described herein for the purpose of generating a chemical product via the electrochemical reduction of a reactant (e.g., the electrochemical reduction of oxygen gas to generate hydrogen peroxide).

In other embodiments, the redox mediator is a species in which the active form of the redox mediator is an oxidized form of the redox mediator. Such a species might be chosen when using the electrochemical system described herein for the purpose of generating a chemical product via the electrochemical oxidation of a reactant (e.g., the electrochemical oxidation of organic alcohols (e.g., methanol) to generate ketones, aldehydes (e.g., formaldehyde), and/or carboxylic acids (e.g., formic acid)). For example, in some embodiments, the redox mediator comprises 2,2,6,6,-tetramethyl-1-piperidinyloxy (TEMPO) and is used to oxidize organic alcohols such as methanol to produce molecules comprising ketones, aldehydes, and/or carboxylic acid groups. Other species capable of being a redox mediator in which the active form of the redox mediator is an oxidized form of the redox mediator are species comprising metallocene complexes such as ferrocene (with the active form being the corresponding ferrocenium). In some cases, the redox mediator is or comprises an optionally-substituted ferrocene, such as a ferrocene comprising a sulfonate, phosphonate, and/or a carboxylate group. As in the case of TEMPO, redox mediators comprising ferrocene can, in some embodiments, mediate the electrochemical oxidation or organic alcohols to form chemical products having ketone, aldehyde, and/or carboxylic acid groups. Redox mediators comprising phosphines (e.g., a triarylphosphines), are another example of redox mediators in which the active form of the redox mediator is an oxidized form of the redox mediator (e.g., a triarylphosphine oxide).

In certain embodiments, the redox mediator is a species capable of undergoing a two-electron, two-proton reduction at an electrode (the protons being supplied by a solution such as an electrolyte solution). Such a species can be useful in mediating certain reactions, such as the electrochemical reduction of oxygen gas to generate hydrogen peroxide In some embodiments, the redox mediator is or comprises a quinone. The quinone may optionally be substituted (i.e., the quinone may comprise functional groups and/or other moieties or linkages bonded to the main structure of the quinone). The choice of functional groups on the redox mediator (e.g., a quinone, anthraquinone or any other type of redox mediator) may be based on the desired solubility and/or standard reduction potential of the redox mediator. Exemplary functional groups with which the optionally-substituted quinone may be functionalized include, but are not limited to, halo, hydroxyl, carboxylate/carboxylic acid, sulfonate/sulfonic acid, alkylsulfonate/alkylsulfonic acid, phosphonate/phosphonic acid, alkylphosphonate/alkylphosphonic acid, amino, quaternary ammonium (e.g., tetraalkylamino), alkyl, heteroalkyl, alkoxy, glycoxy, polyalkyleneglycoxy, imino, polyimino, alkenyl, alkynyl, aryl, heteroaryl, heterocyclyl, nitro, nitrile, thiyl, and/or carbonyl groups, any of which is optionally substituted. Certain functional groups, such as sulfonate, carboxylate, and/or phosphonate, may be useful in allowing the redox mediator to be soluble either in aqueous and/or non-aqueous solvents, depending on the nature of the counterion in the respective solutions. In some embodiments, the redox mediator comprises an optionally-substituted quinone, and the active form of the redox mediator comprises the corresponding hydroquinone of the optionally-substituted quinone. In some embodiments, the optionally-substituted quinone and its corresponding hydroquinone have the structures of formula (1A) and formula (1B), respectively:

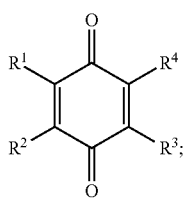

(1A)

-continued

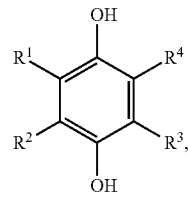

(1B)

where groups $R^1$, $R^2$, $R^3$, and/or $R^4$ can the same or different and are halo, hydroxyl, carboxylate/carboxylic acid, sulfonate/sulfonic acid, alkylsulfonate/alkylsulfonic acid, phosphonate/phosphonic acid, alkylphosphonate/alkylphosphonic acid, amino, quaternary ammonium (e.g., tetraalkylamino), alkyl, heteroalkyl, alkoxy, glycoxy, polyalkyleneglycoxy, imino, polyimino, alkenyl, alkynyl, aryl, heteroaryl, heterocyclyl, nitro, nitrile, thiyl, and/or carbonyl groups, any of which is optionally substituted, or, any two adjacent groups of $R^1$-$R^4$ can be joined together to form an optionally-substituted ring.

While 1,4-quinones are displayed in structures 1A and 1B, it should be understood that, in certain embodiments, an optionally-substituted quinone can be another type of quinone, such as an optionally-substituted orthoquinone (e.g., a 1,2-quinone). In some embodiments, the optionally-substituted quinone is or comprises an optionally-substituted naphthquinone.

In some embodiments, the redox mediator is or comprises an anthraquinone. The anthraquinone may optionally be substituted (i.e., the anthraquinone may comprise functional groups and/or other moieties or linkages bonded to the main structure of the anthraquinone). The functional groups may be any of those listed above. In some embodiments, the redox mediator comprises an optionally-substituted anthraquinone, and the active form of the redox mediator comprises the corresponding hydroquinone of the optionally-substituted anthraquinone. In certain embodiments, the anthraquinone comprises one or more sulfonate, carboxylate, and/or phosphonate groups. For example, the redox mediator may be and/or comprise anthraquinone-2,7-disulfonate. The redox mediator may also be and/or comprise anthraquinone-2-sulfonate. It should be noted that, as used herein, when an functional group is described, it is understood that the conjugate acid or conjugate base of the functional group may, in certain cases, also be used. In some embodiments, the optionally-substituted anthraquinone and its corresponding hydroquinone have the structures of formula (2A) and formula (2B), respectively:

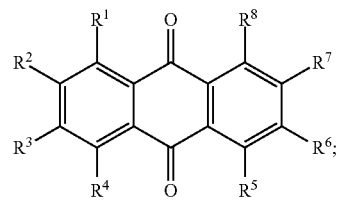

(2A)

-continued

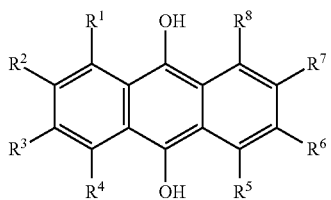

(2B)

where groups $R^1$, $R^2$, $R^3$, $R^4$, $R^5$, $R^6$, $R^7$, and/or $R^8$ can the same or different and are halo, hydroxyl, carboxylate/carboxylic acid, sulfonate/sulfonic acid, alkylsulfonate/alkylsulfonic acid, phosphonate/phosphonic acid, alkylphosphonate/alkylphosphonic acid, amino, quaternary ammonium (e.g., tetraalkylamino), alkyl, heteroalkyl, alkoxy, glycoxy, polyalkyleneglycoxy, imino, polyimino, alkenyl, alkynyl, aryl, heteroaryl, heterocyclyl, nitro, nitrile, thiyl, and/or carbonyl groups, any of which is optionally substituted, or, any two adjacent groups of $R^1$-$R^8$ can be joined together to form an optionally-substituted ring.

Other types of redox mediators (e.g., small molecule redox mediators) are also possible. For example, in some embodiments, the redox mediator is or comprises a phenazine. In embodiments, the redox mediator comprises an optionally-substituted phenazine, and the active form of the redox mediator comprises the corresponding dihydrophenazine (e.g., 5,10-dihydrophenazine) of the optionally-substituted phenazine. The phenazine may optionally be substituted (i.e., the phenazine may comprise functional groups and/or other moieties or linkages bonded to the main structure of the phenazine). The functional groups may be any of those listed above. In certain embodiments, the phenazine comprises one or more sulfonate, carboxylate and/or phosphonate groups. For example, the redox mediator may be and/or comprise phenazine-2,7-disulfonate. The redox mediator may also be and/or comprise phenazine-2-sulfonate. In some embodiments, the optionally-substituted phenazine and its corresponding dihydrophenazine have the structures of formula (3A) and formula (3B), respectively:

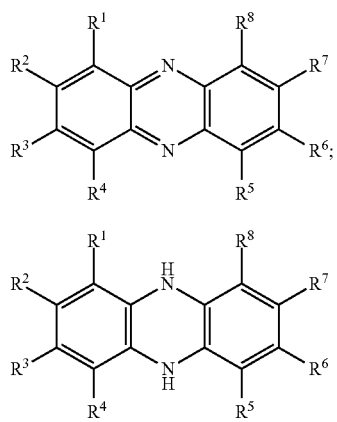

(3A)

(3B)

where groups $R^1$, $R^2$, $R^3$, $R^4$, $R^5$, $R^6$, $R^7$, and/or $R^8$ can the same or different and are halo, hydroxyl, carboxylate/carboxylic acid, sulfonate/sulfonic acid, alkylsulfonate/alkylsulfonic acid, phosphonate/phosphonic acid, alkylphosphonate/alkylphosphonic acid, amino, quaternary ammonium (e.g., tetraalkylamino), alkyl, heteroalkyl, alkoxy, glycoxy, polyalkyleneglycoxy, imino, polyimino, alkenyl, alkynyl, aryl, heteroaryl, heterocyclyl, nitro, nitrile, thiyl, and/or carbonyl groups, any of which is optionally substituted, or, any two adjacent groups of $R^1$-$R^8$ can be joined together to form an optionally-substituted ring.

In some embodiments, methods described herein comprise contacting the solution from the first fluid stream with solution from a second fluid stream. For example, in some embodiments, the first fluid stream comprising the active form of the redox mediator is flowed out of the electrochemical cell and, subsequently, is contacted with solution from a second fluid stream. Referring to FIG. 1A, in some embodiments, first fluid stream 112 is contacted with second fluid stream 122. In some embodiments, the solution of the first fluid stream is essentially immiscible with the solution of the second fluid stream. Contacting solution from the first fluid stream with solution from the second fluid stream may allow for the active form of the redox mediator to react with a reactant to produce the chemical product. It should be understood that the reaction between the active form of the redox mediator and a reactant to form the chemical product may involve the reactant and/or the chemical product being in the second fluid stream or in a different fluid stream, such as a third fluid stream described below. Put a different way, in some embodiments, the reaction between the active form of the redox mediator and the reactant may occur during the contacting of the solution of the first fluid stream and the solution of the second fluid stream, or the reaction may occur at a later part of the process. Forming the chemical product in the solution of the fluid stream that is not the first fluid stream may allow for an avoidance of laborious and/or energetically inefficient separation step. For example, the solution of the first fluid stream may comprise certain contaminants (such as a supporting electrolyte) from which it would be desired that the chemical product be separated. By forming the chemical product in a solution other than that of the first fluid stream, via the contacting of solution of the first fluid stream comprising the active form of the redox mediator with solution of a second fluid stream, separation of the chemical product from the contaminants is not needed.

A variety of chemical products can be made using the systems and methods described herein. In some cases, in some cases, the chemical product is a liquid at or near room temperature. Liquids may be particularly difficult to separate from liquid product streams containing dissolved contaminants using conventional methods, but, in the case of the systems and methods described herein involving the decoupling of direct electrochemical processes and the formation of the chemical (e.g., using a redox mediator in a flow process), liquid chemical products may be formed without the need for laborious separation/purification. As mentioned elsewhere herein, in some cases the chemical product is hydrogen peroxide. In some embodiments, the chemical product is an organic liquid that can be formed electrochemically. Examples of organic liquids include liquid products such as formic acid or methyl formate (e.g., formed by the reaction of carbon dioxide and a redox mediator such as an optionally-substituted phenazine). In some cases, the chemical product may be an alcohol (e.g., methanol formed by a reaction between carbon dioxide and the active form of a redox mediator such as the hydroquinone form of an optionally-substituted quinone). Other types of possible chemical products include, but are not limited to, phosphines, sulfides, and aldehydes. For example, redox mediators such as optionally-substituted phenothiazines as well as TEMPO can be used with the systems and methods described herein to mediate the electrochemical oxidation of secondary alcohols to ketones and/or primary alcohols to aldehydes.

In some cases, contacting the solution of the first fluid stream and the solution of the second fluid stream involves mixing the first fluid stream and the second fluid stream (or mixing portions thereof). Such mixing may occur in a mixer-settler as described below. In other cases, contacting the solution of the first fluid stream and the solution of the second fluid stream involves forming an interface between the two solutions (e.g., in the case of the solution of the first fluid stream and the solution of the second fluid stream being essentially immiscible).

In some embodiments, when the solution from the first fluid stream is contacted with the solution from the second fluid stream, at least a portion of the active form of the redox mediator is transferred from the first fluid stream to the second fluid stream. For example, in some cases, the solution of the first fluid stream may comprise a larger concentration of the active form of the redox mediator than does the solution of the second fluid stream before the solutions of the respective streams are contacted, but upon contact between the two solutions, the concentration of the active form of the redox mediator decreases in the solution of the first fluid stream and increases in the solution of the second fluid stream. In this way, the active form of the redox mediator is said to undergo a phase transfer. Such a process may occur in cases where the active form of the redox mediator is soluble in both the solution of the first fluid stream and the solution of the second fluid stream (though the respective solubilities may not be equal), so that when the two solutions are contacted, the active form of the redox mediator partitions between the two solutions according to the partition equilibrium of the active form of the redox mediator. One example of a situation in which phase transfer as described herein may occur is the case where one of the solutions is an aqueous solution and the other solution is an organic solution. For example, in some embodiments, the solution of the first fluid stream is an aqueous solution, while the solution of the second fluid stream is an organic solution. As one non-limiting example, in some embodiments, the redox mediator is an anthraquinone (e.g., anthraquinone-2,7-disulfonate), and the solution of the first fluid stream, as it exits the electrochemical cell, comprises the active, reduced form of the anthraquinone (e.g., the hydroquinone form of the anthraquinone). The solution of the first fluid stream may then contact the solution of the second fluid stream, resulting in at least a portion of the reduced form of the anthraquinone transferring to the solution of the second fluid stream. In such a case, the resulting concentrations of the reduced form of the anthraquinone in the solution of the first fluid stream and the solution of the second fluid stream after contact would be determined by the partition equilibrium of the reduced anthraquinone between the solution of the first fluid stream in the solution of the second fluid stream. In some cases, the solution of the second fluid stream has a higher concentration of the active form of the redox mediator (e.g., the hydroquinone form of an anthraquinone) after contacting the solution of the first fluid stream than the second fluid stream did prior to contacting the solution of the first fluid stream.

In some, but not necessarily all embodiments, the portion of the solution of the second fluid stream that contacts the solution of the first fluid stream comprises the non-active form of the redox mediator. For example, in some embodiments, portion of second fluid stream 122a in FIG. 1A comprises anthraquinone (e.g., anthraquinone-2,7-disulfonate). In some cases, when the solution from the first fluid stream is contacted with the solution from the second fluid stream, at least a portion of the non-active form of the redox mediator is transferred from the second fluid stream to the first fluid stream. For example, in some embodiments, when the solution of the first fluid stream contacts the solution of a second fluid stream comprising an anthraquinone, at least a portion of the anthraquinone is transferred to the solution of the first fluid stream, according to the partition equilibrium of the anthraquinone between the solution of the first fluid stream in the solution of the second fluid stream. Transferring the non-active form of the redox mediator from the solution of the second fluid stream to the solution of the first fluid stream when the two solutions contact each other can allow for the concentration of the non-active form of the redox mediator to be replenished in first fluid stream. Such a replenishing may be useful in cases in which the first fluid stream, after contacting the second fluid stream, is recycled back into the electrochemical cell to form a closed system.

In some embodiments, the partition equilibrium of the active form of the redox mediator between the solution of the first fluid stream and the solution of the second fluid stream is different than the partition equilibrium of the non-active form of the redox mediator between the solution of the first fluid stream and the solution of the second fluid stream. Put a different way, in some embodiments, the preference of the redox mediator to partition into the solution of the first stream (e.g., an aqueous solution/phase) or the solution of the second stream (e.g., an organic solution/phase) may depend on whether the redox mediator is reduced/oxidized, or whether the redox mediator is in its active form or its non-active form. By having such a difference in partition equilibrium between the active form of non-active form of the redox mediator, it is possible to selectively deplete and/or replenish the presence of the active form and/or the non-active form of the redox mediator in the different solutions at different stages of the methods described herein. As a non-limiting example, the partition equilibrium between an aqueous solution and an organic solution for the active form of an anthraquinone redox mediator (e.g., the hydroquinone form) may be significantly lower than that of the non-active form of the anthraquinone redox mediator (e.g., the oxidized, quinone form), resulting in a preference for the active, reduced form of the anthraquinone redox mediator to partition into the organic solution and the non-active, oxidized form of the anthraquinone redox mediator to partition into the aqueous solution one the organic solution the aqueous solution come into contact. In other embodiments, the preferences may be reversed. For example, in some embodiments, the active, reduced form of the redox mediator (e.g., an hydroquinone form) may have a preference to partition into the aqueous solution, while the non-active, oxidized form of the redox mediator (e.g., the quinone form in the case of an anthraquinone-based mediator) may have a preference to partition into the organic phase. In some such cases, the phase transfer of the active and/or non-active forms of the redox mediator may be controlled by the relative concentrations of the species in the solutions of the first fluid stream and the second fluid stream prior to contact. For example, the solution of the second fluid stream may comprise a relatively high concentration of the non-active form of the redox mediator (e.g., above that of what the partition equilibrium between the solution of the first fluid stream and the solution of the second fluid stream would allow), such that when the solution of the second fluid stream and the solution of the first fluid stream come into contact and/or mix, a portion of the non-active form of the redox mediator transfers from the solution of the second fluid stream to the solution of the first fluid stream.

In certain embodiments, the partition equilibrium of the active form of the redox mediator between the solution of the first fluid stream and the solution of the second fluid stream, expressed as the mole fraction of the active form of the redox mediator in the aqueous phase following the mixing of equal volumes of the solution of the first fluid stream and the solution of the second fluid stream is less than or equal to 0.9, less than or equal to 0.7, less than or equal to 0.6, less than or equal to 0.5, less than or equal to 0.4, less than or equal to 0.2, less than or equal to 0.1, less than or equal to 0.05, less than or equal to 0.01, or less. In some embodiments, the partition equilibrium of the active form of the redox mediator between the solution of the first fluid stream and the solution of the second fluid stream is greater than or equal to 0.0, greater than or equal to 0.01, greater than or equal to 0.02, greater than or equal to 0.05, greater than or equal to 0.1, greater than or equal to 0.2, greater than or equal to 0.3, or more. Combinations of these ranges are possible. For example, in some embodiments, the partition equilibrium of the active form of the redox mediator between the solution of the first fluid stream and the solution of the second fluid stream is greater than or equal to 0.0 and less than or equal to 0.9, or greater than or equal to 0.0 and less than or equal to 0.7.

In certain embodiments, the partition equilibrium of the non-active form of the redox mediator between the solution of the first fluid stream and the solution of the second fluid stream, expressed as the mole fraction of the non-active form of the redox mediator in the aqueous phase following the mixing of equal volumes of the solution of the first fluid stream and the solution of the second fluid stream is less than or equal to 0.7, less than or equal to 0.7, less than or equal to 0.6, less than or equal to 0.5, less than or equal to 0.4, less than or equal to 0.2, less than or equal to 0.1, less than or equal to 0.05, less than or equal to 0.01, or less. In some embodiments, the partition equilibrium of the non-active form of the redox mediator between the solution of the first fluid stream and the solution of the second fluid stream is greater than or equal to 0.0, greater than or equal to 0.01, greater than or equal to 0.02, greater than or equal to 0.05, greater than or equal to 0.1, greater than or equal to 0.2, greater than or equal to 0.3, or more. Combinations of these ranges are possible. For example, in some embodiments, the partition equilibrium of the non-active form of the redox mediator between the solution of the first fluid stream and the solution of the second fluid stream is greater than or equal to 0.0 and less than or equal to 0.6, or greater than or equal to 0.0 and less than or equal to 0.7.

In some embodiments, the partition equilibrium of the active form of the redox mediator between the solution of the first fluid stream and the solution of the second fluid stream and/or the partition equilibrium of the inactive form of the redox mediator between the solution of the first fluid stream and the solution of the second fluid stream varies with the concentration of a phase transfer catalyst in the solution of the second fluid stream. As used herein, a phase transfer catalyst is a species dissolved in a solution that alters the solubility of another species (e.g., the active form of the redox mediator) in that solution. In some cases, the phase transfer catalyst affects the solubility/partition equilibrium of the active form of the redox mediator such that an increased amount of the active form of the redox mediator transfers from the solution of the first fluid stream to the solution of the second fluid stream when the two solutions come into contact. In some cases, the phase transfer catalyst is a salt comprising an ion, the presence of which increases the solubility of the active form of the redox mediator in the solution in which the phase transfer catalyst is dissolved. For example, in some cases, the redox mediator is anthraquinone-2,7,-disulfonate, and the active form of the redox mediator is the corresponding hydroquinone of the anthraquinone-2,7,-disulfonate. Solubility of the hydroquinone of the anthraquinone-2,7,-disulfonate may be relatively low in the solution of the second fluid stream (e.g., an organic solution) in the absence of a phase transfer catalyst. However, the introduction of a phase transfer catalyst comprising a counter-cation that can form a soluble salt (i.e., soluble in the solution of the second fluid stream) of the hydroquinone of the anthraquinone-2,7,-disulfonate may vary the partition equilibrium of the hydroquinone of the anthraquinone-2,7,-disulfonate such that the amount transferred into the solution of the second fluid stream is increased compared to the case where the phase transfer catalyst comprising the counter cation is absent. In some cases, the phase transfer catalyst is an alkylammonium salt. The alkylammonium cation may, in some embodiments, form a salt with the active form of the redox mediator that is relatively soluble in the solution of the second fluid stream, especially compared to the case in which the alkylammonium salt is absent. Examples of suitable alkylammonium ions include tetramethyl ammonium ions, trimethylalkylammonium ions, tetraethyl ammonium ions, tetrapropylammonium ions, tetrabutylammonium ions, tetraalklyammonium ions having at least two (or three, or four) different alkyl (or phenyl, or alky and phenyl) substituents bound to the ammonium nitrogen, and/or ammonium ions comprising aryl groups such as phenyl groups. Examples of alkylammonium salts that may serve as suitable phase transfer catalysts include, but are not limited to, alkylammonium halides, (e.g., alkylammonium chlorides, alkylammonium bromides, alkylammonium iodides), alkylammonium nitrates, and alkylammonium perchlorates.

In some, but not necessarily all embodiments, the reaction takes place between the active form of the redox mediator and a reactant dissolved in the solution of the second fluid stream to form the chemical product. In some embodiments, such a reaction occurs without appreciable transfer of the active form of the redox mediator from the solution of the first fluid stream to the solution of the second fluid stream. Such a reaction may occur essentially completely at the interface between the solution of the first fluid stream and the solution of the second fluid stream when the two solutions are contacted (e.g., when the solution of the first stream is essentially immiscible with the solution from the second stream). For example, when the solution of the first fluid stream and the solution of the second fluid stream are contacted (e.g., mixed), they may form a temporary emulsion, at which time the active form of the redox mediator reacts with the reactant at interfaces between the dispersed, essentially immiscible solutions of the emulsion.

In some embodiments, the electrochemical flow system comprises a first module fluidically connected to the electrochemical cell. For example, referring to FIG. 1A, system 100 comprises first module 110 fluidically connected to the electrochemical cell 140. The first module may comprise a first inlet, a first outlet, a second inlet, and a second outlet. Some embodiments comprise transporting the first fluid stream to the first module. In some cases, the system is configured to flow the first fluid stream from the first outlet of the electrochemical cell to the first inlet of the first module. For example, in some embodiments, system 100 is configured such that portion of first fluid stream 112*a* can be flowed from the first outlet of electrochemical cell 140 to the first inlet of the first module 110. It should be noted that inlets and/or outlets are indicated in FIG. 1A and other figures such as FIGS. 1B, 2A-2C, 3, and 4 as the small squares into which and/or from which the arrows representing fluid streams or portions of fluid streams point. Such configurations can, in some cases, include ones in which the first outlet of the electrochemical cell and the first inlet of the first module are fluidically connected via a conduit (e.g., a tube, a pipe, a channel, etc.). In some cases, the first fluid stream can flow through the conduit. Similarly, other components (e.g., other modules) of the system described herein that are fluidically connected may also be fluidically connected via a conduit.

In some cases, the step of transporting the first fluid stream to the first module fluidically connected to the electrochemical cell is performed in such a manner that the step of contacting the solution from the first fluid stream with the solution from the second fluid stream occurs in the first module. For example, referring to FIG. 1A, portion of first fluid stream 112a can be flowed from electrochemical cell 140 to first module 110 while portion of second fluid stream 122a is flowed into the second inlet of first module 110, such that the solution of first fluid stream 112 and the solution of second fluid stream 122 are contacted in first module 110. This can be accomplished by having the first module be configured to contact solution from the first fluid stream with the solution from the second fluid stream, including in cases in which the solution from the first stream is essentially immiscible with the solution from the second fluid stream. The first module may, in some but not necessarily all embodiments, be configured such that contacting solution from the first fluid stream with solution from the second fluid stream results in at least a portion of the active form of the redox mediator being transferred from the first fluid stream to the second fluid stream, as described above (e.g., via mixing of the two solutions). For example, referring to FIG. 1A and in accordance with certain embodiments, portion of first fluid stream 112a and portion of second fluid stream 122a are flowed into first module 110 and are contacted with each other, such that outgoing portion of first fluid stream 112b comprises a lower concentration of the active form of the redox mediator (e.g., the reduced form of the mediator, such as the hydroquinone form of an anthraquinone) than portion of first fluid stream 112a, and portion of second fluid stream 112b comprises a higher concentration of the active form of the redox mediator than portion of second fluid stream 122a.

Similarly, the first module may be configured such that contacting solution from the first fluid stream with solution from the second fluid stream results in at least a portion of the non-active form of the redox mediator being transferred from the second fluid stream to the first fluid stream, as described above (e.g., via mixing of the two solutions). For example, referring to FIG. 1A and in accordance with certain embodiments, portion of first fluid stream 112a and portion of second fluid stream 122a are flowed into first module 110 and are contacted with each other, such that outgoing portion of first fluid stream 112b comprises a higher concentration of the non-active form of the redox mediator (e.g., the oxidized form of the mediator, such as the quinone form of an anthraquinone) than portion of first fluid stream 112a, and portion of second fluid stream 122b comprises a lower concentration of the non-active form of the redox mediator than portion of second fluid stream 122a.

Figure 10:
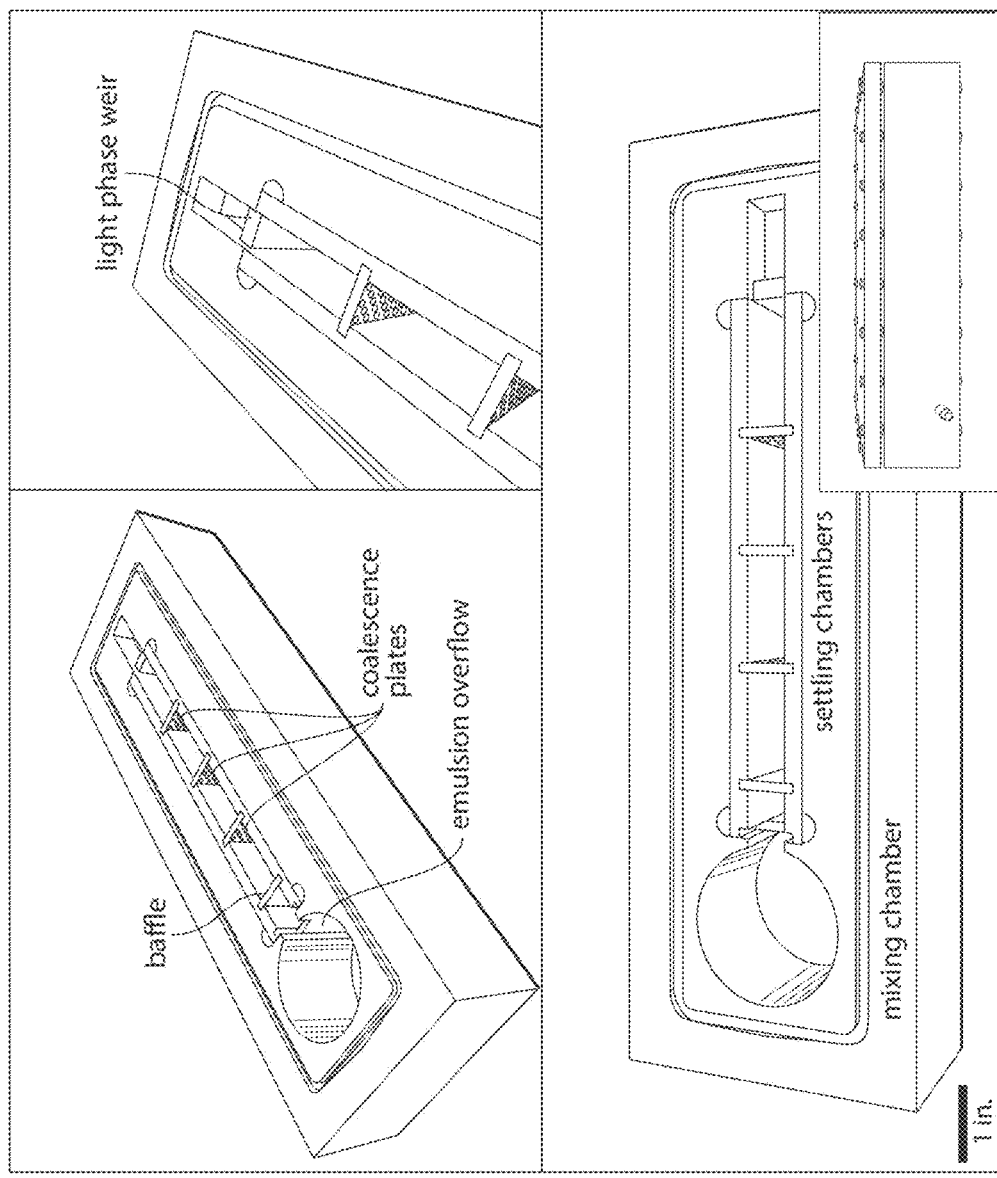
FIG. 10 shows a 3D illustration of an exemplary mixer-settler, according to certain embodiments.

One non-limiting case in which the first module is configured to contact solution from the first fluid stream with the solution from the second fluid stream is the case in which the first module is or comprises a mixer-settler. For example, in some cases, first module 110 is a mixer settler. A mixer-settler is an apparatus capable of mixing and then separating essentially immiscible liquids. A mixer-settler may comprise two zones: a first zone where the essentially immiscible liquids (e.g., the solution of the first stream and the solution of the second stream) are contacted and mixed (the "mixer"), and a second zone where the essentially immiscible liquids are phase-separated (the "settler"). Mixing of the essentially immiscible liquids in the mixer may be an active process where, for example, an agitator such as a mechanical agitator brings the essentially immiscible liquids into contact and disturbs them in such a way that they are mixed (e.g., via stirring with a motorized agitator). However, mixing of the essentially immiscible liquids in the mixer may be a passive process in which the liquids are flowed into the mixer (e.g., via a first inlet and a second inlet) and caused to mix simply by both filling the mixer simultaneously. Phase separation of the essentially immiscible liquids in the settler zone may occur, for example, by flowing the mixed essentially immiscible liquids along a path such that gravity causes the more dense liquid to settle at the bottom phase in the list of liquid to settle as a top phase. Phase separation can be accelerated by including objects such as coalescence plates in the path of the mixed liquids settler zone. Separate streams, one comprising essentially only one of the essentially immiscible liquids, and the other stream comprising essentially only the other essentially immiscible liquid, can be flowed out of a mixer-settler by positioning a first outlet in the settler zone at a location where the first outlet contacts only one of the essentially immiscible liquids, and a second outlet positioned at a location where the second outlet contacts the other essentially immiscible liquid. For example, in the case where two essentially immiscible liquids phase-separate in a settler zone by gravity (e.g., in the case where the two essentially immiscible liquids have different densities), a first outlet can be positioned in the settler zone above the interface of the two liquids, and a second outlet can be positioned in the settler zone below the interface of the two liquids. In such a way, when the phase-separated mixture of the two essentially immiscible liquids flows toward the first outlet and the second outlet, the less dense liquid can flow out of the first outlet in the more dense liquid can flow out of the second outlet. FIG. 10 shows an illustration of an exemplary mixer-settler (with another view inset), in accordance with certain embodiments.

Figure 21:
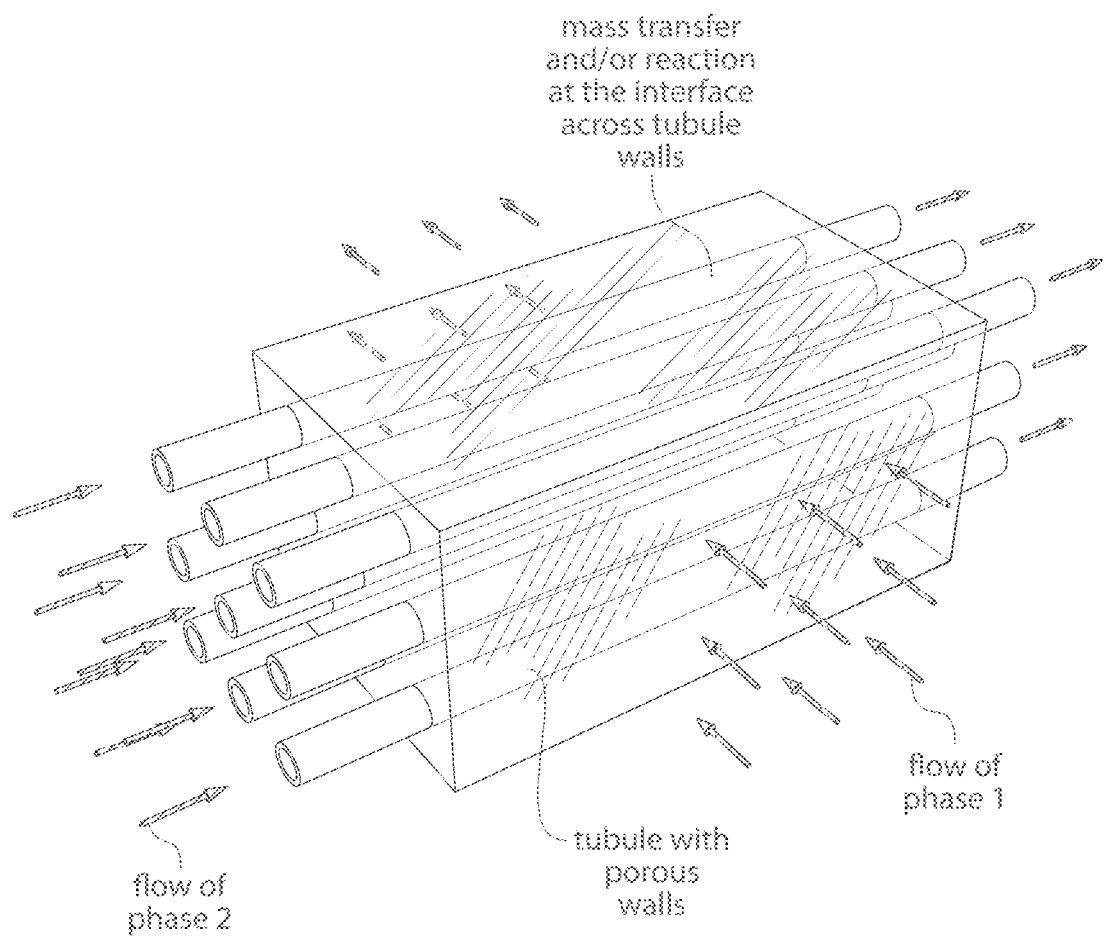
FIG. 21 depicts a 3D schematic illustration of an exemplary module comprising one or more tubules comprising porous walls, in accordance with certain embodiments.

Another non-limiting case in which the first module is configured to contact solution from the first fluid stream with the solution from the second fluid stream is the case in which the first module comprises one or more tubules (e.g., hollow tubules) comprising porous walls. For example, referring to FIG. 1A, first module 110 can be an apparatus comprising one or more hollow tubules comprising porous walls, in accordance with certain embodiments. In such case, solution from the first fluid stream can be contacted with solution with the second fluid stream by causing solution from one of the streams (e.g., the first fluid stream) to flow through the one or more tubules comprising porous walls, while flowing solution from the other fluid stream (e.g., solution from the second stream) through a portion of the first module such that it is in contact with the exterior of the one or more porous tubules while not flowing through the one or more porous tubules. In such a way, solution from the first fluid stream and solution from the second fluid stream can come into contact via the porous walls of the one or more tubules without mixing. In some embodiments, mass transfer and/or reaction can occur at the interface across the tubules, while the tubule walls enforce phase separation between the solution of the first stream and the solution of the second stream. FIG. 21 depicts a three-dimensional illustration of an exemplary first module comprising one or more tubules comprising porous walls, in accordance with certain embodiments. In some cases, the first fluid stream and the second fluid stream can be flowed in different directions (e.g., in orthogonal directions, or in an anti-parallel direction), while in other cases, the first fluid stream and the second fluid stream can be flowed in the same direction (e.g., a parallel direction) while being separated by the walls of the one or more tubules comprising porous walls). The first inlet, second inlet, first outlet, and second outlet can be positioned in some such first modules such that one solution flows through an inlet, through the interior of the one or more hollow tubules comprising porous walls, and out an outlet, while the other solution flows through the other inlet, through the apparatus while coming into contact with the exterior of the one or more tubules, and out the other outlet. Either the first fluid stream or the second fluid stream can be the fluid stream flowed through the interior of the one or more tubules, depending on the desired configuration. The hollow tubules can be made out of any suitable material, depending on the respective solvents used for the solutions of the first and second streams, provided that the hollow tubules allow for interfacial exchange of species (e.g., dissolved species such as the redox mediator) without allowing for significant crossover of solvents (e.g., from inside the tubule to outside the tubule, or outside to the tubule to inside the tubule).

In some embodiments, the hollow tubules comprise or are made of porous polymers. Examples of polymers that, when made to be porous, can be suitable depending on the solvents used, include, but are not limited to, polytetrafluoroethylene (PTFE) and polyvinylidene fluoride (PVDF). In some cases, the walls of the hollow tubules are or comprise cellulosic or chitosan membranes. In certain embodiments, the walls of the hollow tubules comprise two or more layers, with an interior layer made of or comprising a material (e.g., a polymer) that can be wetted the solution of the fluid stream flowing through the interior of the hollow tubule but not the solution of the fluid stream flowing along the exterior of the hollow tubule, and an exterior layer made of or comprising a material (e.g., a polymer) that can be wetted by the solution of the fluid stream flowing along the exterior of the hollow tubule but not the solution of the fluid stream flowing through the interior of the hollow tubule. Such a configuration may allow for the formation of an interface (e.g., in the wall of the hollow tubule) between the solution inside the hollow tubule and the solution outside the hollow tubule through which species may be transferred or react.

In certain embodiments, the system comprises a reactant reservoir. A reactant reservoir is any suitable vessel (e.g., container, tank) that can contain a fluid comprising a reactant capable of reacting with the active form of the redox mediator to generate the chemical product. In some embodiments, the reactant reservoir comprise an outlet, which is fluidically connected to the second inlet of the first module. For example, referring to FIG. 1B, system 100 comprises reactant reservoir 160, which comprises an outlet fluidically connected to the second inlet of first module 110 (e.g., comprising a mixer-settler or a hollow tubule comprising a porous wall). In some, but not necessarily all embodiments, the system is configured such that the second fluid stream can be flowed from the reactant reservoir to the first module, with the second fluid stream comprising a solution comprising the reactant. The first module may be configured to contact solution from the first fluid stream (e.g., comprising the active form of the redox mediator) with solution from the second fluid stream (e.g., comprising a solution comprising the reactant). For example, in some cases, portion of second fluid stream 122a, comprising a solution comprising a reactant capable of reacting with the active form of the redox mediator to generate the chemical product, is flowed from the outlet of reactant reservoir 160 to the second inlet of first module 110, while portion of first fluid stream 112a, comprising a solution comprising the active form of the redox mediator, is flowed from electrochemical cell 140 to first module 110, and solution of the second fluid stream and solution of the first fluid stream are contacted in first module 110 (e.g., a mixer settler) such that the active form of the redox mediator reacts with the reactant to form the chemical product. As described above, in some cases, the solution of the first fluid stream is essentially immiscible with the solution of the second fluid stream. Configurations in which the system comprises a reactant reservoir fluidically connected to the first module may be useful in embodiments in which the reaction between the active form of the redox mediator and the reactant occurs at an interface between the solution of the first fluid stream and solution of the second fluid stream, without appreciable transfer of even a portion of the redox mediator from solution of the first fluid stream to solution of the second fluid stream, or from solution of the second fluid stream to solution of the first fluid stream, as described above. In certain embodiments, fluid streams (e.g., the second fluid stream) flowed from the reactant reservoir comprise the reactant but do not comprise a significant concentration of redox mediator or other dissolved species (e.g., less than or equal to 100 µM, less than or equal to 10 µM, less than or equal to 1 µM, or less). Such embodiments, may be useful for generating the chemical product in the solution of the second fluid stream (e.g., after contacting the solution of the second fluid stream with solution of the first fluid stream in the first module), with the solution of the second fluid stream having a relatively low concentration of contaminants or redox mediator, thereby reducing or eliminating a need for further downstream purification of the chemical product. In some cases, the second fluid stream, after contacting the first fluid stream in the first module, can be recycled back into the first module (optionally via passing through the reactant reservoir). Such recycling of the fluid stream may be useful in cases in which not all of the reactant in the solution of the second fluid stream reacts with active redox mediator in the first fluid stream during a first (or second, or third, etc.) pass through the first module.

In some embodiments in which at least a portion of the active form of the redox mediator is passed to the second fluid stream, the methods described herein comprise, after the step of transferring at least a portion of the active form of the redox mediator to the second fluid stream, contacting solution from the second fluid stream comprising the active form of the redox mediator with solution from a third fluid stream. For example, after a portion of the first fluid stream contacts a portion of the second fluid stream (e.g., in the first module, such as a mixer-settler) such that at least a portion of the active form of the redox mediator is transferred to a portion of the second fluid stream, that portion of the second fluid stream may subsequently contact solution from a third fluid stream. In some embodiments, the third fluid stream comprises a reactant. For example, referring to FIG. 2A, third fluid stream 132 comprises a reactant, in accordance with certain embodiments. In some cases, the solution of the third fluid stream comprises a reactant capable of reacting with the active form of the redox mediator to produce the chemical product. For example, in some cases the reactant (e.g., the reactant in the solution of the fluid stream) is oxygen gas ($O_2$). In some cases the reactant is $O_2$ and the active form of the redox mediator is the reduced form of an anthraquinone (e.g., the hydroquinone form of an optionally-substituted anthraquinone such as anthraquinone-2,7-disulfonate). In some cases, the chemical product produced is hydrogen peroxide. Oxygen gas is capable of reacting with the reduced form of an anthraquinone to form hydrogen peroxide. In some cases, the reaction between the active form of the redox mediator and the reactant is selective for the chemical product. For example, in general, reduction of oxygen gas can form a variety of products, including $H_2O$ and hydrogen peroxide; however, the reaction between oxygen gas and the reduced form of quinones such as anthraquinones is selective for the production of hydrogen peroxide (because the reduced form of quinones, hydroquinones, are capable of donating only two electrons and two protons).

In some cases, contacting solution from the second fluid stream comprising the active form of the redox mediator with solution from the third fluid stream comprising the reactant facilitates the reaction between the reactant and the active form of the redox mediator. Such a reaction may result in the formation of the chemical product (e.g., hydrogen peroxide) in the solution of the third fluid stream. Producing the chemical product any third fluid stream, separate from the first fluid stream and/or the second fluid stream, may have a variety of benefits. For example, the third fluid stream may comprise a solution for which it is desirable to have the chemical product contained, while it may be undesirable for the chemical product to be produced in the solutions of the other fluid streams (e.g., the first fluid stream, the second fluid stream). For example, in some cases, the solution of the third fluid stream is water. In some cases, the water of the third fluid stream contains a relatively small amount of contaminants or other undesirable species such as a supporting electrolyte. In some cases, the solution of the third fluid stream has a relatively mild pH (e.g., a pH in the range of from 5-7). In some embodiments, hydrogen peroxide is formed in water of the third stream (e.g., following a reaction between the active form of the redox mediator and oxygen gas when the solution of the second fluid stream and the solution of the third fluid stream or in contact). For certain applications, solutions of hydrogen peroxide in water that contain a relatively small amount of contaminants such as ionic species (e.g., supporting electrolyte) are desirable. For example, when using aqueous solutions of hydrogen peroxide for treating water (e.g., waste water), it is undesirable to have a significant amount of contaminants such as other ionic species. As mentioned above, in certain embodiments, the first fluid stream is used for the electrochemical generation of the active form of a redox mediator; therefore, the solution of the first fluid stream typically contains supporting electrolyte (e.g., ionic species). Therefore, it is undesirable to form the chemical product (e.g., hydrogen peroxide) directly in the solution of the first fluid stream. Similarly, in some cases, the second fluid stream comprises an organic solution, which may be an undesirable solvent for the chemical product for certain applications (such as the use of hydrogen peroxide for treating water). The system described herein, therefore, provides for an efficient and effective process for forming the chemical product separate from other undesirable species.

In some cases, a relatively high concentration of the chemical product is produced in the third fluid stream (e.g., following the contacting of the third fluid stream comprising the reactant with the second fluid stream comprising the active form of the redox mediator). In some embodiments, the solution of the third stream (e.g., after contacting the solution of the second stream comprising the active form of the redox mediator), comprises at least 1.0 mM, at least 2.0 mM, at least 5.0 mM, at least 10 mM, at least 15 mM, at least 20 mM or more, and/or up to 1 M, up to 0.75 M, up to 0.5 M, up to 0.25 M, up to 0.1 M, up to 0.075 M, up to 50 mM, or less of the chemical product (e.g., $H_2O_2$). Combinations of these ranges are possible. For example, in some embodiments, the solution of the third stream (e.g., after contacting the solution of the second stream comprising the active form of the redox mediator), comprises at least 1.0 mM and up to 1 M, or at least 20 mM and up to 0.25 M of the chemical product (e.g., $H_2O_2$). Other ranges are possible.

In some embodiments, the portion of the solution of the third stream that is contacted with the solution of the second stream comprising the active form of the redox mediator comprises the reactant prior to the contact between the two solutions. For example, the reactant may be introduced (e.g., dissolved or mixed into) the solution of the third stream prior to the solution of the third stream coming into contact with the solution of the second stream. For example, when the reactant is oxygen gas, the solution of the third fluid stream may be sparged with oxygen gas prior to it coming into contact with the second fluid stream. In some embodiments, the reactant is introduced to the portion of the solution of the third stream that is contacted with the solution of the second stream comprising the active form of the redox mediator simultaneous with the contacting of the two solutions. For example, when the reactant is oxygen gas, the solution of the third fluid stream and/or the solution of the second fluid stream may be sparged with oxygen gas while the solution of third fluid stream and the solution of the second fluid stream are contacted. In such a way, the reaction between the reactant in the active form of the redox mediator may be a triphasic reaction (e.g., a reaction between an aqueous phase, and organic phase, and a gas phase).

In some embodiments, the solution of the second fluid stream is essentially immiscible with the solution from the third fluid stream. For example, in some embodiments, the solution of the third fluid stream is aqueous, while the solution from the second fluid stream comprises an organic liquid that is essentially immiscible with water. In using essentially immiscible solutions in such a way, apparatuses such as mixer-settlers and/or apparatuses comprising one or more hollow tubules comprising porous walls may be configured and used for contacting the solution of the second fluid stream and the solution of the third fluid stream.

In some embodiments, at least a portion of the active form of the redox mediator is transferred from the solution of the second fluid stream to the solution of the third fluid stream when the two solutions are contacted. The degree to which the active form of the redox mediator (and/or the non-active form of the redox mediator) is transferred from the solution of the second fluid stream to the solution of the first fluid stream depends on the partition equilibrium of the active form of the redox mediator between the solution of the second fluid stream and the first fluid stream. Similarly to as discussed above in the case of the transfer of the redox mediator from the first fluid stream to the second fluid stream, inclusion of phase transfer catalysts, either in the second fluid stream or the third fluid stream, may affect the partition equilibria and therefore the degree of transfer of the redox mediator between solutions.

In certain embodiments, the active form of the redox mediator is not transferred from the solution of the second fluid stream to the solution of the third fluid stream when the two solutions are contacted. In other words, the concentration of the active form of the redox mediator in the third fluid stream the solution of the third fluid stream is contacted with the solution of the second fluid stream is essentially the same as the concentration the active form of the redox mediator and the solution of the third fluid stream before it is contacted with the solution of the second fluid stream. In some cases, the concentration of the active form of the redox mediator in the solution of the third fluid stream is negligible (e.g., less than or equal to 1 mM, less than or equal to 0.1 mM, less than or equal to 10 µM, less than or equal to 1.0 µM, or less) both before and after the solution of the third fluid stream is contacted with a solution of the second fluid stream comprising the active form of the redox mediator. Similarly, the non-active form of the redox mediator, if present, is not transferred from the solution of the second fluid stream to the solution of the third fluid stream with the two solutions are contacted. As discussed above, in certain applications, it is beneficial for the chemical product to be produced in the third fluid stream, wherein the solution of the third fluid stream is relatively free of contaminants. By avoiding transfer of the redox mediator (either in its active or non-active forms), relatively pure and commercially desirable solutions of the chemical product can be produced.

In some embodiments in which the active form of the redox mediator reacts with a reactant without the transfer of at least a portion of the active form of the redox mediator from the solution of the second fluid stream to the solution of the third fluid stream, the reaction may take place at the interface between the solution of the second fluid stream and the solution of the third fluid stream as they are contacted (e.g., in biphasic or triphasic reaction).

Figure 2A:
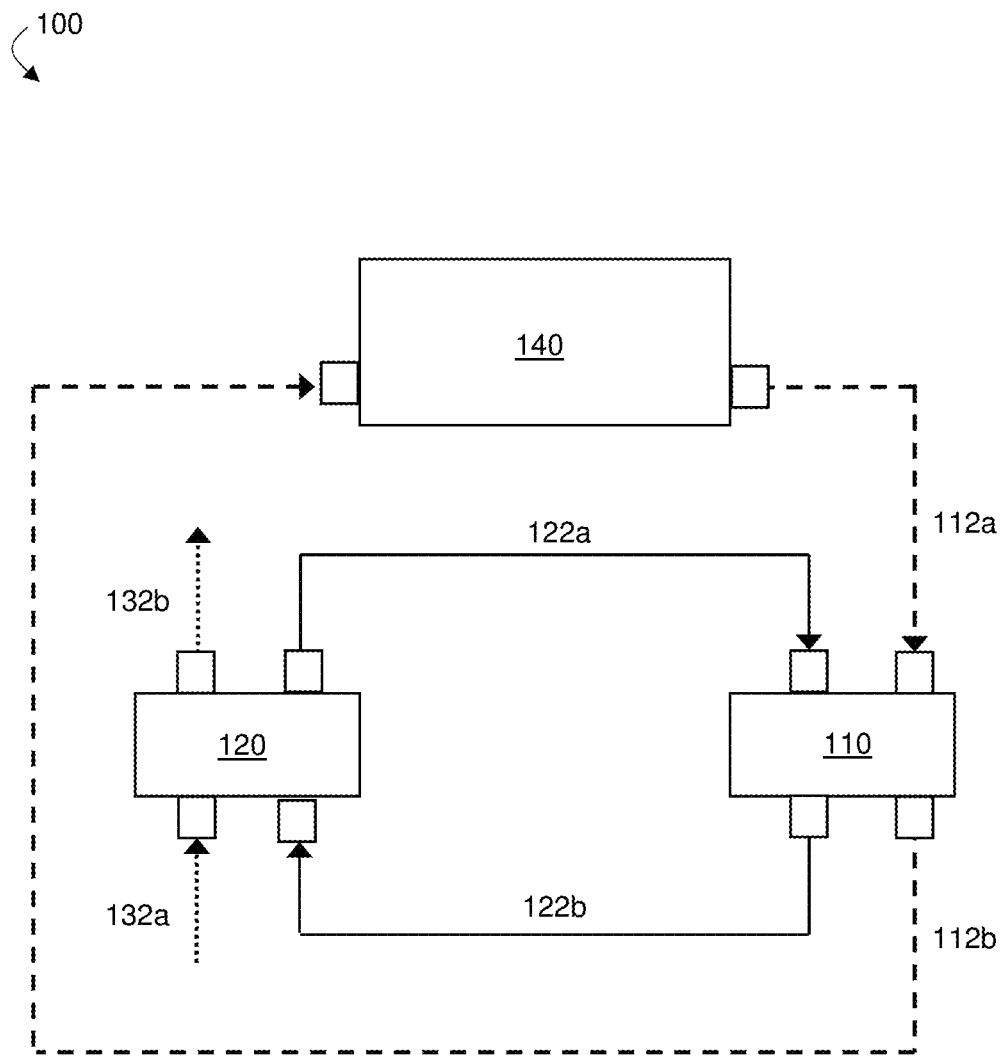
FIG. 2A shows an exemplary schematic of an electrochemical flow system, according to certain embodiments.

In some embodiments, the electrochemical flow system comprises a second module fluidically connected to the first module. For example, referring to FIG. 2A, system 100 comprises second module 120, in accordance with certain embodiments. The second module may comprise a first inlet, a first outlet, a second inlet, and a second outlet. In some cases, the system is configured to flow the second fluid stream from the second outlet of the first module to the first inlet of the second module. In some such cases, the second outlet of the first module is fluidically connected to the first inlet of a second module. In some embodiments, system 100 is configured such that portion of second fluid stream 122b can be flowed from the second outlet of first module 110 to the first inlet of second module 120, as shown in FIG. 2A, in accordance with certain embodiments.

In some embodiments, the second module is configured to contact solution from the second fluid stream with solution from a third fluid stream. As such, some methods comprise transporting the second fluid stream from the first module to a second module fluidically connected to the first module such that the step of contacting the solution from the second fluid stream with the solution from the third fluid stream occurs in the second module. For example, referring to FIG. 2A, in some embodiments, portion of second fluid stream 122b (e.g., comprising the active form of the redox mediator) is flowed from the second outlet of first module 110 to the first inlet of second module 120, while portion of third fluid stream 132a is flowed into the second inlet of second module 120, such that portion of second fluid stream 122b contacts portion of third fluid stream 132a. In some embodiments, the third fluid stream is flowed through the second module. For example, in some embodiments, the system is configured to flow the third fluid stream from the second inlet of the second module to the second outlet of the second module. For example, referring to FIG. 2A, third fluid stream 132 is flowed from the second inlet of second module 120 to the second outlet of second module 120. In flowing the second fluid stream and the third fluid stream into the second module, second module can be used to facilitate contact between solutions of the second fluid stream and the third fluid stream, as described above. During such contact in the second module, a chemical reaction between a reactant in the third fluid stream and the active form of the redox mediator in the second fluid stream can occur, resulting in the formation of a chemical product (e.g., hydrogen peroxide). In some embodiments, the second module is or comprises a mixer-settler, as described above. For example, referring to FIG. 2A, second module 120 is a mixer-settler, in accordance with certain embodiments. The use of a mixer-settler may be useful in cases in which the solution of the second fluid stream is essentially immiscible with the solution of the third fluid stream. In some embodiments, the second module comprises a hollow tubule comprising a porous wall. For example, in some cases, the second module is an apparatus comprising a hollow tubule similar to the one described for the first module above.

Figure 2B:
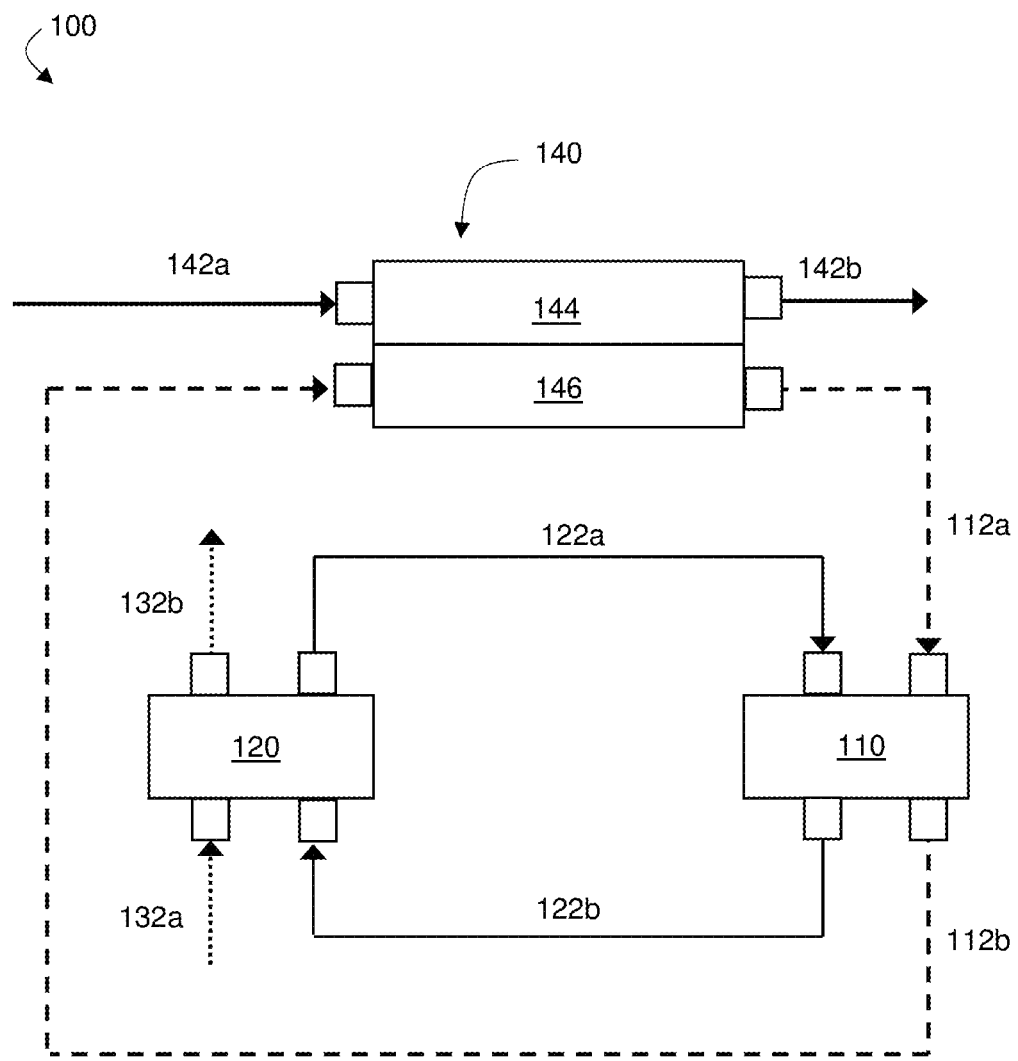
FIG. 2B shows an exemplary schematic of an electrochemical flow system, according to certain embodiments.
Figure 2C:
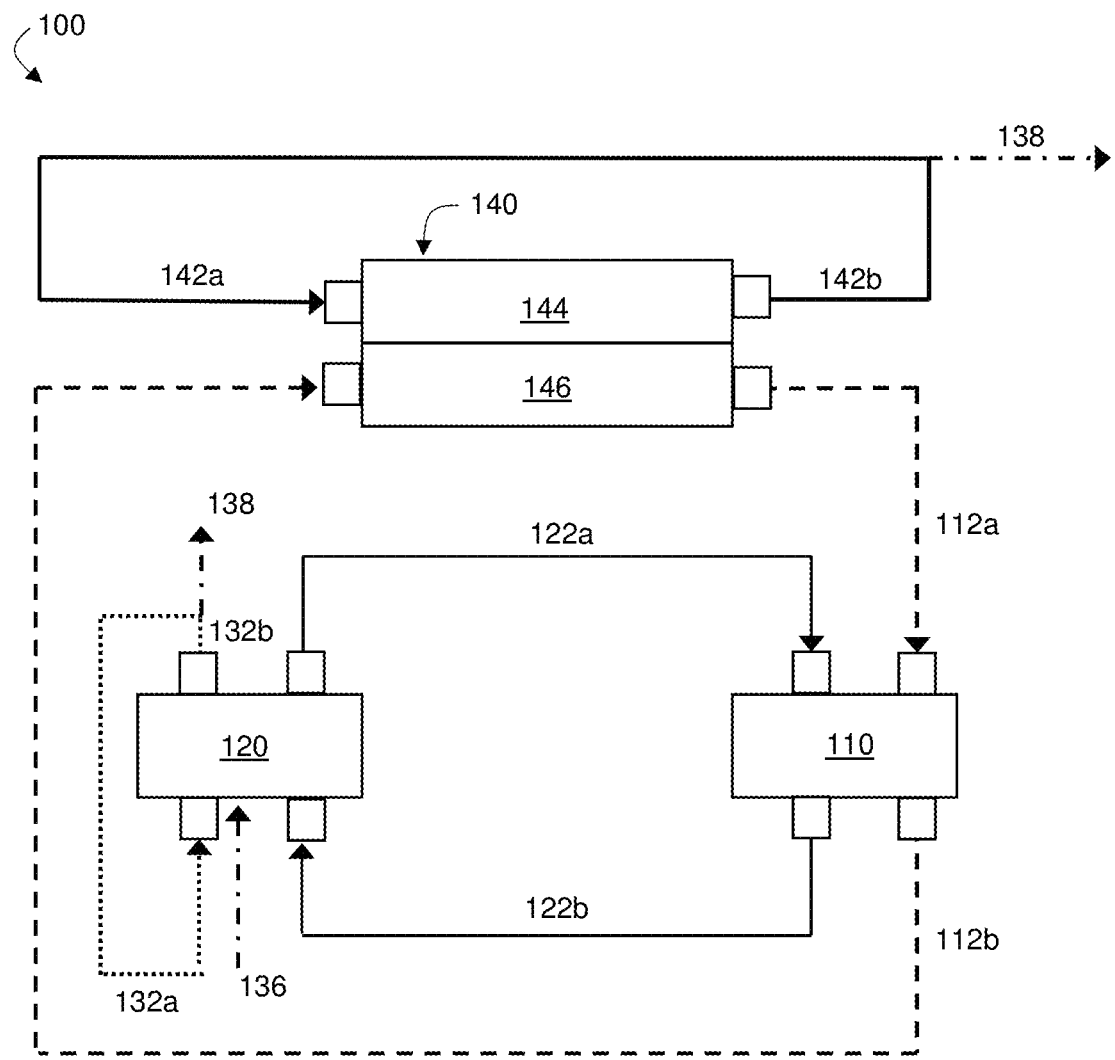
FIG. 2C shows an exemplary schematic of an electrochemical flow system, according to certain embodiments.
Figure 12:
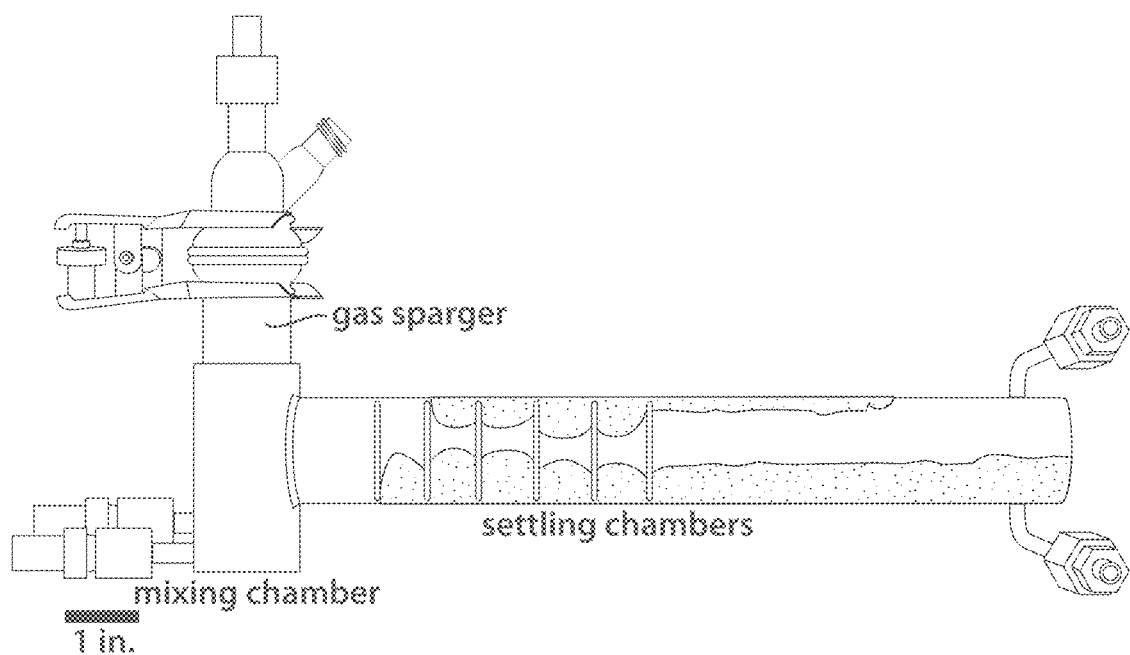
FIG. 12 shows an illustration of an exemplary mixer-settler, according to certain embodiments.

As mentioned above, in some cases, the reactant is introduced into a portion of the solution of the third fluid stream while that portion is contacting a portion of the solution of the second fluid stream (e.g., sparging the solutions with the gas such as oxygen while they are in contact). In some such embodiments, the third fluid stream is exposed to the reactant in the second module. For example, in some embodiments, a stream comprising the reactant is flowed into the second module while the third fluid stream and the second fluid stream are also flowed into the second module, such that the third fluid stream is exposed to the reactant in the second module. In one such case, a gas stream (e.g., comprising a gaseous reactant such as oxygen gas) is flowed into the second module (e.g., a mixer-settler) at the same time that the third fluid stream and the second fluid stream are flowed into the second module. FIG. 2C depicts an illustration of one such embodiment, where gas stream 136 (e.g., oxygen gas) is flowed into second module 120 while portion of third fluid stream 132a and portion of second fluid stream 122b are flowed into the second module 120. In some cases, the second module is a mixer-settler designed to input a reactant stream that is separate from the second fluid stream and the third fluid stream, and can even support such a triphasic reaction. FIG. 12 shows an illustration of one such mixer-settler, which described in more detail in Example 2 below. In some cases, excess reactant (e.g., excess oxygen gas) may still be present in the third fluid stream, even after the solution of third fluid stream has come into contact with solution of the second fluid stream comprising the active form of the redox mediator. In some cases, the system is configured to remove excess reactant from the portion of the third fluid stream flowed out of the second module. In some cases, a surge tank is used to degas the third fluid stream after it is flowed out of the second module. For example, FIG. 2C shows one such embodiment, where gas stream 138 is removed from portion of third fluid stream 132b, which comprises the chemical product and excess gaseous reactant.

In some cases, one or more of the fluid streams of the electrochemical flow system are recycled. A recycled fluid stream may exit a first component of the system (e.g., the electrochemical cell, the first module, the second module, etc.), be transported through one or more other components of the system (where processes such as the phase transfer of redox mediators and/or chemical reactions involving species in the fluid stream may occur), and subsequently return to first component of the system. In such a way, a recycled fluid stream forms a continuous loop (e.g., a "looped" configuration).

In some embodiments, the first fluid stream described herein is recycled during the electrochemical flow process. In some cases, the system is configured to transport the first fluid stream out of and back into the electrochemical cell. In such a way, it is possible to transport solution from the first fluid stream that has already contacted solution from the second fluid stream back into the electrochemical cell. For example, in some embodiments, the system is configured to flow the first fluid stream from the first outlet of the electrochemical cell to the first inlet of the first module, and to flow the first fluid stream from the first outlet of the first module to the first inlet of the electrochemical cell. This can be accomplished, in some cases, by having the first outlet of the first module be fluidically connected to the first inlet of the electrochemical cell. For example, referring to FIG. 2A, system 100 can be configured to flow portion of first fluid stream 112a from the first outlet of electrochemical cell 140 to the first inlet of first module 110, and also flow portion of first fluid stream 112b from the first outlet of first module 110 to the first inlet of the electrochemical cell 140.

Such recycling of the first fluid stream may allow for continuous regeneration of the active form of the redox mediator in the solution of the first fluid stream. For example, in some embodiments, the first fluid stream comprising the active form of the redox mediator (e.g., an aqueous catholyte solution comprising the hydroquinone form of an optionally-substituted anthraquinone) exits the electrochemical cell and is flowed into the first module (e.g., a mixer settler), where solution from the first fluid stream contacts solution from the second fluid stream comprising the non-active form of the redox mediator (e.g., an essentially immiscible organic solution containing the quinone form of an optionally-substituted anthraquinone), resulting in the transfer of the active form of the redox mediator from the first fluid stream to the second fluid stream, and the transfer of the non-active form of the redox mediator from the second fluid stream to the first fluid stream). The first fluid stream, now comprising the non-active form of the redox mediator, exits the first module and is returned to the electrochemical cell, where the active form of the redox mediator can be regenerated (e.g., by applying an electrical potential to the first electrode in contact with solution of the first fluid stream), thereby completing a cycle.

In some embodiments, the second fluid stream described herein is recycled during the electrochemical flow process. In some cases, the system is configured to flow the second fluid stream from the first module to the second module and then back to the first module. In such a way, it is possible to transport solution from the second fluid stream that has already contacted solution from the third fluid stream back into first module, such that the solution from the second fluid stream that has already contacted solution from the third fluid stream contacts solution from the first fluid stream comprising the active form of the redox mediator. For example, in some embodiments, the system is configured to flow the second fluid stream from the first outlet of the second module to the second inlet of the first module, and then flow the second fluid stream from the second outlet of the first module back to the first inlet of the second module. Such a configuration can be achieved, for example, by having the first outlet of the second module be fluidically connected to the second inlet of the first module. As depicted by FIG. 2A, system 100 can be configured to flow portion of second fluid stream 122a from the first outlet of second module 120 to the second inlet of first module 110, and also flow portion of second fluid stream 122b from the second outlet of first module 110 to the second inlet of the second module 120.

Such recycling of the second fluid stream may allow for continuous regeneration of the non-active form of the redox mediator in the portion the first fluid stream exiting the first module. For example, in some embodiments, the second fluid stream exits the first module comprising the active form of the redox mediator (e.g., an organic solution comprising the hydroquinone form of an optionally-substituted anthraquinone) and is flowed into the second module (e.g., a mixer-settler), where solution from the second fluid stream contacts solution from the third fluid stream comprising reactant (e.g., an essentially immiscible aqueous containing oxygen gas), resulting in a reaction between the active form of the redox mediator and the reactant, thereby producing the chemical product (e.g., hydrogen peroxide) and regenerating the non-active form of the redox mediator in the solution of the second stream. The second fluid stream, now comprising the non-active form of the redox mediator, exits the second module and is returned to the first module, where the non-active form of the redox mediator can be transferred to the solution of the first fluid stream, and the active form of the redox mediator can be transferred from the first fluid stream to the second fluid stream, thereby completing a cycle.

In some embodiments, the third fluid stream described herein is recycled during the electrochemical flow process. In some cases, the system is configured to flow the third fluid stream from the second outlet of the second module to the second inlet of the second module. In such a way, the third fluid stream may enter the second module (e.g., via the second inlet of the second module), flow through the second module and exit and second module (e.g., via the second outlet), and then flow back and re-enter the second module. For example, referring to FIG. 2C, system 100 can be configured to flow portion of third fluid stream 132a from the first inlet of second module 120 to the second outlet of second module 120, and to flow portion of third fluid stream 132b from the second outlet of first module 110 back to the second inlet of second module 120. In some cases, portion of third fluid stream 132b may be converted back to portion of third fluid stream 132a (i.e., not necessarily in terms of composition, but rather in terms of function, as an input stream for the second module) via the removal of a species, such as via the removal of excess reactant (e.g., excess $O_2$ gas) via, for example, gas stream 138. In some cases, the reactant can be continuously introduced into the third fluid stream as the third fluid stream is recycled in the system. For example, in some embodiments, gas stream 136 comprising a reactant is flowed into second module 120 while third fluid stream 132 is flowed in recycled through second module 120, thereby continuously introducing reactant into third fluid stream 132.

Such recycling of the third fluid stream may allow for accumulation of the chemical product in the third fluid stream. In certain cases, accumulating the chemical product in the third fluid stream (e.g., by recycling the third fluid stream during operation of the electrochemical flow system in a "looped" configuration) is desirable, particularly in cases in which high concentrations of the chemical product are desired. High concentrations can be achieved with this looped configuration because with each pass of the third fluid stream through the second module, the third fluid stream can be exposed to additional reactant and contacted with solution from the second fluid stream comprising the active form of the redox mediator, thereby generating even more chemical product in the third fluid stream via the reaction of the additional reactant and redox mediator. An exemplary process may involve flowing the third fluid stream (e.g., an aqueous solution comprising a relatively low concentration or an absence of other ionic species) into the second module (e.g., a mixer-settler), and contacting the third fluid stream with solution from the second fluid stream comprising the active form of the redox mediator (e.g., an essentially immiscible organic solution comprising the hydroquinone form of an optionally-substituted anthraquinone) while simultaneously introducing a stream comprising a reactant (e.g., oxygen gas). During the contacting of the solution from the third fluid stream and the second fluid stream, the reactant and the active form of the redox mediator react to form the chemical product (e.g., hydrogen peroxide) in the solution of the third fluid stream as well as the non-active form of the redox mediator and the second fluid stream. The third fluid stream comprising the chemical product then exits the second module (e.g., via the second outlet) and is then flowed back to the inlet of the second module, thereby completing a cycle.

In other embodiments, it may be beneficial not to recycle the third fluid stream. Such a configuration, which may be referred to as a "continuous" or "single-pass" configuration, does not involve flowing portions of the third fluid stream that contain the chemical product (e.g., portions of the third fluid stream that is exited the second module) back into the second module. This continuous configuration allows the electrochemical flow system described herein to output a continuous supply of solution comprising the chemical product, which may be useful in certain applications (e.g., water treatment). In some embodiments, the system can switch back and forth between configurations in which the third stream is recycled (e.g., a looped configuration) and configurations in which the third stream is not recycled (e.g., a continuous/looped configuration) using, for example, a switch valve downstream of the second module with respect to the flow direction of the third stream. For example, the third fluid stream may, in some cases, be fluidically connected to a valve (e.g., a switch valve) downstream of the second module, the valve being capable of directing the third fluid stream in one configuration to a collection tank and in another configuration back to the inlet of the second module.

In some embodiments, the electrochemical cell of the electrochemical flow system described herein comprises multiple compartments. Having multiple compartments may allow for the electrochemical flow cell to independently control the corresponding half reactions of the overall electrochemical reaction occurring in the electrochemical cell. For example, each half reaction can occur in separate compartments (e.g., separate half cells), and the electrolyte solutions for each half reaction can be flowed independently of each other, according to some embodiments.

In some embodiments, the electrochemical cell comprises a first electrode compartment. For example, FIG. 3 depicts an illustration of exemplary electrochemical cell 140 comprising first electrode compartment 146. In some cases, the first electrode compartment comprises the first electrode described herein. For example, according to certain embodiments, electrochemical cell 140 comprises first electrode compartment 146, first electrode compartment 146 comprising first electrode 143. In comprising the first electrode, the first electrode compartment may house the generation of the active form of the redox mediator during the application of an electrical potential to the first electrode. In some embodiments, the first electrode compartment houses the cathodic half reaction of the electrochemical reaction.

In some cases, the first electrode compartment is fluidically connected to the first inlet and the second inlet of the electrochemical cell. For example FIG. 3 shows first electrode compartment 146 fluidically connected to the first inlet 152 and first outlet 151. As described above, in certain embodiments, the first fluid stream is flowed into the electrochemical cell via the first inlet and out of the electrochemical cell via the first outlet of electrochemical cell, while the solution of the first fluid stream contacts the first electrode. In some cases in which the first electrode compartment comprises is fluidically connected to both the first inlet and the first outlet of electrochemical cell, the first fluid stream flows through the first electrode compartment when the first fluid stream flows through the electrochemical cell. For example, in some embodiments, a first fluid stream comprising an aqueous catholyte solution containing the redox mediator (e.g., a quinone such as an optionally substituted anthraquinone) is flowed through the first electrode compartment of the electrochemical cell. In some cases, the electrical potential is applied to the first electrode while the first fluid stream comprising the aqueous catholyte solution is in contact with the first electrode (e.g., the cathode) inside the first electrode compartment, thereby generating the active form of the redox mediator (e.g., the hydroquinone form of a quinone such as an optionally substituted anthraquinone) inside the first electrode compartment.

Electrolyte in the first electrode compartment, such as, in some embodiments, the first fluid stream flowing through the first electrode compartment, may have a pH in a certain range. The pH range of electrolyte in the first electrode compartment may affect the rate, thermodynamics, and/or the product formed during the electrochemical reaction that occurs at the first electrode. For example, in some cases, forming the active form of the redox mediator at the first electrode involves the transfer of both electrons and protons such as in the case of producing a quinone to form a hydroquinone. Such a reaction requiring the presence of available protons in the electrolyte solution generally requires a relatively low pH. For example, if the redox mediator is a quinone and the pH of electrolyte solution is too high (e.g., higher than the $pK_a$ of the corresponding semiquinone), then the corresponding hydroquinone, which may be the active form of the redox mediator for the formation of the chemical product that is desired, will not be formed. In some embodiments, when the first electrode compartment comprises a solution (e.g., an electrolyte solution such as the first fluid stream), the solution has a pH of less than or equal to 9.0, less than or equal to 8.0, less than or equal to 7.0, less than or equal to 6.5, less than or equal to 6.0, less than or equal to 5.5, less than or equal to 5.0, less than or equal to 4.5, less than or equal to 4.0, less than or equal to 3.5, less than or equal to 3.0, less than or equal to 2.5, less than or equal to 2.0, less than or equal to 1.5, less than or equal to 1.0 or less.

In certain embodiments, the forming the active form of the redox mediator at the first electrode involves loss of protons by the redox mediator, thereby requiring available proton acceptors. In some such cases, it may be beneficial for the solution of the first fluid stream to have a pH of greater than or equal to 5.0, greater than or equal to 5.0, greater than or equal to 6.0, greater than or equal to 7.0, greater than or equal to 8.0, greater than or equal to 8.5, greater than or equal to 9.0, greater than or equal to 9.5, greater than or equal to 10.0, greater than or equal to 10.5, greater than or equal to 11.0, greater than or equal to 12.0, greater than or equal to 13.0, or greater.

In some embodiments, the electrochemical cell comprises a second electrode compartment. For example, FIG. 3 depicts an illustration of exemplary electrochemical cell 140 comprising second electrode compartment 144. In some cases, the second electrode compartment comprises the second electrode described above. For example, according to certain embodiments, electrochemical cell 140 comprises second electrode compartment 144, second electrode compartment 144 comprising second electrode 141. In comprising the second electrode, the second electrode compartment may house the counter half reaction that completes the electrochemical circuit during the generation of the active form of the redox mediator during the application of an electrical potential to the first electrode in the first electrode compartment. In some embodiments, a half reaction may occur in the second electrode compartment that provides species that participate in the formation of the active form of the redox mediator in the first electrode compartment. For example, in some embodiments, the half reaction that occurs in the second electrode compartment produces protons, which may be used in the generation of a hydroquinone in the first electrode compartment. In some embodiments, the second electrode compartment houses the anodic half reaction of the electrochemical reaction.

While in general the half reaction in the second electrode compartment can be any reaction that allows for a complete electrochemical circuit during the operation of the electrochemical flow system, certain half reactions may be desirable for a variety of reasons, including, but not limited to, cost/availability of reactants/materials, stability of the electrochemical reaction, and/or environmental factors.

In some embodiments, the half reaction in the second electrode compartment is the oxygen evolution reaction (OER). In short, the oxygen evolution reaction involves the oxidation of water to form oxygen gas, four protons, and four electrons:

$$2H_2O \rightarrow O_2 + 4H^+ + 4e^- \qquad \text{OER:}$$

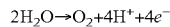

Using the OER as a counter-reaction in the second electrode compartment while operating the electrochemical flow system can allow for the use of inexpensive, environmentally-benign reagents and materials for the counter reaction in the second electrode, in that the species being oxidized is water. In some cases, the OER occurs in the second electrode compartment while the electrical potential is applied to the first electrode in the first electrode compartment to generate the active form of the redox mediator. In some cases, an overall cell potential is applied to the electrochemical cell. In some cases, the oxygen evolution reaction is performed in the second electrode compartment at the same time that the hydroquinone form of a quinone-based mediator, such as an optionally-substituted anthraquinone, is being electrochemically generated in the first electrode compartment (e.g., via the application of an electrical potential to the first electrode).

In some embodiments, the second electrode compartment is configured to perform the oxygen evolution reaction. In some cases, the second electrode compartment is configured to perform the oxygen evolution reaction at a relatively high current with a relatively low overpotential. As is generally known, the overpotential of an electrochemical reaction refers to the additional electrical potential beyond the thermodynamic potential of the electrochemical reaction required to achieve a certain rate of reaction. In some cases, the second electrode compartment is configured to perform the oxygen evolution reaction with a current density of at least 1 mA/cm$^2$, at least 5 mA/cm$^2$, 10 mA/cm$^2$, at least 25 mA/cm$^2$, 50 mA/cm$^2$, at least 75 mA/cm$^2$, 100 mA/cm$^2$, at least 125 mA/cm$^2$, 150 mA/cm$^2$, at least 200 mA/cm$^2$, at least 250 mA/cm$^2$, at least 300 mA/cm$^2$, or more, and/or up to 10 A/cm$^2$, up to 5 A/cm$^2$, up to 2 A/cm$^2$, up to 1 A/cm$^2$, up to 750 A/cm$^2$, up to 500 A/cm$^2$, or less. Combinations of these ranges are possible. For example, in some embodiments, the second electrode compartment is configured to perform the oxygen evolution reaction with a current density of at least 1 mA/cm$^2$ and up 10 A/cm$^2$, or at least 100 mA/cm$^2$, and up 500 A/cm$^2$. Other ranges are possible. In some embodiments, the second electrode compartment is configured to perform the oxygen evolution reaction with an overpotential of less than or equal to 1.0 V, less than or equal to 0.9 V, less than or equal to 0.8 V, less than or equal to 0.7 V, less than or equal to 0.6 V, or less, and/or at least 0.05 V, at least 0.1 V, at least 0.2 V, or more. Combinations of these ranges are possible. For example, in some embodiments, the second electrode compartment is configured to perform the oxygen evolution reaction with an over potential of less than or equal to 1.0 V and at least 0.1 V. Other ranges are possible. In some embodiments, the second electrode compartment is configured to perform the oxygen evolution reaction with the current density of at least 1 mA/cm$^2$, at least 5 mA/cm$^2$, 10 mA/cm$^2$, at least 25 mA/cm$^2$, 50 mA/cm$^2$, at least 75 mA/cm$^2$, 100 mA/cm$^2$, at least 125 mA/cm$^2$, 150 mA/cm$^2$, at least 200 mA/cm$^2$, at least 250 mA/cm$^2$, at least 300 mA/cm$^2$, or more, and/or up to 10 A/cm$^2$, up to 5 A/cm$^2$, up to 2 A/cm$^2$, up to 1 A/cm$^2$, up to 750 A/cm$^2$, up to 500 A/cm$^2$, or less, while operating at an overpotential of less than or equal to 1.0 V, less than or equal to 0.9 V, less than or equal to 0.8 V, less than or equal to 0.7 V, less than or equal to 0.6 V, or less, and/or at least 0.05 V, at least 0.1 V, at least 0.2 V, or more. Combinations of these ranges are possible. For example, in some embodiments, the second electrode compartment is configured to operate at a current density of at least 1 mA/cm$^2$ and up 10 A/cm$^2$ while operating at an over potential of less than or equal to 1.0 V and at least 0.1 V.

In some cases, the use of a catalyst can allow for a decrease in the overpotential of an electrochemical reaction (e.g., for a given current density). In some embodiments, the second electrode comprises a catalyst. In some cases, the second electrode comprises an oxygen evolution catalyst. In some cases, the oxygen evolution catalyst is or comprises a metal. In some embodiments, the oxygen evolution catalyst is or comprises a transition metal. In some cases, the oxygen evolution catalyst is or comprises a relatively inexpensive and/or earth abundant transition metal. Examples of such transition metals include, but are not limited to, nickel, cobalt, manganese, iron, and/or copper. In some cases, the oxygen evolution catalyst is or comprises a metal oxide and/or a metal oxyhydroxide. For example, the oxygen evolution catalyst, in some embodiments, is or comprises a nickel oxide, a nickel oxyhydroxide, a cobalt oxide, and/or a cobalt oxyhydroxide. In some cases, the oxygen evolution catalyst is or comprises a combination of two or more metals. For example, in some cases, the oxygen evolution catalyst is comprises both nickel and iron (e.g., a NiFe compound such as a NiFe oxide and/or oxyhydroxide). In some cases, the oxygen evolution catalyst is formed on the second electrode. The oxygen evolution catalyst can be formed on the second electrode by any number of suitable techniques, such as electrodeposition (e.g., anodic electrodeposition, cathodic electrodeposition), spin-coating, drop-casting, vacuum deposition (e.g., physical vapor deposition and/or chemical vapor deposition), or sol-gel methods. For example, in some embodiments, the oxygen evolution catalyst comprises a nickel foam which is deposited and/or coated onto the second electrode. In some cases, the second electrode is made of the oxygen evolution catalyst in contact (e.g., direct contact) with an electronically conductive component, such as a current collector. For example, in some embodiments, the second electrode is made by depositing and/or coating an oxygen evolution catalyst (e.g., nickel foam) on to a current collector (e.g., a stainless steel current collector). In certain cases, a relatively inexpensive and/or earth abundant oxygen evolution catalyst operates with a relatively low overpotential in solutions having a relatively high pH. However, in other embodiments, the oxygen evolution catalyst is not necessarily relatively inexpensive and/or earth abundant. For example, in some cases, the oxygen evolution catalyst comprises a precious metal such as platinum, iridium, or ruthenium (or oxides thereof). In some cases, the oxygen evolution catalyst operates with a relatively low overpotential in neutral, or acidic pH solutions.

In some embodiments, the first electrode compartment and the second electrode compartment are separated by a membrane in the electrochemical cell of the system described herein. For example, referring to FIG. 3, electrochemical cell 140 comprises first electrode compartment 146 separated from second electrode compartment 144 by membrane 155. In general, the membrane permits the transport of some species (e.g., from the first electrode compartment to the second electrode compartment or from the second electrode compartment to the first electrode compartment), while preventing the diffusion of other species across the membrane (e.g., from the first electrode compartment to the second electrode compartment or from the second electrode compartment to the first electrode compartment). For example, the membrane may prevent certain species present in the first fluid stream (e.g., the redox mediator) from diffusing from the first electrode compartment to the second electrode compartment, while permitting the transport of certain species present in the second electrode compartment (e.g., protons) to diffuse into the first electrode compartment.

The membrane can comprise any suitable material, the choice of which may depend on the application (e.g., the desired chemical product, the chosen redox mediator, chosen reaction conditions, etc.). Membranes are typically semi-porous and/or semipermeable materials. In some cases, the membrane is a cation-exchange membrane, which can be made, for example, by having the membrane comprise fixed anionic groups (e.g., sulfonates, carboxylates, phosphonates, alkoxides, etc.) and mobile cations, thereby allowing for the transport of cations but not anions from one side of the membrane to the other. In some cases, the membrane is an anionic-exchange membrane, which can be made for example by having the membrane comprise fixed cationic groups (e.g., ammonium groups, phosphonium groups, sulfonium groups, etc.) and mobile anions, thereby allowing for the transport of anions but not cations from one side of the membrane to the other. A person of ordinary skill, with the benefit of this disclosure, is capable of choosing a suitable anion exchange membrane or cation exchange membrane. Examples include polymeric membranes, inorganic membranes (comprising, for example, zeolites, bentonite, phosphate salts), mixed inorganic-polymer membranes, and the like.

In some embodiments, the membrane is a bipolar membrane. For example, referring to FIG. 3, membrane 155 in electrochemical cell 140 is a bipolar membrane, in accordance with certain embodiments. A bipolar membrane is a membrane that allows for the transport of cations in one direction through the membrane and anions in the opposite direction through the membrane. In certain cases, a bipolar membrane allows for the transport of protons in one direction through the membrane and hydroxide ions ($OH^-$) in the opposite direction through the membrane. As an example, referring to FIG. 3, bipolar membrane 155 allows cations (e.g., protons) to diffuse from second electrode compartment 144 to first electrode compartment 146, but bipolar membrane 155 does not permit allows cations (e.g., protons) to diffuse from first electrode compartment 146 to second electrode compartment 144, in accordance with certain embodiments. In some cases, bipolar membrane 155 allows anions (e.g., hydroxide ions) to diffuse from first electrode compartment 146 to second electrode compartment 144, but membrane 155 does not permit anions to diffuse from second electrode compartment 144 to first electrode compartment 146. A bipolar membrane may be useful in allowing for the two different electrode compartments of an electrochemical cell to comprise solutions (e.g., electrolyte solution) having different pH values. For example, in some embodiments, the electrochemical cell comprises a bipolar membrane, and the first electrode compartment comprises a solution (e.g., solution from the first fluid stream) that has a relatively low pH, while the second electrode compartment comprises a solution (e.g., an anolyte solution) that has a relatively high pH. Such a configuration may be useful in cases in which it is desired that the reaction of the first electrode compartment takes place at a relatively low pH (e.g., reduction of a quinone into a hydroquinone) while it is desired that the reaction of the second electrode compartment takes place at a relatively high pH (e.g., the OER).

A bipolar membrane can be formed, for example, by fabricating a membrane comprising an anion exchanger on one side of the bipolar membrane and a cationic exchanger on the other side of the bipolar membrane. For example, the bipolar membrane can be formed by laminating together an anionic exchange membrane and a cationic exchange membrane. Bipolar membranes are also commercially available, for example under the Fumasep® FBM brand available from Fumatech BWT GmbH, as well as from Astom Corporation. A bipolar membrane can be positioned in the electrochemical cell with the anion exchanger placed at the membrane-anolyte junction and the cation exchanger placed at the membrane-catholyte junction. In some cases, a bipolar membrane constructed in this way does not allow for the diffusion of ions from one side of the membrane to the other, but rather the bipolar membrane allows for water to flow through the bipolar membrane. As a portion of the water flows through the bipolar membrane, the action of an electric field may split the water into protons and hydroxide ions, with the protons permitted only to flow into the cathode compartment (e.g., permitted only to flow into the catholyte), and the hydroxide ions permitted only to flow into the anode compartment (e.g., permitted only to flow into the anolyte). Referring to FIG. 3, in some embodiments, water flowing through bipolar membrane 155 is split into protons and hydroxide ions, with the protons permitted only to flow into first electrode compartment 146, and hydroxide ions permitted only to flow into second electrode compartment 144. Such a configuration may enforce a desired difference in pH between electrolyte in first electrode compartment 146 (e.g., the catholyte solution such as solution from the first fluid stream) and electrolyte in the second electrode compartment 144 (e.g., anolyte solution, such as solution from the fourth fluid stream described below).

Electrolyte in the second electrode compartment, such as, in some embodiments, the fourth fluid stream flowing through the second electrode compartment (as described below), may have a pH in a certain range. The pH range of electrolyte in the second electrode compartment may affect the rate, thermodynamics, and/or the product formed during the electrochemical reaction that occurs at the second electrode. For example, in some cases, the performance of the oxygen evolution reaction in the second electrode compartment is accelerated by the presence of a catalyst (e.g., a catalyst positioned immobilized on the second electrode). The performance of such catalysts may be improved when the electrolyte solution (e.g., the anolyte) has a relatively high concentration of hydroxide ions, while the performance of such catalysts may be poor when the elected light solution has a relatively low pH. For example, if the redox mediator is a nickel-based OER electrocatalyst and the pH of electrolyte solution is too low, then the rate of the OER reaction involving the OER electrocatalyst may be too slow. In some embodiments, when the second electrode compartment comprises a solution (e.g., an electrolyte solution such as the fourth fluid stream), the solution has a pH of greater than or equal to 7.0, greater than or equal to 7.5, greater than or equal to 8.0, greater than or equal to 9.0, greater than or equal to 10.0, greater than or equal to 11.0, greater than or equal to 12.0, greater than or equal to 13.0, or more. When certain other OER electrocatalysts are used (e.g., precious metal OER electrocatalysts), other pH ranges (such as acidic pH ranges) may be appropriate.

As mentioned above, in some cases, solution in the first electrode compartment (e.g., solution from the first fluid stream) has a different pH than solution in the second electrode compartment (e.g., solution from the fourth fluid stream). In some embodiments, the solutions have a pH difference of at least 1.0 pH units. In some embodiments, the solutions have a pH difference of at least 1.5 pH units, at least 2.0 pH units, at least 2.5 pH units, at least 3.0 pH units, at least 2.5 pH units, at least 4.0 you pH units, at least 5.0 pH units, or more.

In some embodiments, the electrochemical cell comprises a second inlet and a second outlet, each of which is fluidically connected to the second electrode compartment. Referring again to FIG. 3, in some embodiments, electrochemical cell 140 comprises a second inlet 153 and second outlet 154, each of which is fluidically connected to the second electrode compartment 144. Such a configuration may allow for the system to be configured to flow a fourth fluid stream through the electrochemical cell (i.e., a fluid stream distinct from the first, second, and/or third fluid stream described above and herein). For example, in some embodiments, the system is configured to flow a fourth fluid stream from the second inlet of the electrochemical cell, through the second electrode compartment, and out the second outlet of the electrochemical cell. Referring to FIG. 2B, portion of fourth fluid stream 142a may be flowed into the second inlet of electrochemical cell 140, through second electrode compartment 144, and out of the second outlet of electrochemical cell 140. The fourth stream may participate in an electrochemical reaction. For example, in some cases, solution from the fourth fluid stream is contacted with the second electrode when electrical potential is applied to the second electrode (e.g., when an overall cell potential is applied to the electrochemical cell). The fourth fluid stream may comprise an electrolyte solution. For example, in some embodiments in which the second electrode compartment houses the anodic half reaction of an electrochemical reaction, the fourth fluid stream comprises an anolyte solution. In some embodiments, the solution of the fourth fluid stream is an aqueous electrolyte solution. For example, the solution of the fourth fluid stream may comprise water as a solvent and a high concentration of sodium hydroxide as a solute. In certain embodiments, the solution of the fourth stream is waste water. In certain cases, where the oxygen evolution reaction is performed in the second electrode compartment during the process of applying an electrical potential to the first electrode and/or the second electrode, water in the fourth fluid stream is oxidized to form oxygen gas and protons. The protons may diffuse through the membrane to the first electrode compartment, where they may participate in the electrochemical generation of the active form of the redox mediator. The fourth fluid stream may be flowed through the second electrode compartment of the electrochemical cell at the same time that the first fluid stream is flowed through the first electrode compartment of the electrochemical cell.

In some embodiments, the fourth fluid stream is recycled during the electrochemical flow process. In some cases, the system is configured to transport the first fluid stream out of and back into the electrochemical cell. In such a way, it is possible to transport solution from the fourth fluid stream that has already exited the electrochemical cell to re-enter the electrochemical cell. For example, in some embodiments, the system is configured to flow the fourth fluid stream from the second inlet of the electrochemical cell to the second outlet of the electrochemical cell, and to flow the fourth fluid stream from the second outlet of the electrochemical cell to the second inlet of the electrochemical cell. For example, referring to FIG. 2C, system 100 can be configured to flow portion of fourth fluid stream 142A from the second outlet of electrochemical cell 140 to the second inlet of electrochemical cell 140, and also flow portion of fourth fluid stream 142B from the second outlet of electrochemical cell 140 back to the second inlet of the electrochemical cell 140.

Such recycling of the fourth fluid stream may allow for continuous reaction of species in the fourth fluid stream. For example, in some embodiments, the fourth fluid stream comprises, for example, an aqueous anolyte solution comprising electrogenerated oxygen gas exits the electrochemical cell and is optionally degassed to remove gaseous product such as oxygen (e.g., as gas stream 138 connected to fourth fluid stream 142 in FIG. 2C). The fourth fluid stream, still comprising a high concentration of species that can react in the second electrode compartment (e.g., water) can then be returned to the electrochemical cell, thereby completing the cycle.

In some, but not necessarily all embodiments, the electrochemical flow system comprises an optional third module. For example, referring to FIG. 4, system 100 comprises third module 130, in accordance with certain embodiments. In some cases, the third module may be a mixer-settler. The use of a third module, in addition to the first module and the second module, can accelerate certain processes that occur during the operation of the electrochemical flow system, such as the transfer of redox mediator from one phase to another. The third module can, in some embodiments, be used to contact solution from the first fluid stream and solution from the second fluid stream to cause transfer of species from one fluid stream to the other. For example, in some cases, solution from the first fluid stream is contacted with solution from the second fluid stream in the third module such that the non-active form of the redox mediator is transferred from the second fluid stream to the first fluid stream, and/or the active form of the redox mediator is transferred from the first fluid stream to the second fluid stream. Some such processes can be useful when the phase transfer processes and/or chemical reactions that occur in the first module and or the second module are incomplete. For example, referring to FIG. 4, in some embodiments, portion of first fluid stream 112b may still comprise a portion of the active form of the redox mediator (e.g., the hydroquinone form of optionally-substituted anthraquinone) after exiting first module 110, even after being contacted with second fluid stream 122. However, in some embodiments, portion of first fluid stream 112b is flowed to third module 130, where it is contacted with a portion of second fluid stream 122c, which comprises a mixture of the active and non-active forms of the redox mediator. The contact between the first fluid stream and the second fluid stream in third module 130 (e.g., a mixer-settler), allows for the transfer of an additional portion of the remaining redox mediator in its active form from the first fluid stream (e.g., first fluid stream 112b) to the second fluid stream (e.g., second fluid stream 122), as well as the transfer of an additional portion of the remaining non-active redox mediator (e.g., the quinone form of an optionally-substituted anthraquinone) from the second fluid stream (e.g., second fluid stream 122c) to the first fluid stream (e.g., first fluid stream 112), where it can be flowed back into the electrochemical cell for regeneration of the active form of the redox mediator. These phase transfer steps in the optional third module can increase the driving force for the phase transfer and allow for more efficient chemical reactions (e.g., by having a higher ratio of active to non-active redox mediator in the solution of the second fluid stream contacts the solution of the third fluid stream, and by having a higher ratio of non-active to actor redox mediator in the solution of the first fluid stream when it reenters the electrochemical cell). In some cases in which a third module is use, a reverse osmosis component is included in-line in the electrochemical flow system, so that the phase transfer catalyst (e.g., a tetraalkylammonium salt) can be changed (either in terms of composition or relative concentration). A person of ordinary skill in the art, with the benefit of this disclosure, is capable of choosing a suitable reverse osmosis component.

In some cases, the system comprises a number of pumps and/or surge tanks in order to control, at least in part, the flow of any of the fluid streams described above and herein, including the first fluid stream, the second fluid stream, the third fluid stream, and/or the fourth fluid stream. One or more pumps may be operationally coupled to the system. For example, in some embodiments, when the system is configured to flow a fluid stream (e.g., the first fluid stream) from the outlet of one component (e.g., the first module) to the inlet of another component (e.g., the electrochemical cell), the system may comprise a pump configured to provide a mechanical force to induce and/or accelerate the rate of the flow of the fluid stream. The other pumps may be positioned between other components of the system and configured to induce and/or accelerate the rate of the flow of other fluid streams between components of the system. For example, a pump may be used to induce and/or accelerate the flow of the second fluid stream from the first module to the second module and/or from the second module to the first module. As another example, a pump may be used to induce and/or accelerate the rate of the flow of the third fluid stream into and/or out of the second module. In some embodiments, the system comprises one or more positive displacement pumps configured to control fluid flow in the system as described herein. For example, the system may comprise one or more peristaltic pumps configured to control the flow of any of the fluid streams described herein. For example, when the system is configured to flow a fluid stream through tubing fluidically connected to the outlet of one component and the inlet of another component, the peristaltic pump may be configured so that it can apply a force to the tubing to induce the flow of the stream through the tubing. A non-limiting example of a suitable peristaltic pump is a Masterflex L/S II digital drive pump manufactured by Cole-Palmer. Other suitable positive displacement pumps include, but are not limited to, hydraulic pumps, gear pumps, and/or diaphragm pumps. In some cases, the system comprises one or more vacuum pump configured to control fluid flow in the system as described herein. For example, a vacuum pump may be positioned downstream of a fluid stream with respect to the direction of flow of the fluid stream (e.g., downstream of the first module, second module, etc.) and apply a pressure gradient that induces or accelerates the rate of flow of the fluid stream. Other types of pumps may be used as well, such as gravity pumps. An exemplary configuration of pumps in one non-limiting embodiment of the system described herein is described in Example 1 and depicted in the schematic shown in FIG. 8.

As mentioned above, the system may optionally comprise one or more surge tanks. The surge tanks can be used to modulate fluctuations in flow rate, so that the rate of flow of the fluid streams do not deviate dramatically during operation. In certain embodiments, the flow of the fluid streams through surge tanks can be accompanied by the degassing of the flow streams in the surge tanks. For example, in some embodiments, the third fluid stream flows through a surge tank after exiting the second module. In certain cases, where the third fluid stream comprises a gaseous reactant (e.g., oxygen gas), the system may release a portion of the gas in the surge tank. Similarly, in some embodiments, the fourth fluid stream flows through a surge tank after exiting the electrochemical cell. In certain cases, where the fourth fluid stream comprises a gaseous product (e.g., oxygen gas produced by the OER reaction in the second electrode compartment), the system release a portion of the gas in the surge tank, such that the amount of gas in the fourth fluid stream is less upon exiting the surge tank than it was upon the fourth stream entering the surge tank. An exemplary configuration of surge tanks in one non-limiting embodiment of the system described herein is described in Example 1 and depicted in the schematic shown in FIG. 8.

It should be noted that, as used herein, when two or more components of the electrochemical flow systems described herein (e.g., the system involving contacting multiple liquids presently described or the system involving slug flow below) are described as being fluidically connected, the presence of certain other components through which fluid may need to pass in flowing from one component to another fluidically connected component are not considered to disrupt the fluidic connections. For example, the presence of a pump, surge tank, additional module, holding tank, valve (open or closed), or the like in the flow path of any of the fluid streams (or sequences of slugs as described below) in going from a first component to a second component fluidically connected to the first component (e.g., from the outlet of the first module to the inlet of the second module, from the outlet of the electrochemical cell to the inlet of the first module, etc.) is not considered to disrupt the fluidic connection between the first component and the second component. As a more specific example, mixer-settler MS-1 is considered to be fluidically connected to mixer-settler MS-2 in FIG. 8, even though surge tank S-2 is in the flow path between MS-1 and MS-2.

Certain embodiments are related to electrochemical flow systems that produce hydrogen peroxide generated by the reaction of oxygen gas and the hydroquinone form of a quinone-based redox mediator (e.g., the hydroquinone form of anthraquinone-2,7-disulfonate). In some embodiments, the system comprises an electrochemical cell comprising a first electrode compartment comprising a first electrode (e.g., a cathodic compartment comprising a cathode made, for example, carbon felt) and a second electrode compartment comprising a second electrode (e.g., an anodic compartment comprising an anode comprising, for example, an OER catalyst such as an NiFe compound). In some cases, the first electrode compartment and the second electrode compartment are separated by a membrane (e.g., a bipolar membrane). In certain cases, a first fluid stream comprising an aqueous electrolyte solution comprising the quinone-based redox mediator flows through the first electrode compartment while an electrical potential is applied, generating the hydroquinone form of the redox mediator at the first electrode. The first fluid stream may then be flowed to a first module (e.g., a mixer-settler), where the solution of the first fluid stream is contacted with the solution of a second fluid stream (e.g., an organic solution that is essentially immiscible with water) comprising a phase transfer catalyst (e.g. an alkylammonium salt) and/or the non-active form of the quinone-based redox mediator (e.g., the quinone form of anthraquinone-2,7,-disulfonate), such that at least a portion of the active, hydroquinone-based form of the redox mediator transfers to the second fluid stream. The second fluid stream may then be flowed to a second module, where it is contacted (e.g., mixed) with a third fluid stream comprising oxygen-rich water and, in some cases, less than 5 mM of other species (e.g., less than 5 mM of other ionic species such as supporting electrolyte, or less than 5 mM of contaminants). In some embodiments, upon contact between the second fluid stream and third fluid stream in the second module (e.g., a mixer-settler), the hydroquinone form of the redox mediator (e.g., the hydroquinone form of anthraquinone-2,7-disulfonate) reacts with the reactant (e.g., oxygen gas) to form hydrogen peroxide, which exits the third module in the third fluid stream (which may be essentially immiscible with the second fluid stream). The second fluid stream may now comprise the quinone-form of the redox mediator (as opposed to the hydroquinone form), and in some cases, the second stream is recycled back to the first module, where it can transfer the non-active form of the redox mediator back to the first fluid stream, which can transport the non-active form of the redox mediator back to the electrochemical cell to participate in another cycle of the electrochemical flow process. In parallel, a counter-reaction may take place in the second electrode compartment while a fourth fluid stream is flowed through the second electrode compartment. In some cases, the counter reaction is the OER, resulting in the electrochemical generation of oxygen gas and protons. The end result of the electrochemical flow cycle, in some embodiments, is the generation of hydrogen peroxide in a solution relatively free of other species (e.g., supporting electrolyte and contaminants) as a result of an overall electrochemically-induced comproportionation of water and $O_2$.

In another set of embodiments, systems and methods related to producing a chemical product using slug flow are now generally described.

Figure 5:
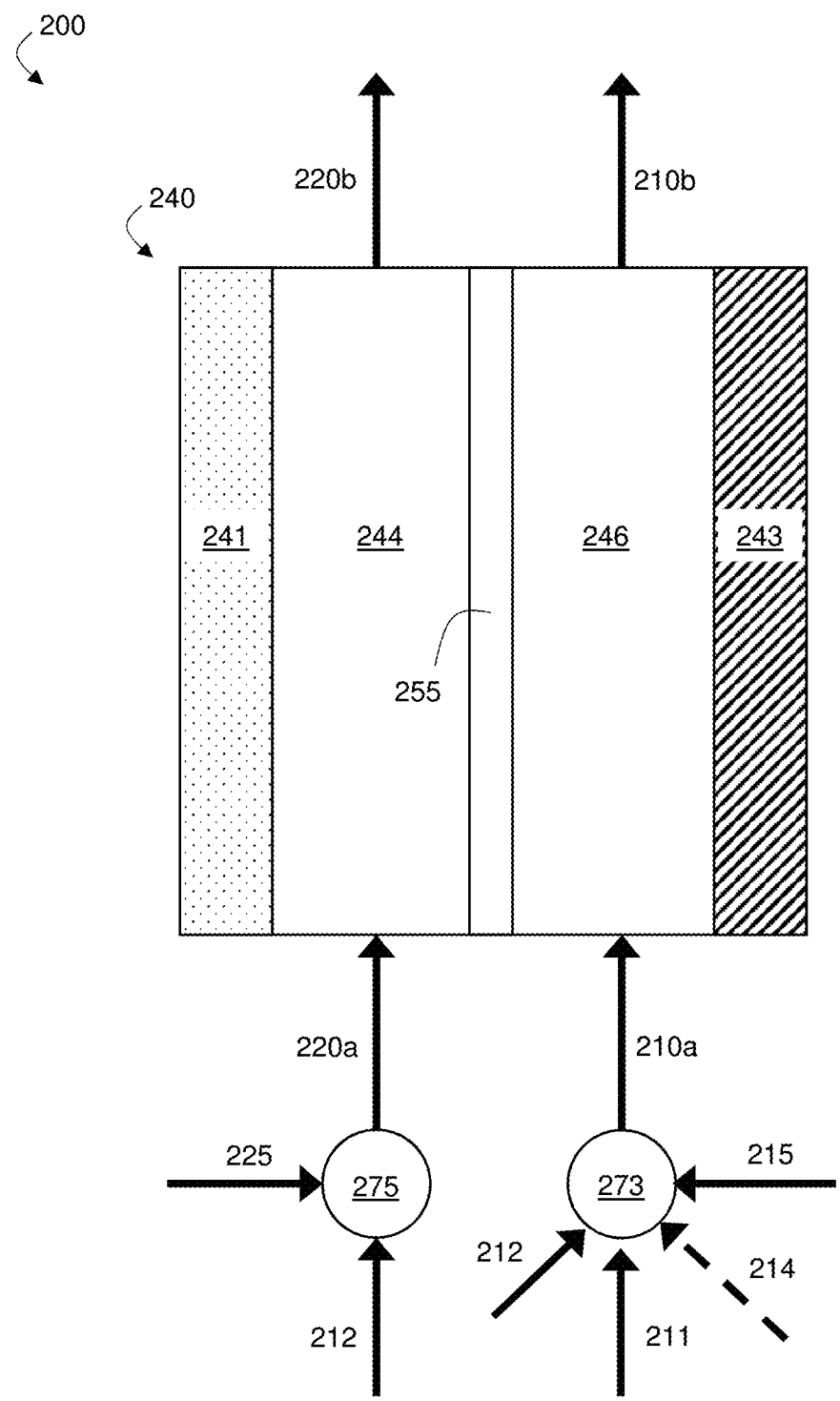
FIG. 5 shows an exemplary schematic of an electrochemical flow system, according to certain embodiments.

In some embodiments, an electrochemical flow system involving the flow of a sequence of fluid slugs is described. As with the electrochemical flow system involving contacting multiple liquids described above, the electrochemical flow system involving the flow of a sequence of fluid slugs may be used to produce a chemical product, such as, but not limited to, hydrogen peroxide. In some embodiments, the system comprises an electrochemical cell. Referring to FIG. 5, exemplary system 200 comprises electrochemical cell 240.

In some embodiments, the electrochemical cell comprises a first electrode compartment. For example, FIG. 5 depicts an illustration of exemplary electrochemical cell 240 comprising first electrode compartment 246. The first electrode compartment may house one half reaction of an electrochemical reaction. In some embodiments, the first electrode compartment houses the reaction resulting in the formation of the chemical product. In certain cases the reaction resulting in the formation of the chemical product and an electrochemical half reaction that takes place in the first electrode compartment occur at different times. For example, in certain cases, a half reaction occurs in the first electrode compartment during a first period of time. Then, during a second period of time, a reaction resulting in the formation of the chemical product occurs in the first electrode compartment. In some embodiments, the first period of time and the second time period do not overlap.

In some embodiments, the electrochemical cell comprises a first electrode. Referring to FIG. 5, for example, electrochemical cell 240 comprises first electrode 243, according to certain embodiments. As in the case of the electrochemical cell of the electrochemical system involving contacting multiple liquids, the first electrode of the system currently described typically comprises at least one electrically conductive component, as well as an electrode active material. In some cases, the electrode active material is the electronically conductive component of the first electrode. In some embodiments, the first electrode comprises species immobilized on the first electrode. As mentioned above, a person of ordinary skill in the art, with the benefit of this disclosure, would be able to choose a suitable material for the first electrode, including suitable solid examples described above.

In some embodiments, the first electrode comprises a redox mediator immobilized on the first electrode. For example, referring to FIG. 5, first electrode 243 comprises a redox mediator immobilized on first electrode 243. As is generally understood, a species immobilized on an electrode (e.g., the first electrode) is one that, under a given set of conditions, is not capable of freely diffusing away from or dissociating from the electrode. The redox mediator can be immobilized on an electrode in a variety of ways. For example, in some cases, a redox mediator can be immobilized on an electrode by being bound (e.g., via covalent bonds, ionic bonds, and/or intramolecular interaction such as electrostatic forces, vendor walls forces, hydrogen bonding, etc.) to a surface of the electrode or a species or material attached to the electrode. In some embodiments, the redox mediator can be immobilized on an electrode by being adsorbed onto the electrode. In some cases, the redox mediator can be immobilized on an electrode by being polymerized onto the electrode. In certain cases, the redox mediator can be immobilized on an electrode by being included in a coating that is applied are deposited onto the electrode, as described below.

Having a redox mediator immobilized on the first electrode may, in certain cases, allow a chemical product (e.g., hydrogen peroxide) to be produced at the first electrode when a solution comprising a reactant is contacted with the first electrode, even in the absence of the application of electrical potential during the contacting of the first electrode by the solution.

As in the case of the electrochemical cell of the electrochemical system involving contacting multiple liquids, a redox mediator is generally a chemical species that is capable of transferring reducing or oxidizing equivalents from an electrode to a different species. A redox mediator may transfer reducing equivalents, for example, by being reduced by an electrode (e.g., accepting electrons from an electrode) and, subsequently, reducing another species (and regenerating the original form of the redox mediator). Similarly, the redox mediator may transfer oxidizing equivalents, for example, by being oxidized by the electrode (e.g., injecting electrons into an electrode/accepting holes from an electrode) and, subsequently, oxidizing another species. As described above and herein, immobilized redox mediators can allow for the generation of the ultimate chemical product of an electrochemical process at the electrode (e.g., the first electrode) to be temporally decoupled from the direct electrochemical process (i.e., allows for an indirect electrochemical reaction, as opposed to a direct electrochemical reaction).

As used herein, immobilized redox mediators have an active form. The active form of an immobilized redox mediator is the product between the redox mediator and the electrode during operation of the electrochemical cell (e.g., during the application of electrical potential to the electrode) that is then capable of reacting with the desired species (e.g., reactant) to generate the desired chemical product without requiring any further chemical transformation prior to the reaction with the desired species, as is understood from the description of the active form of a redox mediator above.

In certain embodiments, an active form of the redox mediator may be formed by contacting, in an electrochemical cell, the first electrode with a first slug comprising a first solution while applying an electrical potential to the first electrode such that such that an active form of a redox mediator immobilized on the first electrode is generated. As used herein, a slug (i.e., a slug of fluid) is a discrete portion of fluid having well-defined spatial boundaries separating the portion of fluid from directly adjacent fluid. A slug may be flowed through a pathway (e.g., a conduit, tube, channel, or the like). The first slug can be a liquid slug. For example, in some embodiments, the first slug is or comprises an electrolyte solution. In some cases, the first slug is or comprises an electrolyte solution, and during the application of an electrical potential to the first electrode, an electrochemical reaction between the immobilized redox mediator in the electrode and/or the electrolyte solution generates the active form of the immobilized redox mediator. As described above in the embodiments related to the electrochemical system involving contacting multiple liquids, contacting the first electrode may comprise wetting at least a portion of the surface of the first electrode, according to any of the ranges described above.

In some cases, the first slug contacts the first electrode during a first period of time. Then, during a second period of time, the first electrode may be contacted with a solution comprising a reactant (e.g., a fluid slug comprising a reactant), such that the active form of the immobilized redox mediator reacts with a reactant to form the chemical product. In some cases, the second period of time does not overlap of the first period of time.

The redox mediator (e.g., the immobilized redox mediator) may be in the form of a variety of different types. In some embodiments, the redox mediator (e.g., the immobilized redox mediator) is or comprises a molecular species (i.e., a small molecule). However, in some embodiments the redox mediator is or comprises an oligomer or a polymer. In other cases, the redox mediator (e.g., the immobilized redox mediator) is a particle (e.g., a microparticle or a nanoparticle). In some cases, the redox mediator comprises a metal. For example, the redox mediator may comprise a coordination complex containing a metal. In other cases, the redox mediator comprises an organic molecule. For example, in some embodiments the redox mediator is an organic small molecule.

As mentioned above, in some cases, the redox mediator (e.g., the immobilized redox mediator) is or comprises a polymer. The polymer may comprise repeating redox-active units. In some such cases then, the redox mediator (e.g., the immobilized redox mediator) is or comprises a redox-active polymer. In some cases, the redox-active polymer comprises units comprising organic molecules (e.g., in the backbone of the polymer and or covalently attached to the backbone of the polymer), while in certain cases the redox-active polymer comprises repeating units comprising metal complexes (e.g., in the backbone of the polymer and or covalently attached to the backbone of the polymer). The redox-active polymer may comprise any of the redox mediators described above in embodiments related to electrochemical flow systems involving contacting multiple liquids (e.g., repeating units of optionally-substituted TEMPO, optionally-substituted ferrocene, optionally-substituted phenazine, phenothiazalines, quinoxalines, etc.). The choice of redox mediator will depend on the desired chemical product (e.g., phenazines and/or quinones for forming hydrogen peroxide, TEMPO and/or ferrocene for forming ketones/aldehydes/carboxylic acids).

In some embodiments, the redox-active polymer comprises a quinone. For example, the quinone may be an optionally-substituted quinone (e.g., an optionally-substituted 1,4-quinone, an optionally-substituted 1,2-quinone, an optionally-substituted naphthquinone). In some cases, the quinone (e.g., an optionally-substituted quinone) is positioned in the backbone of the redox-active polymer. In some cases, the quinone (e.g., an optionally-substituted quinone) is covalently attached to the backbone of the redox-active polymer. An optionally-substituted quinone may, in certain embodiments, comprise one or more functional groups. Exemplary functional groups with which the quinone of the redox-active polymer may be functionalized include, but are not limited to halo, hydroxyl, carboxylate/carboxylic acid, sulfonate/sulfonic acid, alkylsulfonate/alkylsulfonic acid, phosphonate/phosphonic acid, alkylphosphonate/alkylphosphonic acid, amino, quaternary ammonium (e.g., tetraalkylamino), alkyl, heteroalkyl, alkoxy, glycoxy, polyalkyleneglycoxy, imino, polyimino, alkenyl, alkynyl, aryl, heteroaryl, heterocyclyl, nitro, nitrile, thiyl, and/or carbonyl groups, any of which is optionally substituted. In some embodiments, the redox-active polymer comprises an optionally-substituted quinone, and the active form of the redox mediator comprises the corresponding hydroquinone of the optionally-substituted quinone. Such a redox-active polymer may be useful in the electrochemical production of certain chemical products, such as hydrogen peroxide, because hydroquinones can act as two-electron, two-proton donors.

In some embodiments, the redox mediator is or comprises a polymer comprising an anthraquinone. For example, the redox mediator may comprise a redox-active polymer comprising an optionally-substituted anthraquinone. In some such cases, the active form of the redox mediator is or comprises a redox-active polymer comprising the hydroquinone form of an optionally-substituted anthraquinone. The optionally-substituted anthraquinone may be positioned in the backbone of the redox-active polymer, or the optionally-substituted anthraquinone may be covalently bonded to the backbone of the redox-active polymer. In some embodiments, the optionally-substituted anthraquinone comprises one or more functional groups. Exemplary functional groups with which the quinone may be functionalized include, but are not limited to, halo, hydroxyl, carboxylate/carboxylic acid, sulfonate/sulfonic acid, alkylsulfonate/alkylsulfonic acid, phosphonate/phosphonic acid, alkylphosphonate/alkylphosphonic acid, amino, quaternary ammonium (e.g., tetraalkylamino), alkyl, heteroalkyl, alkoxy, glycoxy, polyalkyleneglycoxy, imino, polyimino, alkenyl, alkynyl, aryl, heteroaryl, heterocyclyl, nitro, nitrile, thiyl, and/or carbonyl groups, any of which is optionally substituted. In some cases, the redox mediator (e.g., the immobilized redox mediator) and the corresponding active form of the redox mediator have the structures of formula (4A) and (4B), respectively:

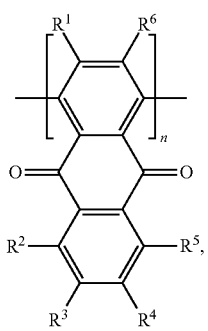

(4A)

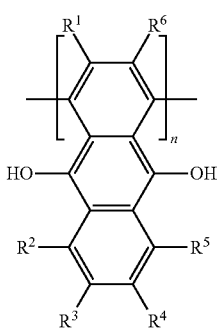

(4B)

where groups $R^1$, $R^2$, $R^3$, $R^4$, $R^5$ and/or $R^6$ can the same or different and are halo, hydroxyl, carboxylate/carboxylic acid, sulfonate/sulfonic acid, alkylsulfonate/alkylsulfonic acid, phosphonate/phosphonic acid, alkylphosphonate/alkylphosphonic acid, amino, quaternary ammonium (e.g., tetraalkylamino), alkyl, heteroalkyl, alkoxy, glycoxy, polyalkyleneglycoxy, imino, polyimino, alkenyl, alkynyl, aryl, heteroaryl, heterocyclyl, nitro, nitrile, thiyl, and/or carbonyl groups, any of which is optionally substituted, or, any two adjacent groups of $R^1$-$R^6$ can be joined together to form an optionally-substituted ring. In some embodiments, the redox mediator is or comprises poly(1,4-anthraquinone).

In some embodiments, the redox mediator is combined with another material to form a composite material. In certain cases, the composite material is then coated onto an electrode, thereby immobilizing the redox mediator on the electrode. For example, in some embodiments, a redox-active polymer comprising an optionally-substituted anthraquinone is combined with another material to form a composite that is then coated onto the first electrode. In some cases, the material with which the redox mediator is combined to form the composite is a conductive material. For example, the material may be a carbon-based material, such as carbon nanotubes, carbon black, graphite, graphene, fullerenes, or the like. In one non-limiting example, the redox mediator is combined with carbon nanotubes (e.g., single walled nanotubes, multiwalled nanotubes, etc.) to form a composite (e.g., an ink). Such composite materials comprising the redox mediator may assist in the efficiency with which the immobilized redox mediator participates in electrochemical reactions with the first electrode, and/or provide for a high surface area allowing for greater degree of access to the immobilized redox mediator. The redox mediator (e.g., a redox-active polymer) and/or the composite material may be coated onto the first electrode is in a variety of techniques, including but not limited to drop-casting, dip-coating, spin-coating, doctor blade coating, gravure coating, chemical vapor deposition, electrostatic dry-coating, spray-coating, dry spray-coating.

In some embodiments, the first electrode compartment comprises a first inlet and a first outlet. The first inlet and/or the first outlet may be fluidically connected to the first electrode compartment. Having a first inlet and a first outlet may allow for a fluid stream (e.g., a fluid stream comprising a sequence of fluids slugs as described below) to be flowed into, through, and out of the first electrode compartment. For example, referring to FIG. 5, in some cases, first fluid stream 210 may be flowed through electrochemical cell 240 by having portion of first fluid stream (e.g., first sequence of slugs) 210*a* enter first electrode compartment 246 via a first inlet and having portion of first fluid stream 210*b* exit first electrode compartment 246 via a first outlet. As in the case of the electrochemical cell of the electrochemical system involving contacting multiple liquids, the inlet and/or the outlet of the first electrode compartment may be fittings, such as fittings made out of a polymer (e.g., polypropylene fittings).

In some embodiments, the electrochemical cell comprises a second electrode compartment. For example, referring to FIG. 5, system 200 comprises electrochemical cell 240, which comprises second electrode compartment to 244. In some cases, the second electrode compartment comprises a second electrode. For example, according to certain embodiments, electrochemical cell 240 comprises second electrode compartment 244, second electrode compartment 244 comprising second electrode 241. In comprising the second electrode, the second electrode compartment may house the counter half reaction that completes the electrochemical circuit during the generation of the active form of the immobilized redox mediator during the application of an electrical potential to the first electrode in the first electrode compartment. In some embodiments, a half reaction may occur in the second electrode compartment that provides species that participate in the formation of the active form of the immobilized redox mediator on the first electrode in the first electrode compartment. For example, in some embodiments, the half reaction that occurs in the second electrode compartment produces protons, which may be used in the generation of a hydroquinone in the first electrode compartment. In some embodiments, the second electrode compartment houses the anodic half reaction of the electrochemical reaction. In certain cases, the second electrode compartment is configured to perform the oxygen evolution reaction (OER). For example, in some cases, the second electrode is an anode comprising an OER catalyst as described above for the embodiments related to the electrochemical system involving contacting multiple liquids.

In some embodiments, the second electrode compartment comprises a second inlet and a second outlet. The second inlet and/or the second outlet may be fluidically connected to the second electrode compartment. Having a second inlet and a second outlet may allow for a fluid stream (e.g., a fluid stream comprising a sequence of fluids slugs as described below) to be flowed into, through, and out of the second electrode compartment. For example, referring to FIG. 5, in some cases, second fluid stream 220 may be flowed through electrochemical cell 240 by having portion of second fluid stream (e.g., comprising a second sequence of slugs) 220a enter second electrode compartment 244 via a first inlet and having portion of second stream 220b exit second electrode compartment 244 via a first outlet.

As in the case of the electrochemical cell of the electrochemical system involving contacting multiple liquids, in some embodiments, the electrochemical cell of the electrochemical system involving slug flow comprises a membrane. For example, in some embodiments first electrode compartment and the second electrode compartment are separated by a membrane. For example, referring to FIG. 5, electrochemical cell 240 comprises first electrode compartment 246 separated from the second electrode compartment 244 by membrane 255. In general, the membrane permits the transport of some species (e.g., from the first electrode compartment to the second electrode compartment or from the second electrode compartment to the first electrode compartment), while preventing the diffusion of other species across the membrane (e.g., from the first electrode compartment to the second electrode compartment or from the second electrode compartment to the first electrode compartment). For example, the membrane may prevent certain species present in the first slug from diffusing from the first electrode compartment to the second electrode compartment, while permitting the transport of certain species present in the second electrode compartment (e.g., protons) to diffuse into the first electrode compartment. As mentioned above, a person of ordinary skill in the art, with the benefit of this disclosure, is capable of choosing a suitable anion exchange membrane or cation exchange membrane.

In certain embodiments, the membrane is a bipolar membrane. For example, referring to FIG. 5, membrane 255 in electrochemical cell 240 is a bipolar membrane, in accordance with certain embodiments. As in the case of the electrochemical cell of the electrochemical system involving contacting multiple liquids, in certain cases, a bipolar membrane allows for the transport of protons in one direction through the membrane and hydroxide ions ($OH^-$) in the opposite direction through the membrane. As an example, referring to FIG. 5, bipolar membrane 255 allows cations (e.g., protons) to diffuse from second electrode compartment 244 to first electrode compartment 246, but bipolar membrane 255 does not permit allows cations (e.g., protons) to diffuse from first electrode compartment 246 to second electrode compartment 244, in accordance with certain embodiments. In some embodiments, the electrochemical cell comprises a bipolar membrane, and the first electrode compartment comprises a solution (e.g., the first solution of the first slug) that has a relatively low pH (e.g., less than or equal to 6, less than or equal to 5, less than or equal to 4, or less), while the second electrode compartment comprises a solution (e.g., an anolyte solution) that has a relatively high pH (e.g., greater than or equal to 7, greater than or equal to 8, greater than or equal to 10, greater than or equal to 11, or greater). Such a configuration may be useful in cases in which it is desired that the reaction of the first electrode compartment takes place at a relatively low pH (e.g., reduction of a quinone into a hydroquinone) while it is desired that the reaction of the second electrode compartment takes place at a relatively high pH (e.g., the OER).

As mentioned above, certain embodiments comprise contacting, in an electrochemical cell, the first electrode with a first slug. In certain embodiments, methods described herein comprise replacing at least a portion of the first slug with a second slug comprising a second solution comprising a reactant, such that first electrode is in contact with the second slug and no longer in contact with at least a portion of the first slug. Such a process can be accomplished, for example, by using a pump to cause the first slug to flow out of the first electrode compartment, and subsequently cause a second slug to flow into the first electrode compartment such that it is in contact with the first electrode. For example, referring to FIG. 7, first slug 216 may be in contact with first electrode 243 at one point in time, as shown in the leftmost schematic of FIG. 7, but, at a later point in time, at least a portion of first slug 216 is removed and subsequently replaced with second slug 218 (e.g., by using a pump to cause the flow of the slugs in the direction going from the bottom of FIG. 7 toward the top of FIG. 7), as shown in the middle schematic of FIG. 7. It should be understood that when the second slug replaces at least a portion of the first slug such that the first electrode is in contact with the second slug and no longer in contact with at least a portion of the first slug, a portion of the first slug can still be in contact with the first electrode. For example, in some cases, at least 1 vol %, at least 2 vol %, at least 5 vol %, at least 10 vol %, at least 20 vol %, at least 30 vol %, at least 50 vol %, at least 80 vol %, at least 90 vol %, or more of the first slug may still be in contact with the first electrode when the second slug replaces at least a portion of the first slug. Such a situation may occur when, in some embodiments, a portion, but not necessarily all, of the first slug is flowed out of the first electrode compartment (e.g., via the first outlet of the first electrode compartment), and before the entirety of the first slug is removed from the first electrode compartment and therefore no longer in contact with the first electrode, at least a portion of the second slug is flowed into the first electrode compartment and contacted with a portion of the first electrode that had formerly been in contact with the first slug. However, in some embodiments, the entirety of the first slug is no longer in contact with the first electrode (e.g., due to being flowed out of the first compartment) when the second slug replaces at least a portion of the first slug. Some methods comprise replacing at least a portion of the first slug with the second slug such that the first electrode is in significantly greater contact with the second slug than the first electrode is with the first slug (e.g., the surface area of the first electrode in contact with the second slug is at least twice, at least three times, at least five times, at least 10 times, at least 20 times, at least fifty times, or at least one hundred times greater than the surface area of the first electrode in contact with the first slug).

In some cases, replacing at least a portion of the first slug in the first electrode compartment with the second slug results in the active form of the redox mediator reacting with a reactant in the second slug to produce the chemical product. For example, in some embodiments the second slug comprises a second solution, the second solution comprising a reactant that is capable of reacting with the active form of the redox mediator (e.g., the immobilized redox mediator on the first electrode). In certain cases, the second solution comprises less than 5 mM of ionic species (e.g., ionic species other than the reactant, chemical product, protons, or hydroxide ions). Having the second solution comprise a relatively low concentration of ionic species may allow, in cases where the chemical product is formed in the second solution, for the chemical product to be produced in a solution where further downstream separation/purification of the chemical product is facile or avoidable altogether.

When the second slug contacts the first electrode, reactant in the second solution (e.g., oxygen gas dissolved in water relatively free of other dissolved species such as ionic species) of the second slug may interact and consequently react with the active form of the redox mediator (e.g., the hydroquinone form of a redox-active polymer comprising an optionally-substituted anthraquinone) to form the chemical in the second solution. In some embodiments, the chemical product that is formed is hydrogen peroxide. For example, in some embodiments, the reactant is oxygen gas, and the active form of the immobilized redox mediator reacts with the oxygen gas in the second solution of the second slug to form hydrogen peroxide. In other cases, other types of chemical products can be formed. Any of the chemical products (e.g., liquid chemical products such as organic liquids or alcohols) described above in the embodiments related to the electrochemical system involving contacting multiple liquids can also be produced using the electrochemical slug flow embodiments.

In some cases, a relatively high concentration of the chemical product is produced in solution of the second slug (e.g., following the contacting of the second slug comprising the reactant with the first electrode comprising the active form of the immobilized redox mediator). In some embodiments, the solution of the second slug (e.g., after contacting the first electrode comprising the active form of the immobilized redox mediator), comprises at least 1.0 mM, at least 2.0 mM, at least 5.0 mM, at least 10 mM, at least 15 mM, at least 20 mM or more, and/or up to 1 M, up to 0.75 M, up to 0.5 M, up to 0.25 M, up to 0.1 M, up to 0.075 M, up to 50 mM, or less of the chemical product (e.g., $H_2O_2$). Combinations of these ranges are possible. For example, in some embodiments, the solution of the second slug (e.g., after contacting the solution of the second stream comprising the active form of the redox mediator), comprises at least 1.0 mM and up to 1 M, or at least 20 mM and up to 0.25 mM of the chemical product (e.g., $H_2O_2$). Other ranges are possible.

Figure 7:
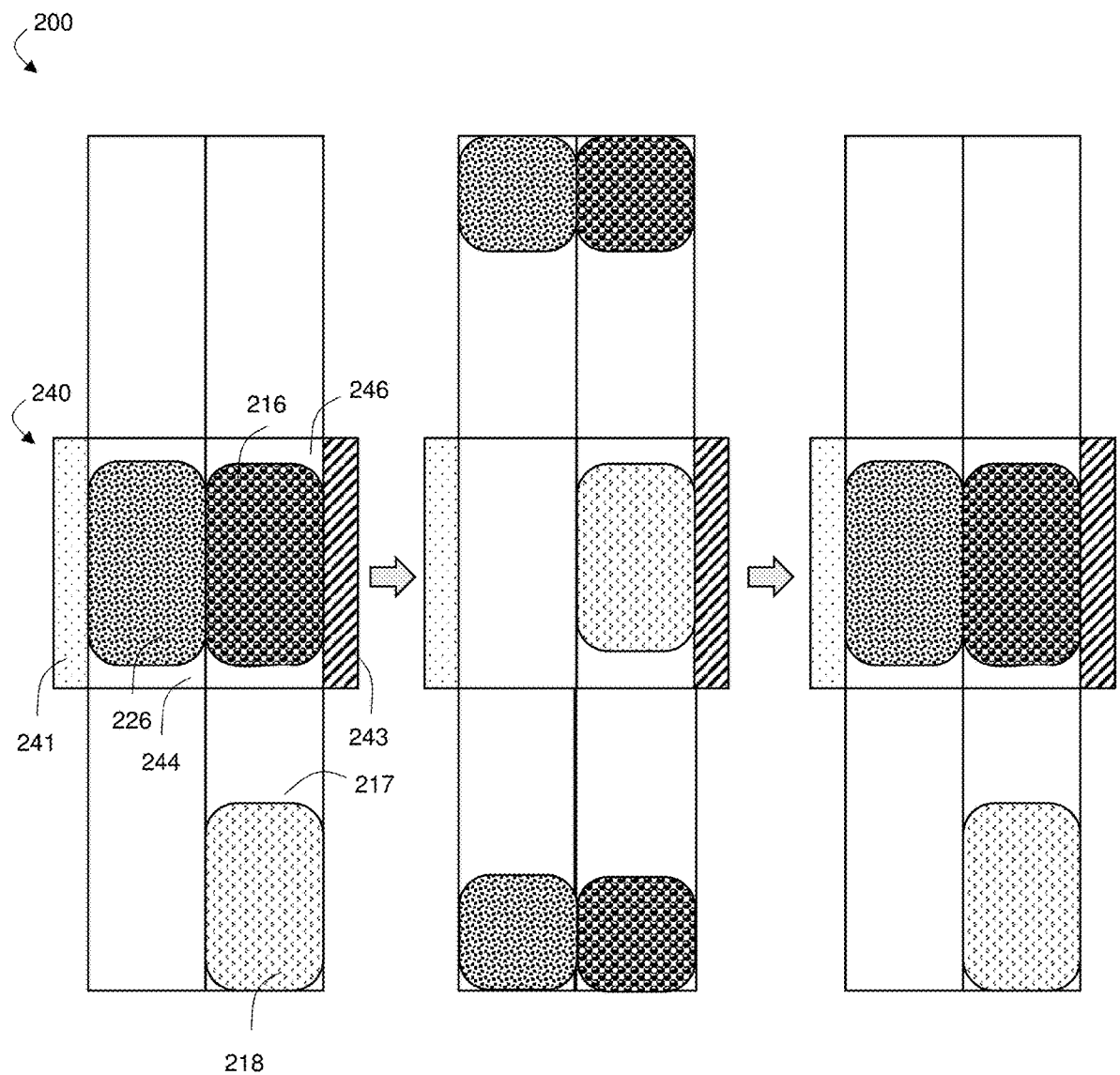
FIG. 7 shows an exemplary cross-sectional illustration of the flow of sequences of slugs through an electrochemical flow system, according to certain embodiments.

Some embodiments may comprise replacing at least a portion of the first slug with an inert slug essentially immiscible with both the first slug and the second slug. As used herein, an inert slug is a slug having a different composition than the first slug and that does not comprise any species capable of reacting with the active form of the redox mediator. For example, the inert slug may comprise an inert fluid (e.g., an inert gas), such as nitrogen gas ($N_2$), or argon gas. In some cases, at least 50 vol %, at least 60 vol %, at least 75 vol %, at least 90 vol %, at least 95 vol %, at least 98 vol %, at least 99 vol %, or more of the inert slug is an inert gas. In some embodiments, the inert slug replaces at least a portion of the first slug such that first electrode is in contact with the inert slug and no longer in contact with at least a portion of the first slug. Referring to FIG. 7, in some embodiments, at least a portion of first slug 216 (shown in contact with first electrode 243 in the leftmost schematic), is replaced at a later time with inert slug 217, inert slug 217 being essentially immiscible with first slug 216. It should be understood that when the inert slug replaces at least a portion of the first slug such that the first electrode is in contact with the inert slug and no longer in contact with at least a portion of the first slug, a portion of the first slug can still be in contact with the first electrode. For example, in some cases, at least 1 vol %, at least 2 vol %, at least 5 vol %, at least 10 vol %, at least 20 vol %, at least 30 vol %, at least 50 vol %, at least 80 vol %, at least 90 vol %, or more of the first slug may still be in contact with the first electrode when the inert slug replaces at least a portion of the first slug. Such a situation may occur when, in some embodiments, a portion, but not necessarily all, of the first slug is flowed out of the first electrode compartment (e.g., via the first outlet of the first electrode compartment), and before the entirety of the first slug is removed from the first electrode compartment and therefore no longer in contact with the first electrode, at least a portion of the inert slug is flowed into the first electrode compartment and contacted with a portion of the first electrode that had formerly been in contact with the first slug. However, in some embodiments, the entirety of the first slug is no longer in contact with the first electrode (e.g., due to being flowed out of the first compartment) when the inert slug replaces at least a portion of the first slug. Some methods comprise replacing at least a portion of the first slug with the inert slug such that the first electrode is in significantly greater contact with the inert slug than the first electrode is with the first slug (e.g., the surface area of the first electrode in contact with the inert slug is at least twice, at least three times, at least five times, at least 10 times, at least 20 times, at least fifty times, or at least one hundred times greater than the surface area of the first electrode in contact with the first slug).

In some embodiments, replacing the at least a portion of the first slug with an inert slug essentially immiscible with both the first slug and the second slug occurs prior to the step of replacing at least a portion of the first slug with the second slug. In some embodiments, over the course of a period of time, the first slug (e.g., comprising an electrolyte solution) is in contact with the first electrode (e.g. during the application of an electrical potential to the first electrode), and at a later time at least a portion of the first slug is transported out of the first electrode compartment (e.g., out of the first outlet of the electrochemical cell) and replaced by an inert slug. At least a portion of the inert slug may then be transported out of the first electrode compartment and replaced by the second slug (e.g., comprising a second solution comprising a reactant). Such a sequence of slugs (e.g., a first slug followed by an inert slug followed by a second slug) may allow for a temporal decoupling of an electrochemical process with a chemical process where a chemical product is formed. For example, in some embodiments, a first slug comprising a catholyte solution is contacted with the first electrode of the first electrode compartment while an electrical potential sufficient magnitude to cause the production of the active form of an immobilized redox mediator on the first electrode to be reduced is applied. Then, at least a portion (or, in some cases, all) of the first slug is flushed out of the first electrode compartment by an inert slug comprising an inert gas. Such a process may remove contaminants such as dissolved ionic species (e.g., supporting electrolyte) from the first electrode compartment while leaving the active form of the immobilized redox mediator intact. Then, at least a portion (or, in some cases, all) of the inert slug is removed from the first electrode compartment and the second slug, comprising a second solution comprising the reactant replaces at least a portion of the inert slug and comes into contact with the first electrode and the active form of the immobilized redox mediator. Such contact, in some embodiments, provides an opportunity for the reactant in the second solution to react with the active form of the redox mediator to form the chemical product (e.g., hydrogen peroxide) in a solution relatively free of dissolved contaminants such as supporting electrolyte. The second slug, now comprising the chemical product, can be transported out of the first electrode compartment and collected for use in certain applications.

Figure 6A:
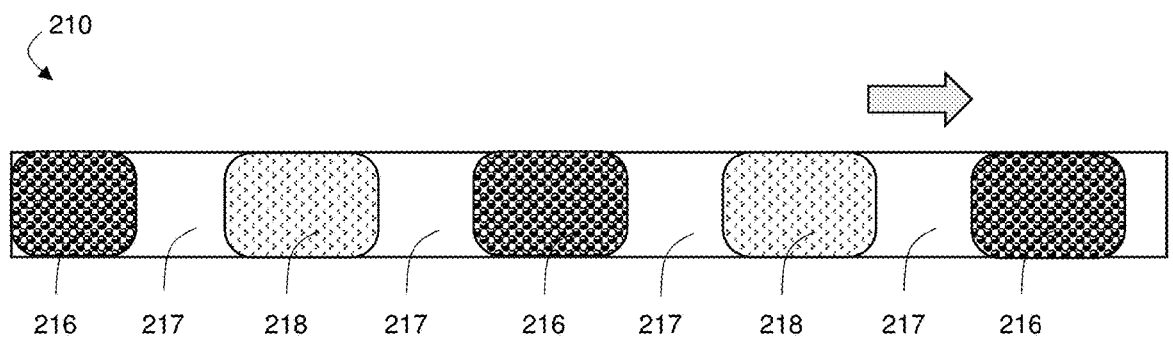
FIGS. 6A-6C show schematic illustrations of exemplary sequences of fluid slugs, according to certain embodiments.

In some embodiments, the first electrode compartment is configured to transport a first sequence of slugs of fluid from the inlet of the first electrode compartment to the outlet of the first electrode compartment, such that each slug of the first sequence contacts the first electrode. The first sequence of slugs may comprise a repeating pattern of slugs such as the first slug, the inert slug, and the second slug described above. For example, in some embodiments, the first sequence of slugs comprises, in order, a first slug comprising a first solution, an inert slug comprising an unreactive fluid, and a second slug comprising a second solution, the first solution being different from than second solution. The first electrode compartment may be configured such that the first sequence of slugs contacts the first electrode by having the first electrode be a part of the fluidic path of the first slug sequence. For example, the first electrode compartment may be a chamber in which one of the boundaries (e.g., walls) of the chamber is the first electrode, and in transporting the first slug sequence through the chamber, each slug comes into contact with the boundaries of the chamber, including the first electrode. The order of the slugs, as well as the composition of the slugs, may be varied, depending on the application. FIG. 6A shows an illustration of exemplary first sequence of slugs 210, in accordance with certain embodiments. First sequence of slugs 210 in FIG. 6A includes an alternating pattern of first slug 216, which is followed by inert slug 217, which is in turn followed by second slug 218, before the pattern repeats again, according to certain embodiments. First sequence of slugs 210 may be flowed in a particular direction (e.g., through a conduit such as a tube), as indicated by the arrow shown. In accordance with certain embodiments, first slug 216 may comprise a first solution comprising an electrolyte solution (e.g., an aqueous catholyte solution containing a supporting electrolyte), inert slug 217 may comprise an inert gas (e.g., nitrogen gas), and second slug 218 may comprise a second solution comprising a reactant (e.g., oxygen gas) capable of reacting with the active form of the immobilized redox mediator (e.g., an immobilized polymer comprising the hydroquinone form of an optionally-substituted anthraquinone) to form the chemical product (e.g., hydrogen peroxide). The first slug sequence may repeat its pattern of slugs (e.g., first slug followed by inert slug followed by second slug) any number of times during the operation of the electrochemical flow system described herein, depending on the desired amount of chemical product to be produced.

In some embodiments, each slug of the first sequence is essentially immiscible with the slug directly preceding the slug and the slug directly following the slug. Having each slug be essentially immiscible with the slugs directly preceding and following the slug may be beneficial in preventing the slugs from mixing before, during, or after they are contacted with the first electrode in the first electrode compartment. In exemplary first slug sequence 210 in FIG. 6A, first slug 216 is directly preceded and followed by inert slug 217, and first slug 216 is essentially immiscible with inert slug 217, according to certain embodiments. Similarly, inert slug 217 is directly preceded by first slug 216 and directly followed by second slug 218, and inert slug 217 is essentially immiscible with both first slug 216 and second slug 218. Finally, second slug 218 is directly preceded and followed by inert slug 217, and second slug 218 is essentially immiscible with inert slug 217, according to certain embodiments. Two slugs may be essentially immiscible in the case where they one slug comprises a liquid solution and the other slug comprises a gas (e.g., the other slug is a gas bubble), or when each slug comprises a liquid that is essentially immiscible with the liquid of the other slug. It should be noted that a slug can be essentially immiscible with another slug even if one of the slugs comprises a component that is soluble to some extent in the other slug. For example, in some embodiments, the first slug may comprise water and the inert slug may comprise nitrogen gas. Even though nitrogen gas can dissolve in water, a nitrogen slug and a water slug, even when in contact (e.g., as consecutive slugs in a channel) do not combine to form a single phase, so therefore they are essentially immiscible.

Certain embodiments comprise flowing a first sequence of slugs comprising the first slug and the second slug from the inlet of the first electrode compartment to the outlet of the first electrode compartment. The system, including the first electrode compartment may be configured to flow the first sequence of slugs (e.g., the first slug sequence) in such a way by having the first inlet of the first electrode compartment be fluidically coupled to one or more input streams (e.g., via a conduit such as a tube or channel). In some cases, multiple input streams are used to generate the first slug sequence, as described below. In some cases, the first inlet and/or first outlet of the first electrode compartment are fluidically connected to at least one valve and/or pump. For example, in some cases, the first inlet of the first electrode compartment is fluidically connected to one or more valves. The valves may be of any of the suitable types described below and herein. The system may be configured such that the at least one pump can induce flow of an input fluid stream into and/or through the first electrode compartment. The at least one pump may be any of the types of pumps described above, such as positive displacement pumps (e.g., peristaltic pumps, hydraulic pumps, gear pumps), vacuum pumps, or the like. The at least one valve, if present, may be used to control the formation of the slug sequence, as described below.

In some, but not necessarily all embodiments, the first sequence of slugs comprises a rinse slug. For example, referring to FIG. 6B, first sequence of slugs 210 comprises rinse slug 213. The rinse slug may be useful for further removing of components of certain slugs from being in contact with, for example, the first electrode and/or the immobilized redox mediator. For example, in cases where one of the slugs of the first slug sequence (e.g., the first slug) comprises a solution comprising a relatively high concentration of ionic species (e.g., supporting electrolyte), a portion of the ionic species may remain in contact with the first electrode and/or the immobilized redox mediator (e.g., via adsorption), even after at least a portion of the first slug is transported out of the first electrode compartment and replaced, for example, by an inert slug. In such cases, a rinse slug may be transported into the first electrode compartment as part of the first sequence of slugs in order to dissolve and/or flush out such remaining components (e.g., ionic species or other contaminants). The rinse slug may comprise a neat solvent. For example, in some embodiments, the rinse slug is or comprises water having a relatively low concentration of dissolved species. The rinse slug may, in certain cases, be degassed. For example, in some cases it may be useful for the rinse slug to be or comprise degassed (e.g., deoxygenated) water.

Figure 6B:
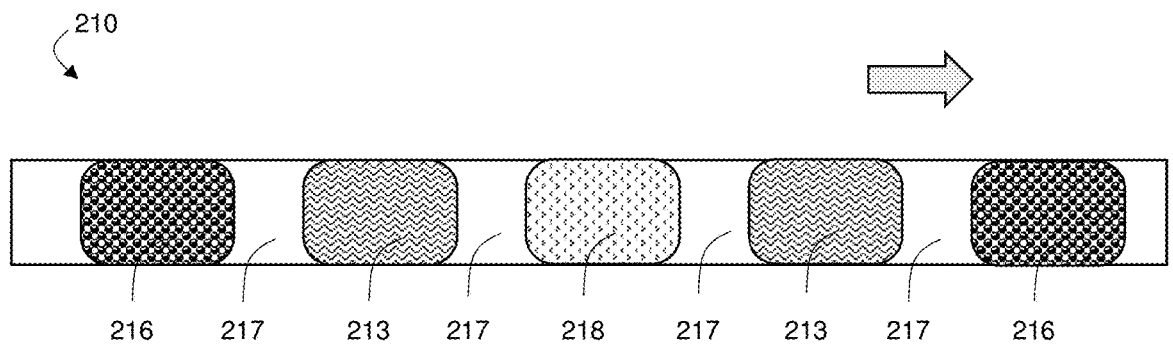

FIG. 6B shows exemplary first sequence of slugs 210 comprising rinse slugs, in accordance with certain embodiments. First slug sequence 210 in FIG. 6B includes an alternating pattern of first slug 216, which is followed by inert slug 217, which is in turn followed by rinse slug 213. Rinse slug 213 is followed by inert slug 217, which is then followed by second slug 218, before the pattern repeats again, according to certain embodiments. First slug sequence 210 may be flowed in a particular direction (e.g., through a conduit such as a tube), as indicated by the arrow shown.

Figure 6C:
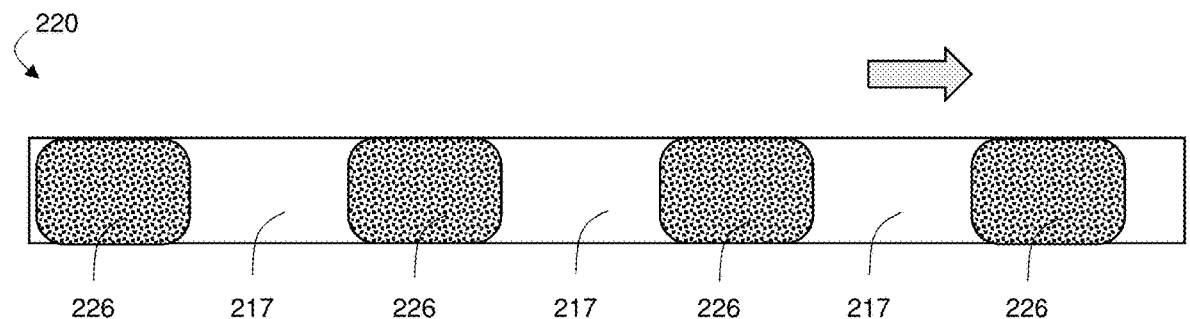

In some embodiments, the second electrode compartment is configured to transport a second sequence of slugs of fluid from the inlet of the second electrode compartment to the outlet of the second electrode compartment, such that each slug of the second sequence contacts the second electrode. For example, certain embodiments comprise flowing the second sequence of slugs from the inlet of the second electrode compartment to the outlet of the second electrode compartment. Referring to FIG. 5, in some embodiments, second electrode compartment 244 is configured to flow second sequence of slugs 220 from the first inlet of second electrode compartment, through the second electrode compartment, and out of the first outlet of the second electrode compartment. The second sequence of slugs may comprise a repeating pattern of slugs such as a third slug comprising a third solution and an inert slug. The third solution of the third slug may be or comprise an electrolyte solution (e.g., an anolyte solution). For example, the third solution of the third slug may be or comprise an aqueous solution comprising a relatively high concentration of dissolved ionic species (e.g., an aqueous anolyte solution). Contacting the second electrode with the third solution may allow for an electrochemical reaction to occur at the second electrode. For example, a counter half reaction may occur at the second electrode that completes the electrochemical circuit when an electrical potential is applied to the first electrode. FIG. 6C shows an illustration of exemplary second sequence of slugs 220, in accordance with certain embodiments. Second sequence of slugs 220 in FIG. 6C includes an alternating pattern of third slug 226, which is followed by inert slug 217, which is in turn followed by third slug 226, before the pattern repeats again, according to certain embodiments. Second sequence of slugs 220 may be flowed in a particular direction (e.g., through a conduit such as a tube), as indicated by the arrow shown. The second electrode compartment may be configured to have each slug of the second electrode compartment contact the second electrode in a similar manner as the first electrode compartment is configured to contact each slug of the first sequence of slugs with the first electrode, such as by having the second electrode be a part of a boundary (e.g., wall) of the fluidic path of the second sequence of slugs.

In some embodiments, each slug of the second sequence of slugs is essentially immiscible with the slug directly preceding the slug and the slug directly following the slug. For example, in FIG. 6C, third slug 226 (e.g., an aqueous electrolyte solution) is directly preceded by and followed by inert slug 217 (e.g., an inert gas), and third slug 226 is essentially immiscible with inert slug 217.

As mentioned above, in some embodiments, a counter half reaction occurs in the second electrode compartment of the electrochemical system involving slug flow. In some embodiments, the counter half reaction is the oxygen evolution reaction (OER). The OER may occur when the third slug is in contact with the second electrode. For example, in some cases, the third slug comprises an aqueous electrolyte solution and, is contacted with the second electrode while an electrical potential is applied to the second electrode (and/or an overall cell potential is applied to the electrochemical cell), resulting in the OER occurring at the second electrode (i.e., water in the third slug is oxidized to form oxygen gas, four protons, and four electrons). In some cases, the third slug comprises a third solution having a relatively high pH. Having a relatively high pH may allow for improved performance of the OER in the second electrode compartment, such as in cases in which the second electrode comprises a catalyst that operates with greater efficiency (e.g., lower overpotential) and/or greater stability at a higher pH than at a lower pH. For example, in some cases, the second electrode comprises an OER catalyst such as a nickel-based OER catalyst (e.g., nickel foam, or a NiFe-based compound), and the third slug comprises an aqueous electrolyte solution having a relatively high pH. For example, the third slug may comprises a solution having a pH greater than or equal to 7.0, greater than or equal to 7.5, greater than or equal to 8.0, greater than or equal to 9.0, greater than or equal to 10.0, greater than or equal to 11.0, greater than or equal to 12.0, greater than or equal to 13.0, or more. In other embodiments, the second electrode comprises a catalyst (e.g., a precious metal catalyst) that operates with a greater efficiency and/or greater stability in solutions having a near neutral pH or low pH. In some such cases, the third slug may comprises a third solution having a near neutral or relatively low (e.g., acidic) pH.

As mentioned above, the sequences of slugs, such as the first sequence of slugs and/or the second sequence of slugs, may be generated using one or more input streams.

In some embodiments, the first sequence of slugs is generated by fluidically connecting a stream comprising the first solution described herein, a stream comprising the second solution described herein, and a stream comprising an inert fluid. The streams may be each connected to the at least one valves described above. In certain cases the at least one valves is fluidically connected to the first inlet of the first electrode compartment. As such, in some embodiments, one or more valves are fluidically connected to the first inlet of the first electrode compartment and also fluidically connected to at least three fluid sources. Referring to FIG. 5, according to some embodiments, stream 215 comprising the first solution, stream 211 comprising the second solution, and stream 212 comprising the inert fluid are each fluidically connected to first valve 73. In some cases, one or more valves are configured so that only one of the streams fluidically connected to the one or more valves may be flowed into the input stream of the first electrode (e.g., an input stream comprising the first sequence of slugs). By alternating streams flowing through the one or more valves, the first slug sequence can be generated. For example, referring to FIG. 5, in some embodiments, first valve 73 allows stream 215 to flow into first sequence of slugs 210a (e.g., an input stream comprising the first sequence of slug) for a period of time, and subsequently first valve 73 switches configuration such that first valve 73 allows stream 212 to flow into first sequence of slugs 210a for a period of time. Then, in some embodiments, first valve 73 switches configuration such that first valve 73 allows stream 211 to flow into first sequence of slugs 210a. Such a process can then be repeated. In such a way, first slug sequence 210a, as it flows into the inlet of first electrode compartment 246, comprises, in order, first slug 216 comprising the first solution (e.g., a catholyte solution), inert slug 217 comprising the inert fluid (e.g., nitrogen or argon gas), and second slug 218 comprising the second solution (e.g., oxygenated water), according to certain embodiments. While this exemplary embodiment involves the use of a single valve, some embodiments may employ multiple valves to generate the slug sequence. In some cases, first sequence of slugs 210*a* may flow through first electrode compartment 246, contact first electrode 243 (and optionally undergo a change in composition, such oxygen gas in second slug 218 reacting with immobilized redox mediator on the electrode during the application of an electrical potential to generate hydrogen peroxide), and then be flowed out of first electrode compartment 246 as first sequence of slugs 210*b*.

In some, but not necessarily all, embodiments, the first slug sequence can be generated in the manner described above, but with the optional inclusion of a stream comprising a rinse solution, so as to introduce rinse slugs into the first sequence of slugs. For example, referring to FIG. 5, rinse solution stream 214 (e.g., comprising deoxygenated water) is fluidically connected to first valve 73, according to certain embodiments.

In some embodiments, the second sequence of slugs is generated by fluidically connecting a stream comprising the third solution described herein and a stream comprising an inert fluid. The streams may be each connected to the at least one valves described above. In certain cases the at least one valves is fluidically connected to an inlet of the second electrode compartment. Referring to FIG. 5, according to some embodiments, stream 225 comprising the third solution and stream 212 comprising the inert fluid are each fluidically connected to second valve 73, which is in turn fluidically connected to the inlet of second electrode compartment 244. The one or more valves may be used to generate the second sequence of slugs by alternating which streams it allows to flow into the second sequence of slugs (e.g., second sequence of slugs 220*a*), in a manner similar to that used to generate the first sequence of slugs. In some cases, second sequence of slugs 220*a* may flow through second electrode compartment 244, contact second electrode 241 (and optionally undergo a change in composition, such water being oxidized to form oxygen gas), and then be flowed out of first electrode compartment 246 as second sequence of slugs 220*b*.

Figure 18:
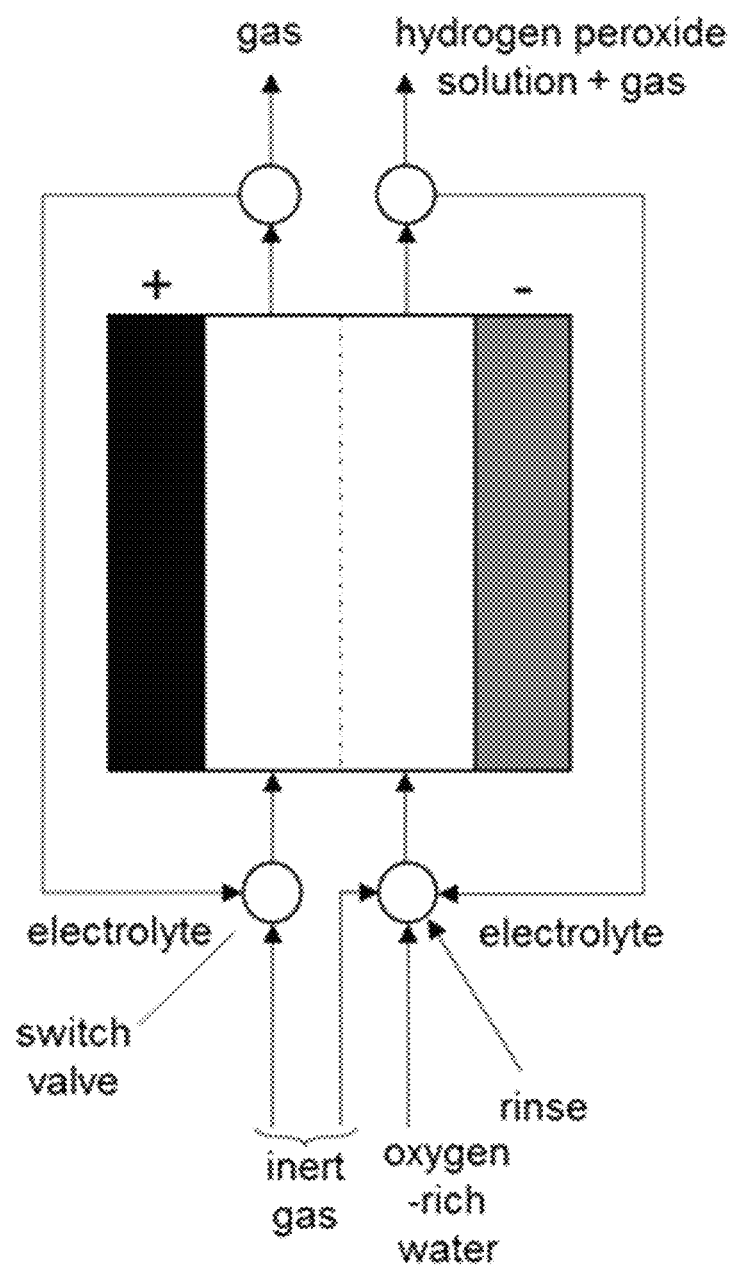
FIG. 18 shows an exemplary schematic of an electrochemical flow system, according to certain embodiments.

In some, but not necessarily all, embodiments, slugs from either of the first sequence of slugs or the second sequence of slugs may be recycled. For example, in some cases, the first slug (e.g., a slug comprising an electrolyte solution), may, after flowing out of the first electrode compartment, be separated from the outgoing first sequence of slugs and be recycled back into the incoming first sequence of slugs. Similarly, in some embodiments, the third slug (e.g., a slug comprising an electrolyte solution), may, after flowing out of the second electrode compartment, be separated from the outgoing second sequence of slugs and be recycled back into the incoming second sequence of slugs. A schematic of an exemplary configuration that involves recycling of the first slugs and the second slugs is shown in FIG. 18 and described in Example 3 below. Such recycling of fluid (e.g., from one or more slugs) may reduce the amount of fluid needed to operate the system described herein.

As described above, the systems described herein may comprise one or more valves. In some embodiments, the one or more valves comprises a switch valve. For example, in FIG. 5, first valve 73 and/or second valve 75 is a switch valve. Other suitable types of valves include, but are not limited to, multiport valves, a combination of ball valves, globe valves. In some cases, the one or more valves comprises a three-way valve. In certain embodiments, the system comprises one or more two-way valves. One of ordinary skill, with the benefit of this disclosure, could readily select a suitable valve. It should be understood that, the one or more valves described herein refers to components or combinations of components that can be configured to either allow or prevent the flow of fluid through the component(s). For example, in some cases, instead of a physical valve such as those mentioned above, multiple pumps can be used in combination to essentially serve as a switch valve by switching between the multiple pumps (e.g., toggling on/off individual pumps), each of which is configured to induce/accelerate flow (or stop the flow) of a different fluid/solution stream (e.g., a stream comprising the first solution, the second solution, an inert fluid).

In some embodiment, the transportation of slugs in the system is synchronized. For example, the flow of the first sequence of slugs into and through the first electrode compartment may be synchronized with the flow of the second sequence of slugs into and through the second electrode compartment. In some cases, the transportation of slugs in the system is synchronized such that at least a portion of the first slug is in contact with the first electrode at the same time that at least a portion of the second slug is in contact with the second electrode. FIG. 7 shows exemplary system 200, wherein the flow of the first sequence of slugs comprising first slug 216, inert slug 217, and second slug 218 is synchronized with the flow of a second sequence of slugs comprising third slug 226 and inert slug 217 (with the sequences of slugs flowing from the bottom of the illustrations toward the top of the illustrations in FIG. 7).

In some cases, as shown in the leftmost schematic of FIG. 7, the first sequence of slugs and the second sequence of slugs are synchronized such that first slug 216 (comprising, for example, a catholyte solution) is in contact with first electrode 243 (e.g., an electrode comprising an immobilized redox mediator) at the same time that third slug 226 (comprising, for example, an anolyte solution) is in contact with second electrode 241 (comprising, for example, an OER catalyst). In some embodiments in which the first slug is in contact with the first electrode at the same time that the third slug is in contact with the second electrode, an electrical potential may be applied to the first electrode (e.g., an overall cell potential applied to the electrochemical cell), because slugs comprising electrolyte are in contact with both the first electrode and the second electrode simultaneously, allowing for a complete electrochemical circuit. In some cases, an electrical potential of sufficient magnitude to generate the active form of the immobilized redox mediator (e.g., the hydroquinone form of a polymer comprising an optionally-substituted hydroquinone) is applied.

In some cases, as shown in the middle schematic of FIG. 7, the first sequence of slugs and the second sequence of slugs are synchronized such that when second slug 218 is in contact with first electrode 243, inert slug 217 is in contact with second electrode 241. As shown in the right-most schematic of FIG. 7, the synchronized sequences of slugs may be further flowed such that the process repeats and once again first slug 216 is in contact with first electrode 243 at the same time that third slug 226 is in contact with second electrode 241.

In some embodiments, the electrical potential is only applied when the first electrode is in contact with the first slug. For example, in some instances, the electrical potential is applied when the first slug is contact with the first electrode, but, when at a later point in time the second slug is in contact with the first electrode, the electrical potential is no longer applied. In doing so, energy in the form of an electrical potential may be input into the system during the process of generating the active form of the immobilized redox mediator (e.g., when the first slug is in contact with the first electrode), but such energy is not input into the system when it may not be necessary, such as during the reaction of the reactant in the second slug with the active form of the immobilized redox mediator to generate the chemical product.

In some embodiments, the system is configured to automatically actuate the at least one valve and/or pump. Automatically actuating the at least one valve and/or pump may be done in order to start or stop the motion of the first slug and/or the second slug. For example, in some cases, the one or more valves and/or pumps are coupled to a computer system and/or a potentiostat/power supply, such that a programmed sequence (e.g., a computer program or algorithm) actuates the one or more valves and/or pumps to generate and flow the first sequence of slugs and/or the second sequence of slugs. A computer program for controlling the actuation of the one or more valves and/or pumps can be made and operated using any suitable software such as, for example, LabVIEW, which is available from National Instruments.

In other embodiments, the one or more valves/and/or pumps are not automatically actuated, but are rather manually actuated.

Certain embodiments are related to electrochemical flow systems that produce hydrogen peroxide generated by the reaction of oxygen gas and the hydroquinone form of polymer comprising an optionally-substituted anthraquinone (e.g., the hydroquinone form of poly(1,4-anthraquinone) that is immobilized on a first electrode. In some embodiments, the system comprises an electrochemical cell comprising a first electrode compartment comprising a first electrode on which is immobilized a redox mediator (e.g., a cathode on which is immobilized poly(1,4-anthraquinone)). In some embodiments, the system comprises a second electrode compartment comprising a second electrode (e.g., an anodic compartment comprising an anode comprising, for example, an OER catalyst such as an NiFe compound). In some cases, the first electrode compartment and the second electrode compartment are separated by a membrane (e.g., a bipolar membrane). In some cases, a fluid stream comprising a first sequence of fluid slugs is passed through the first electrode compartment and a second sequence of fluid slugs is passed through the second electrode compartment. The first sequence of slugs may comprise a first slug comprising a catholyte solution, an essentially immiscible inert slug comprising an inert gas (e.g., nitrogen or argon gas), a second slug comprising a reactant (e.g., water comprising oxygen gas), and optionally a rinse slug comprising a rinse solution (e.g., deoxygenated water). The second sequence of slugs may comprise a third slug (e.g., an aqueous anolyte solution) and an essentially immiscible inert slug. In some embodiments, when the first electrode is in contact with the first slug and the second electrode is in contact with the third slug, an electrical potential is applied to the electrochemical cell, such that electrochemical reaction occurs at both the first electrode (e.g., the reduction of the immobilized redox mediator to generate the active hydroquinone form of the redox mediator) and the second electrode (e.g., the OER). As the sequences of slugs are flowed through the electrochemical cell, the second slug comprising the reactant may come into contact with the first electrode, now comprising the active form of the immobilized redox mediator, at which point the chemical product is generated (e.g., the oxygen gas in the second slug reacts with the hydroquinone form of the immobilized redox mediator, producing hydrogen peroxide in the second slug, which may contain a relatively low concentration (e.g., less than 5 mM) of dissolved ionic species)). The second slug, now comprising the chemical product, can be flowed out of the electrochemical cell and collected for use in suitable applications (e.g., using hydrogen peroxide to treat waste water).

As mentioned above, in certain embodiments of the electrochemical flow system involving contacting multiple liquids described herein, the solution of the second fluid stream is or comprises a solution that is essentially immiscible with the solution of the first fluid stream. In some embodiments, the solution of the second fluid stream is or comprises an organic solution. In other words, in some cases, the second fluid stream comprises an organic liquid. In certain cases, the organic liquid is hexanol (e.g., 1-hexanol). In some embodiments, the organic liquid is dichloromethane. Other examples of organic liquids that, in certain embodiments the second fluid stream can comprise, include, but are not limited to, alcohols (e.g., including but not limited to hexanol, octanol and/or branched isomers thereof), trifluorotoluene, phosphonates (e.g., tri-ethylhexyl phosphate, tributylphosphate), and/or medium chain fatty acids (e.g., caprylic acid).

In general, two or more fluids are essentially immiscible if they are unable to form a mixture of a single phase (i.e., unable to form a homogeneous mixture) in a relatively short period of time after being mixed with each other (e.g., in less than or equal to one day, less than or equal to 12 hours, less than or equal to 6 hours, less than or equal to 2 hours, or less). Unless otherwise noted, when two or more fluids are referred to as being essentially immiscible herein, the two or more fluids are essentially immiscible at or about room temperature (23° C.). When two fluids (e.g., liquids) are essentially immiscible, the phase separated fluids after mixing may comprise a small amount of the other fluid. For example, in some cases, after contacting, the solution of the first fluid stream in the electrochemical flow system involving contacting multiple liquids comprises up to 10 volume percent (vol %), up to 8 vol %, up to 6 vol %, up to 5 vol %, up to 3 vol %, up to 2 vol %, up to 1%, or less, and/or at least 0.001 vol %, at least 0.01 vol %, at least 0.1 vol %, at least 0.2 vol %, at least 0.3 vol %, at least 0.5 vol %, or more of the liquid of the second fluid stream (e.g., an organic liquid such as hexanol). Combinations of these ranges are possible. For example, in some cases, after contacting, the solution of the first fluid stream comprises at least 0.001 vol % and up to 10 vol % of the liquid of the second fluid stream. However, in some embodiments, after contacting, the solution of the first fluid stream comprises no observable amount of the solution of the second fluid stream.

Similarly, in certain embodiments, after contacting, the solution of the second fluid stream comprises up to 10 vol %, up to 8 vol %, up to 6 vol %, up to 5 vol %, up to 3 vol %, up to 2 vol %, up to 1%, or less, and/or at least 0.001 vol %, at least 0.01 vol %, at least 0.1 vol %, at least 0.2 vol %, at least 0.3 vol %, at least 0.5 vol %, or more of the liquid of the first fluid stream (e.g., water). However, in some embodiments, after contacting, the solution of the first fluid stream comprises no observable amount of the solution of the second fluid stream. Combinations of these ranges are possible. For example, in some cases, after contacting, the solution of the second fluid stream comprises at least 0.001 vol % and up to 10 vol % of the liquid of the first fluid stream. However, in some embodiments, after contacting, the solution of the second fluid stream comprises no observable amount of the solution of the first fluid stream.

As another example, in some embodiments, the solution of the second fluid stream and the solution of the third fluid stream are immiscible, but are not perfectly immiscible. In some cases, after contacting, the solution of the second fluid stream comprises up to 10 vol %, up to 8 vol %, up to 6 vol %, up to 5 vol %, up to 3 vol %, up to 2 vol %, up to 1%, or less, and/or at least 0.001 vol %, at least 0.01 vol %, at least 0.1 vol %, at least 0.2 vol %, at least 0.3 vol %, at least 0.5 vol %, or more of the liquid of the third fluid stream (e.g., water). Combinations of these ranges are possible. For example, in some cases, after contacting, the solution of the second fluid stream comprises at least 0.001 vol % and up to 10 vol % of the liquid of the third fluid stream. However, in some embodiments, after contacting, the solution of the second fluid stream comprises no observable amount of the solution of the first fluid stream.

Similarly, in certain embodiments, after contacting the solution of the third fluid stream comprises up to 10 vol %, up to 8 vol %, up to 6 vol %, up to 5 vol %, up to 3 vol %, up to 2 vol %, up to 1%, or less, and/or at least 0.001 vol %, at least 0.01 vol %, at least 0.1 vol %, at least 0.2 vol %, at least 0.3 vol %, at least 0.5 vol %, or more of the liquid of the second fluid stream (e.g., an organic liquid). Combinations of these ranges are possible. For example, in some cases, after contacting, the solution of the third fluid stream comprises at least 0.001 vol % and up to 10 vol % of the liquid of the second fluid stream. However, in some embodiments, after contacting, the solution of the third fluid stream comprises no observable amount of the solution of the second fluid stream.

In certain embodiments related to the electrochemical flow system involving contacting multiple liquids, the first fluid stream, the second fluid stream, the third fluid stream, and/or the fourth fluid stream may comprise a certain concentration of species other than the redox mediator, the reactant, or the chemical product. Examples of such species include ionic species. It should be noted that, in this context, species other than the redox mediator, the reactant, or the chemical product, as used herein, do not include dissolved protons or hydroxide ions (e.g., protons or hydroxide ions present due to the ionization equilibrium of water). In certain embodiments, it is beneficial for the first fluid stream and/or the fourth fluid stream to comprise a relatively high concentration of dissolved ionic species, especially in cases in which the first fluid stream and/or the fourth fluid stream is an electrolytic solution such as a catholyte anolyte solution. Having a relatively high concentration of ionic species can reduce solution resistance, for example, during the electrochemical reaction. Other sources the dissolved ions could also include buffering agents, in either their conjugate acid or conjugate base form. Examples of dissolved ions other than the redox mediator and/or the chemical reactant or product can include cations and anions of dissolved salts. Exemplary cations include, but are not limited to, alkali metal ions ($Li^+$, $Na^+$, $K^+$, etc.), alkaline earth metal ions ($Mg^{2+}$, $Ca^{2+}$, $Ca^{2+}$, $Sr^{2+}$, $Ba^{2+}$), ammonium ions (e.g., $NH_4^+$, quaternary ammonium ions, etc.), transition metal ions or complexes. Exemplary anions include, but are not limited to, halides (e.g., $Cl^-$, $Br^-$, $I^-$, etc.), and/or polyatomic anions (e.g., $ClO_4^-$, $NO_3^-$, $NO_2^-$, $SO_4^-$, $CO_3^{2-}$, $HCO_3^-$, $PO_4^{3-}$, $HPO_4^{2-}$, $H_2PO_4^-$, acetate, trifluoroacetate, borate, tetrafluoroborate, hexafluorophosphate, triflate, etc.).

In some embodiments, the solution of the first fluid stream comprises at least 1.0 mM, at least 2.0 mM, at least 5.0 mM, at least 10.0 mM, at least 15.0 mM, at least 20 mM, at least 30 mM, at least 50 mM, at least 75 mM, at least 0.1 M, or more of dissolved ionic species other than the redox mediator. In certain embodiments, the solution of the first fluid stream comprises up to 5 M, up to 4 M, up to 3 M, up to 2 M, up to 1 M, up to 0.75 M, up to 0.6 M, up to 0.5 M, or less of dissolved ionic species other than the redox mediator. Combinations of these ranges are possible. For example, in some embodiments, the solution of the first fluid stream comprises at least 1.0 mM and up to 5 M of dissolved ionic species other than the redox mediator.

In some embodiments, the solution of the fourth fluid stream comprises at least 1.0 mM, at least 2.0 mM, at least 5.0 mM, at least 10.0 mM, at least 15.0 mM, at least 20 mM, at least 30 mM, at least 50 mM, at least 75 mM, at least 0.1 M, or more of dissolved ionic species other than the redox mediator. In certain embodiments, the solution of the fourth fluid stream comprises up to 5 M, up to 4 M, up to 3 M, up to 2 M, up to 1 M, up to 0.75 M, up to 0.6 M, up to 0.5 M, or less of dissolved ionic species other than the redox mediator. Combinations of these ranges are possible. For example, in some embodiments, the solution of the fourth fluid stream comprises at least 1.0 mM and up to 5 M of dissolved ionic species other than the redox mediator.

In certain embodiments, the solution of the third fluid stream comprises a relatively small concentration of dissolved species other than the reactant and/or the chemical product. Having a relatively small concentration of dissolved species can allow for the production of the chemical reactant (e.g., hydrogen peroxide) in a relatively pure solution. For example, in some embodiments, the chemical product (e.g., hydrogen peroxide) is produced in the third fluid stream, and the third fluid stream comprises relatively pure water. As mentioned above, dissolved species could include dissolved ions or other contaminants such as organic contaminants. In some embodiments, the solution of the third fluid stream comprises less than or equal to 5.0 mM dissolved species other than the reactant or the chemical product. In some embodiments, the solution of the third fluid stream comprises less than or equal to 4.0 mM, less than or equal to 2.5 mM, less than or equal to 1.0 mM, less than or equal to 0.75 mM, less than or equal to 0.5 mM, less than or equal to 0.2 mM, less than or equal to 0.1 mM, less than or equal to 0.05 mM, less than or equal to 0.02 mM, less than or equal to 0.01 mM, or less of dissolved species other than the reactant or the chemical product. In some embodiments, the solution of the third fluid stream comprises greater than or equal to 1.0 µM, greater than or equal to 2.0 µM, greater than or equal to 5.0 µM, greater than or equal to 0.01 mM, or more of dissolved species other than the reactant or the chemical product. Combinations of these ranges are possible. For example, in some embodiments, the solution of the third fluid stream comprises greater than or equal to 1.0 µM and less than or equal to 5.0 mM dissolved species other than the reactant or the chemical product.

In some cases, a relatively large amount of chemical product (e.g., hydrogen peroxide) is produced in the solution of the third fluid stream (e.g., water), wherein the solution of the third fluid stream comprises a relatively low concentration of dissolved species other than the chemical reactant or the chemical product. In some embodiments, the solution of the third stream (e.g., after contacting the solution of the second stream comprising the active form of the redox mediator), comprises at least 1.0 mM, at least 2.0 mM, at least 5.0 mM, at least 10 mM, at least 15 mM, at least 20 mM or more, and/or up to 1 M, up to 0.75 M, up to 0.5 M, up to 0.25 M, up to 0.1 M, up to 0.075 M, up to 50 mM, or less of the chemical product (e.g., $H_2O_2$), while comprising less than or equal to 5.0 mM, 4.0 mM, less than or equal to 2.5 mM, less than or equal to 1.0 mM, less than or equal to 0.75 mM, less than or equal to 0.5 mM, less than or equal to 0.2 mM, less than or equal to 0.1 mM, less than or equal to 0.05 mM, less than or equal to 0.02 mM, less than or equal to 0.01 mM, or less of dissolved species other than the reactant and/or chemical product (e.g., $H_2O_2$).

In certain embodiments, the solution of the third fluid stream may have a certain pH range, depending on the intended application of the solution of the third stream. For example, in some cases a chemical product is produced that has a fairly narrow range of pH at which it is stable (e.g., toward hydrolysis, protonolysis, etc.). In some cases, such as in the case of water treatment, a certain pH range for the third fluid stream is desirable for environmental or public health reasons. In some embodiments, the solution of the third fluid stream has a pH of greater than or equal to 1.0, greater than or equal to 2.0, greater than or equal to 3.0, greater than or equal to, 4.0 greater than or equal to 5.0, greater than or equal to 5.5, greater than or equal to 6.0, greater than or equal to 6.5, greater than or equal to 7.0, greater than or equal to 7.5, greater than or equal to 8.0, or greater. In some embodiments, the solution of the third fluid stream has a pH of less than or equal to 14.0, less than or equal to 13.0, pH of less than or equal to 12.0, less than or equal to 11.0, pH of less than or equal to 10.0, less than or equal to 9.0, pH of less than or equal to 8.5, less than or equal to 8.0, pH of less than or equal to 7.5, less than or equal to 7.0, less than or equal to 6.5, less than or equal to 6.0, or less. Combinations of these ranges are possible. For example, in some cases (e.g., when hydrogen peroxide is the chemical product), the solution of the third fluid stream has a pH of greater than or equal to 5.0 and less than or equal to 7.0. Other ranges are possible.

In certain embodiments related to the electrochemical flow system involving slug flow, the first slug, the second slug, and/or the third slug may comprise a certain concentration of species other than the reactant or the chemical product. Examples of such species include ionic species. For example, in certain embodiments, it is beneficial for the first slug and/or the third slug to comprise a relatively high concentration of dissolved ionic species, especially in cases in which the first slug and/or the third slug is an electrolytic solution such as a catholyte or anolyte solution. As mentioned above, having a relatively high concentration of ionic species can reduce solution resistance, for example, during the electrochemical reaction. Other sources of dissolved ions could also include buffering agents, in either their conjugate acid or conjugate base form. Examples of dissolved ions other than the chemical reactant or product can include another of the ions mentioned in relation to the first and/or fourth streams of the electrochemical system involving contacting multiple liquids, as described above.

In some embodiments, the solution of the first slug comprises at least 1.0 mM, at least 2.0 mM, at least 5.0 mM, at least 10.0 mM, at least 15.0 mM, at least 20 mM, at least 30 mM, at least 50 mM, at least 75 mM, at least 0.1 M, or more of dissolved ionic species. In certain embodiments, the solution of the first fluid stream comprises up to 5 M, up to 4 M, up to 3 M, up to 2 M, up to 1 M, up to 0.75 M, up to 0.6 M, up to 0.5 M, or less of dissolved ionic species. Combinations of these ranges are possible. For example, in some embodiments, the solution of the first slug comprises at least 1.0 mM and up to 5 M of dissolved ionic species other than the redox mediator.

In some embodiments, the solution of the third slug comprises at least 1.0 mM, at least 2.0 mM, at least 5.0 mM, at least 10.0 mM, at least 15.0 mM, at least 20 mM, at least 30 mM, at least 50 mM, at least 75 mM, at least 0.1 M, or more of dissolved ionic species. In certain embodiments, the solution of the third slug comprises up to 5 M, up to 4 M, up to 3 M, up to 2 M, up to 1 M, up to 0.75 M, up to 0.6 M, up to 0.5 M, or less of dissolved ionic species. Combinations of these ranges are possible. For example, in some embodiments, the solution of the third slug comprises at least 1.0 mM and up to 5 M of dissolved ionic species other than the redox mediator.

In certain embodiments, the solution of the second slug comprises a relatively small concentration of dissolved species other than the reactant and/or the chemical product. Having a relatively small concentration of dissolved species can allow for the production of the chemical reactant (e.g., hydrogen peroxide) in a relatively pure solution. For example, in some embodiments, the chemical product (e.g., hydrogen peroxide) is produced in the second slug and the second slug comprises relatively pure water (i.e., water comprising a relatively low concentration of dissolved species). As mentioned above, dissolved species could include dissolved ions or other contaminants such as organic contaminants. In some embodiments, the solution of the slug stream comprises dissolved species other than the reactant or the chemical product in the same ranges disclosed for the third fluid stream of the electrochemical system involving contacting multiple liquids, as described above.

In some cases related to the electrochemical flow system involving slug flow, a relatively large amount of chemical product (e.g., hydrogen peroxide) is produced in the solution of the second slug (e.g., water), wherein the solution of the second slug comprises a relatively low concentration of dissolved species other than the chemical reactant or the chemical product. In some embodiments, the solution of the second slug (e.g., after contacting the first electrode comprising the active form of the immobilized redox mediator), comprises at least 1.0 mM, at least 2.0 mM, at least 5.0 mM, at least 10 mM, at least 15 mM, at least 20 mM or more, and/or up to 1 M, up to 0.75 M, up to 0.5 M, up to 0.25 M, up to 0.1 M, up to 0.075 M, up to 50 mM, or less of the chemical product (e.g., $H_2O_2$), while comprising less than or equal to 5.0 mM, 4.0 mM, less than or equal to 2.5 mM, less than or equal to 1.0 mM, less than or equal to 0.75 mM, less than or equal to 0.5 mM, less than or equal to 0.2 mM, less than or equal to 0.1 mM, less than or equal to 0.05 mM, less than or equal to 0.02 mM, less than or equal to 0.01 mM, or less of dissolved species other than the reactant and/or chemical product (e.g., $H_2O_2$).

In certain embodiments, the solution of the second slug may have a certain pH range, depending on the intended application of the solution of the third stream. For example, in some cases a chemical product is produced that has a fairly narrow range of pH at which it is stable (e.g., toward hydrolysis, protonolysis, etc.). In some cases, such as in the case of water treatment, a certain pH range for the second slug is desirable for environmental or public health reasons. In some embodiments, the solution of the second slug has a pH of greater than or equal to 1.0, greater than or equal to 2.0, greater than or equal to 3.0, greater than or equal to, 4.0 greater than or equal to 5.0, greater than or equal to 5.5, greater than or equal to 6.0, greater than or equal to 6.5, greater than or equal to 7.0, greater than or equal to 7.5, greater than or equal to 8.0, or greater. In some embodiments, the solution of the second slug has a pH of less than or equal to 14.0, less than or equal to 13.0, pH of less than or equal to 12.0, less than or equal to 11.0, pH of less than or equal to 10.0, less than or equal to 9.0, pH of less than or equal to 8.5, less than or equal to 8.0, pH of less than or equal to 7.5, less than or equal to 7.0, less than or equal to 6.5, less than or equal to 6.0, or less. Combinations of these ranges are possible. For example, in some cases (e.g., when hydrogen peroxide is the chemical product), the solution of the second slug has a pH of greater than or equal to 5.0 and less than or equal to 7.0. Other ranges are possible.

The use of the system and methods described herein may allow for the production of the chemical product with a relatively high efficiency. For example, the electrochemical flow system described herein involving contacting multiple liquids, as described above may result in the formation of the chemical product (e.g., $H_2O_2$) with a relatively high faradaic efficiency. Faradaic efficiency with respect to the production of the chemical product generally relates to the ratio of amount of charge (in C) passed during an electrochemical process that contribute to the formation of the chemical product to the amount of charge passed in total during the electrochemical process. In some embodiments, the chemical product is formed the faradaic efficiency of at least 80%, at least 85%, at least 90%, at least 95%, at least 99%, or more. In some embodiments in which hydrogen peroxide is the chemical product, the hydrogen peroxide is produced (e.g., in water) with a faradaic efficiency of at least 80%. The electrochemical flow system described herein involving slug flow, as described above may result in the formation of the chemical product (e.g., $H_2O_2$) with a relatively high faradaic efficiency as well, including faradaic efficiencies in the ranges cited above for the system involving contacting multiple liquids.

The electrochemical flow processes described herein may produce the chemical product with a relatively high overall energy efficiency, including the regeneration of reactants such as the redox mediator. For example, in some cases the electrochemical system involving contacting multiple liquids produces the chemical product with a relatively high overall energy efficiency. As another example, in some cases, the electrochemical system involving slug flow produces the chemical product with a relatively high overall energy efficiency. The relatively high energy efficiency can be a result, at least in part, of the methods described herein producing the chemical product in a solution relatively free of contaminants requiring separation, as well as cycling through redox mediators in a facile manner (e.g., electrochemically as opposed to thermally). In some embodiments, the chemical product is produced and the reactant (e.g., active form of the redox mediator) is regenerated with an overall energy input of less than or equal to 250 kJ per mole of chemical product produced. In some embodiments, the chemical product is produced and the reactant is regenerated with an overall energy input of less than or equal to 1000 kJ, less than or equal to 750 kJ, less than or equal to 500 kJ, less than or equal to 400 kJ, less than or equal to 300 kJ, less than or per mole of chemical product produced. As a more specific example, in some embodiments, the system and/or methods described herein can be used to produce a solution containing at least 20 mM $H_2O_2$ and less than 5 mM of ionic species, at a pH between 5 and 7, by reacting a reactant with oxygen gas to generate the $H_2O_2$, with an overall energy input required to produce the solution and regenerate the reactant is less than or equal to 250 kJ/mol of $H_2O_2$ produced.

In some embodiments, a certain electrical potential, in volts, is applied to the first electrode (e.g. the first electrode of the system involving contacting multiple liquids, or the system involving slug flow). In some cases, the electrical potential applied to the first electrode can be expressed in terms of the overall cell potential. The electrical potential may be applied using any suitable power supply. The overall cell potential refers to the potential difference between the two half cells of an electrochemical cell. In some embodiments, the methods described herein comprise applying a cell potential of at least 1.5 V, at least 1.6 V, at least 1.7 V, at least 1.8 V, at least 1.9 V, at least 2.0 V, at least 2.2 V, or more, and/or up to 2.4 V, 3.2 V, up to 3.0 V, up to 2.9 V, up to 2.8 V, up to 2.6 V, up to 2.5 V, or less. Combinations of these ranges are possible. For example, in some embodiments, the methods described herein comprise applying a cell potential of at least 1.5 V and up to 3.2 V, or at least 2.0 V and up to 2.4 V. In certain cases, the chemical product (e.g., hydrogen peroxide) can be produced with at least a 50%, at least a 60%, at least a 70%, at least an 80%, or greater faradaic efficiency with an application of the cell potential of less than or equal to 2.4 V, less than or equal to 2.2 V, less than or equal to 2.0 V, or less. For example, in some cases, the chemical product can be produced with at least a 70% faradaic efficiency with an application of the cell potential of less than or equal to 2.4 V. These ranges may apply to the electrochemical system involving contacting multiple liquids. Alternatively, these ranges may apply to the electrochemical system involving slug flow.

In some embodiments, the fluid streams described herein are flowed at certain flow rates. Flow rates of the fluid streams (e.g., the first fluid stream, the second fluid stream, the third fluid stream, and/or the fourth fluid stream) may be modulated (e.g., with pumps, valves, surge tanks, etc.) for a variety of reasons, such as the desired output rate of the chemical product, the desired faradaic efficiency, the desired energy efficiency, and/or the desired residence time of the various streams in certain components of the system, such as the first and/or second module.

In some embodiments, the first fluid stream is flowed through the system at a flow rate of at least 5 mL/min., at least 10 mL/min., at least 15 mL/min., at least 20 mL/min., at least 35 mL/min., at least 50 mL/min., at least 100 mL/min., or more. In some embodiments, the first fluid stream is flowed through the system at a flow rate of less than or equal to 1000 mL/min., less than or equal to 750 mL/min., less than or equal to 500 mL/min., less than or equal to 200 mL/min., less than or equal to 150 mL/min., less than or equal to 100 mL/min., less than or equal to 20 mL/min., or less. Combinations of these ranges are possible. For example, in some embodiments, the first fluid stream is flowed through the system at a flow rate of at least 5 mL/min. and less than or equal to 1000 mL/min, or at least 5 mL/min. and less than or equal to 100 mL/min.

In some embodiments, the second fluid stream is flowed through the system at a flow rate of at least 5 mL/min., at least 10 mL/min., at least 15 mL/min., at least 20 mL/min., at least 35 mL/min., at least 50 mL/min., at least 100 mL/min., or more. In some embodiments, the second fluid stream is flowed through the system at a flow rate of less than or equal to 1000 mL/min., less than or equal to 750 mL/min., less than or equal to 500 mL/min., less than or equal to 200 mL/min., less than or equal to 150 mL/min., less than or equal to 100 mL/min., less than or equal to 20 mL/min., or less. Combinations of these ranges are possible. For example, in some embodiments, the second fluid stream is flowed through the system at a flow rate of at least 5 mL/min. and less than or equal to 1000 mL/min, or at least 5 mL/min. and less than or equal to 100 mL/min.

In some embodiments, the third fluid stream is flowed through the system at a flow rate of at least 1 mL/min., at least 5 mL/min., at least 10 mL/min., at least 15 mL/min., at least 20 mL/min., at least 35 mL/min., at least 50 mL/min., at least 100 mL/min., or more. In some embodiments, the third fluid stream is flowed through the system at a flow rate of less than or equal to 1000 mL/min., less than or equal to 750 mL/min., less than or equal to 500 mL/min., less than or equal to 200 mL/min., less than or equal to 150 mL/min., less than or equal to 100 mL/min., less than or equal to 50 mL/min., less than or equal to 20 mL/min., or less. Combinations of these ranges are possible. For example, in some embodiments, the third fluid stream is flowed through the system at a flow rate of at least 1 mL/min. and less than or equal to 1000 mL/min, or at least 5 mL/min. and less than or equal to 100 mL/min, or at least 1 mL/min. and less than or equal to 20 mL/min.

In some embodiments, the fourth fluid stream is flowed through the system at a flow rate of at least 5 mL/min., at least 10 mL/min., at least 15 mL/min., at least 20 mL/min., at least 35 mL/min., at least 50 mL/min., at least 100 mL/min., or more. In some embodiments, the fourth fluid stream is flowed through the system at a flow rate of less than or equal to 1000 mL/min., less than or equal to 750 mL/min., less than or equal to 500 mL/min., less than or equal to 200 mL/min., less than or equal to 150 mL/min., less than or equal to 100 mL/min., less than or equal to 50 mL/min., less than or equal to 20 mL/min., or less. Combinations of these ranges are possible. For example, in some embodiments, the fourth fluid stream is flowed through the system at a flow rate of at least 5 mL/min. and less than or equal to 1000 mL/min, or at least 5 mL/min. and less than or equal to 100 mL/min.

In some embodiments, the ratio of the flow rate of the second fluid stream (e.g., an organic liquid comprising the active form of the redox mediator) and the flow rate of the third fluid stream (e.g., an aqueous solution comprising the reactant) is controlled so as to adjust the residence time of the third fluid stream. The residence time of the third fluid stream may affect the efficiency of the chemical reaction that produces the chemical product as well as the concentration of product formed in the third fluid stream. In some embodiments, the ratio the flow rate of the second fluid stream to the flow rate of the third fluid stream is greater than or equal to 0.1, greater than or equal to 0.25, greater than or equal to 0.5, greater than or equal to 1, or more. In some embodiments, the ratio of the flow rate of the second fluid stream to the flow rate of the third fluid stream is less than or equal to 3, less than or equal to 2, less than or equal to one, or less. Combinations of these ranges are possible. For example, in some embodiments, the ratio of the flow rate of the second fluid stream to the flow rate of the third fluid stream is greater than or equal to 0.1 and less than or equal to 3. Other ranges are possible.

In some cases, the systems (e.g., the electrochemical flow system involving contacting multiple liquids, or the electrochemical system involving slug flow) described herein can produce the chemical product while being relatively portable. The systems may be relatively portable in cases in which it has a relatively small overall volume and/or mass. Being relatively portable may allow the systems described herein to be useful in certain applications, such as water treatment in remote locations (e.g., via on-site electrochemical production of hydrogen peroxide in water). In certain cases, the systems produce relatively large amounts of the chemical product while having a relatively low volume and/or mass.

In some embodiments, the systems have a relatively low overall volume. The overall volume of a system refers to the some of the volume of the electrochemical cell as well as any modules (e.g., a first module, a second module, a third module, etc.), fluidic connections such as conduits/channels/tubing, pumps, valves surge tanks, and power supplies that may be used in a particular configuration. In some embodiments, the system has an overall volume of less than or equal to 10 L, less than or equal to 5 L, less than or equal to 2 L, less than or equal to 1 L, less than or equal to 500 mL, less than or equal to 200 mL, less than or equal to 100 mL, less than or equal 50 mL, 25 mL or less (e.g., in the case of a system comprising microfluidic components). These ranges may apply to the electrochemical system involving contacting multiple liquids. Alternatively, these ranges may apply to the electrochemical system involving slug flow.

However, in some cases, the systems described herein can be used for relatively large-scale applications. As such, in some embodiments, the system has an overall volume of at least 10 L, at least 20 L, at least 50 L, at least 100 L, at least 200 L, at least 500 L, at least 1000 L, or more.

In some embodiments, the systems have a relatively low overall mass. The overall volume of the system refers to the sum of the mass of the electrochemical cell as well as any modules (e.g., a first module, a second module, a third module, etc.), fluidic connections such as conduits/channels/tubing, pumps, valves, surge tanks, and power supplies that may be used in a particular configuration. The overall mass does include the mass of the fluid streams (i.e., the solutions of the fluid streams). In some embodiments, the system has an overall mass of less than or equal to 10 kg, less than or equal to 5 kg, less than or equal to 2 kg, less than or equal to 1 kg, less than or equal to 0.5 kg, less than or equal to 200 g, less than or equal to 100 g, less than or equal to 50 g, less than or equal to 10 g, less than or equal to 1 g, less than or equal to 500 mg, less than or equal to 300 mg, less than or equal to 100 mg, or less. These ranges may apply to the electrochemical system involving contacting multiple liquids. Alternatively, these ranges may apply to the electrochemical system involving slug flow.

However, in some cases, the systems described herein can be used for relatively large-scale applications. As such, in some embodiments, the system has an overall mass of at least 10 kg, at least 20 kg, at least 50 kg, at least 100 kg, at least 200 kg, at least 500 kg, at least 1000 kg, or more.

The following examples are intended to illustrate certain embodiments of the present invention, but do not exemplify the full scope of the invention.

EXAMPLE 1

This non-limiting example describes one embodiment of a system for continuously producing hydrogen peroxide using an electrochemical flow process involving phase transfer of a redox mediator and contacting multiple liquids.

Materials and Methods:

Disodium anthraquinone-2,7-disulfonate monohydrate was obtained from TCI Chemicals and used as received (ACS Grade). Perchloric acid (99.9995%), sodium hydroxide (99.995%, semiconductor grade), tetrabutylammonium chloride and bromide (99%) and disodium EDTA were obtained from Sigma-Aldrich. Citric acid was obtained from VWR (99%). Aqueous solutions were produced using Millipore 18.2 MΩ cm$^{-2}$ water. 1-hexanol was obtained from Sigma-Aldrich and used as received (ACS grade). Carbon felt, G100 Soft Graphite Battery Felt, was obtained from AvCarb, and nickel foam from Xiamen Tmax battery supplies (6 mm thickness). Graphite rods were purchased from Sigma-Aldrich (150×6 mm, 99.999%), Pt mesh and wire were obtained from Alfa-Aesar (99.995%), and Ag/AgCl leakless reference electrodes from eDaq. Bipolar membranes were synthesized by Fumasep and purchased from Fuel Cell Store, and kept in 1 M NaCl solutions when not in use.

All batch (i.e., non-flow) electrochemical experiments were conducted at ambient temperature (21±1° C.) using a Biologic VSP 16-channel potentiostat and a three-electrode electrochemical cell with a porous glass frit separating the working and auxiliary compartments. Unless otherwise stated, a platinum mesh was used as the counter electrode. Leakless Ag/AgCl reference electrodes were used for experiments conducted in acidic electrolytes, and stored in Milliq® water when not in use. Reference electrodes were periodically checked relative to pristine reference electrodes to ensure against potential drift. Electrode potentials were converted to the RHE scale using $E(RHE)=E(Ag/AgCl)+0.197$ V$+0.059(pH)$ V. Cyclic voltammograms were collected using a fresh graphite rod electrode in quiescent $N_2$-sparged electrolyte. Batch bulk electrolyses were conducted using the same working electrode but with stirring at 600 rpm in potentiostatic mode between 200 and 300 mV negative of the standard potential, $E^0$, stopping reduction when the current dropped below 0.7 mA and the dark characteristic color of semiquinone (formed by comproportionation) disappeared. Ohmic drop, as indicated by $R_u$, was generally under 30Ω and thus was uncompensated.

Figure 13:
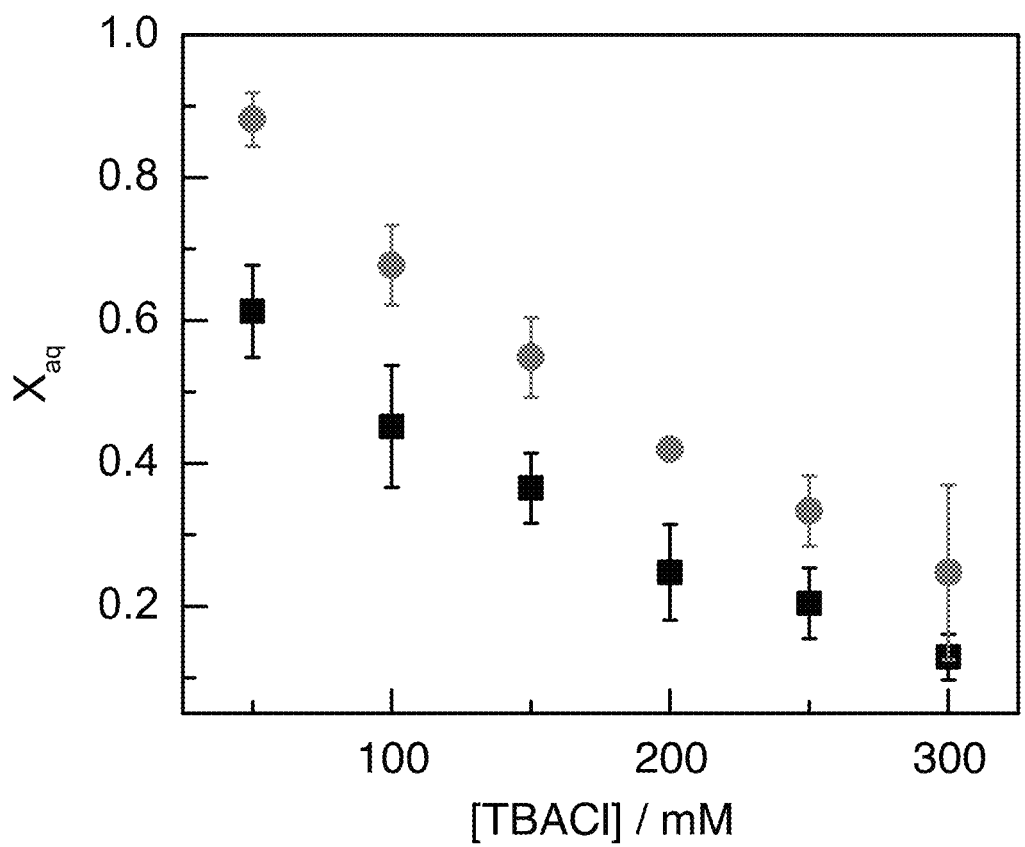
FIG. 13 shows a plot of the partition equilibria of the active and non-active forms of a redox mediator between an aqueous phase and an organic phase, as expressed by a mole fraction in the aqueous phase following mixing, and as a function of phase transfer catalyst concentration, according to certain embodiments.

UV-visible spectra were collected on a Varian Cary 50 UV/visible spectrometer, with manual baseline correction. Starma 1 cm2 quartz cells were used with a septum cap. To quantify the extent of phase transfer in the oxidized state, two phases (20 mM anththraquinone-2,7-disulfonate disodium salt in 0.1 M $HClO_4$ and TBACl in 1-hexanol) were shaken in a vial and allowed to separate for 5 minutes, then the amount of quinone remaining in the aqueous layer was measured by UV, against a starting concentration of a stock solution (with known c of 5.7 $M^{-1}cm^{-1}$ at 328 nm). To quantify the extent of phase transfer in the reduced state, bulk electrolysis of the same 20 mM AQ-2,7-DS was carried out in a $N_2$—filled 'wet' glove box, followed by mixing and separation of phases. The aqueous phase was removed from the glove box and bubbled with $O_2$ for 2 minutes, then stirred under air for 20 minutes and the absorbance at 328 nm was also measured. FIG. 13 shows a plot of the partitioning of anththraquinone-2,7-disulfonate between the 0.1 M $HClO_4$ aqueous phase and the 1-hexanol phase as a function of TBACl concentration in the 1-hexanol, indicating that the partition equilibria for both the reduced (circles) and oxidized (squares) species varies as a function of TBACl concentration.

Phase Transfer Electrochemical Flow Apparatus

The flow system for the electrochemical production of hydrogen peroxide, as used in this example, included two mixer-settlers (MS-1 and MS-2 in FIG. 8), an electrochemical cell, and four main streams. As depicted in the schematic illustration of the system in FIG. 8, the aqueous catholyte stream (dotted line), carried the active form of the redox mediator, reduced anthraquinone-2,7-disulfonate (a hydroquinone species abbreviated as $Na_2AQH_2$ in FIG. 8) from the electrochemical cell to the organic stream (dashed line), where it and the inactive form of the redox mediator, oxidized, quinone form of the anthraquinone-2,7-disulfonate (abbreviated as $Na_2AQ$ in FIG. 8) from the organic stream back to the electrochemical cell. The organic stream carried the reduced anthraquinone to the oxygen-water reaction zone (MS-2) and the oxidized anthraquinone back from the zone. The water stream (solid line) entered the reaction zone where it was sparged with $O_2$ and was contacted with reduced anthraquinone in the organic stream via MS-2. Following contact with the organic stream, the water stream then carried hydrogen peroxide out of the reaction zone. The aqueous anolyte stream (alternating long and short dashed line) circulated through the anodic half-cell. The streams were pumped around using eight pump heads connected to four pump drives (shown as P1, P2, P3, and P4 in FIG. 8). Five surge tanks (shown as S1, S2, S3, S4, and S5 in FIG. 8) allowed buffering fluctuations in flow and sparging with and/or disengagement of gases.

Figure 8:
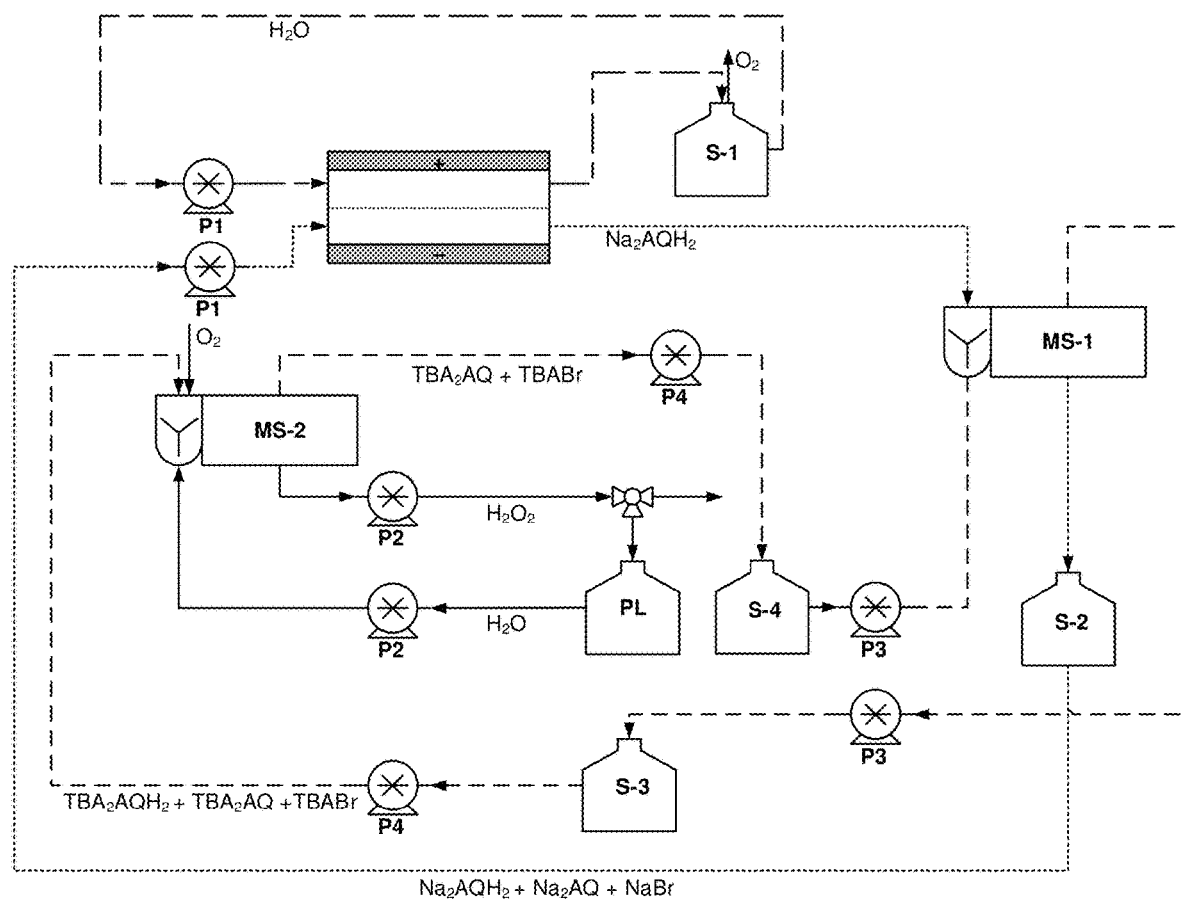
FIG. 8 shows an exemplary schematic of an electrochemical flow system, according to certain embodiments.
Figure 8:
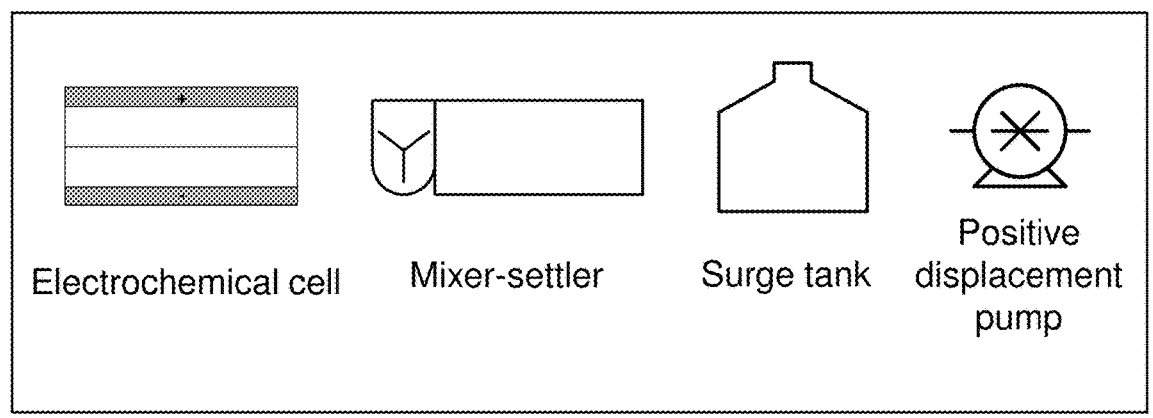

The flow system shown in FIG. 8 was controlled by four Masterflex L/S digital drive peristaltic pumps purchased from Cole-Palmer, each with a double head, allowing for eight streams to be pumped through 14 gauge Masterflex Viton® tubes. Tubing used in the system was ⅛" ID Versilion® and Tygon® tubing for organic and aqueous streams respectively. The surge tanks were used to buffer the small fluctuations and drifts in flow rates of the streams which would otherwise disturb the level control in the settling zones of the mixer-settlers. This was done by constantly adjusting the flow rates to maintain the liquid levels in the tanks and maintain equal volumes of each phase in the mixer-settlers. This was mainly due to the small flow rates considered in this example (2.5-20 mL/min). At higher flow rates, the relative error in flow would be insignificant and the need for surge tanks would be obviated.

As mentioned above, the process described in this example involved two mixer-settlers. The first mixer-settler (MS-1 in FIG. 8), mixed the catholyte with the organic stream, while the second mixer-settler (MS-2) mixed the water stream with the organic stream while being sparged with $O_2$. MS-1 was machined from polypropylene, and a 3D cross-sectional view of MS-1 is shown in FIG. 10. The mixing zone was a cylindrical cup, with liquid inlets on both sides at the bottom of the cup, and was separated from the settling zone by an emulsion overflow and a baffle. The settling zone had three coalescence plates, to accelerate phase separation, and a light phase weir to allow for level fluctuations. The volumes of the mixing and settling zones was ~100 mL each, resulting in a total holdup volume of ~200 mL.

MS-2 was custom made by James Glass, Inc., and an image of MS-2 is shown in FIG. 12. The mixing chamber was covered with a cap that had ports to allow for gas flow in and out of the mixing chamber. A gas dispersion tube with porous fritted glass tip, connected to $O_2$ flow, was inserted through the port and into center of the mixing zone to sparge the mixing phases from the organic stream and the water stream at the set gas flow rate. The mixing zone was a cylindrical cup, with liquid inlets on both sides at the bottom, and was separated from the settling zone by an emulsion overflow and a baffle. The settling zone had four coalescence plates. The volumes of the mixing zone was ~120 and the settling zones was ~100 ml, resulting in a total holdup volume of ~220 ml. FIG. 12 depicts MS-2 with a 1-hexanol/water emulsion being sparged with $O_2$ in the mixing chamber and phase separation occurring in the settling chambers.

This glass mixer was soaked in 10% nitric acid for at least 12 h before use, and the gas dispersion tube was soaked in aqua regia for the same time, then sonicated for 3×20 minutes with MilliQ deionized water. The use of a glass unit allowed a better monitoring of the mixing zone as well as a stricter level control in the settling zone.

Magnetic stir bars (1") were used to stir phases in the mixing zone of both mixer-settles at a rate of 600 rpm.

Figure 11:
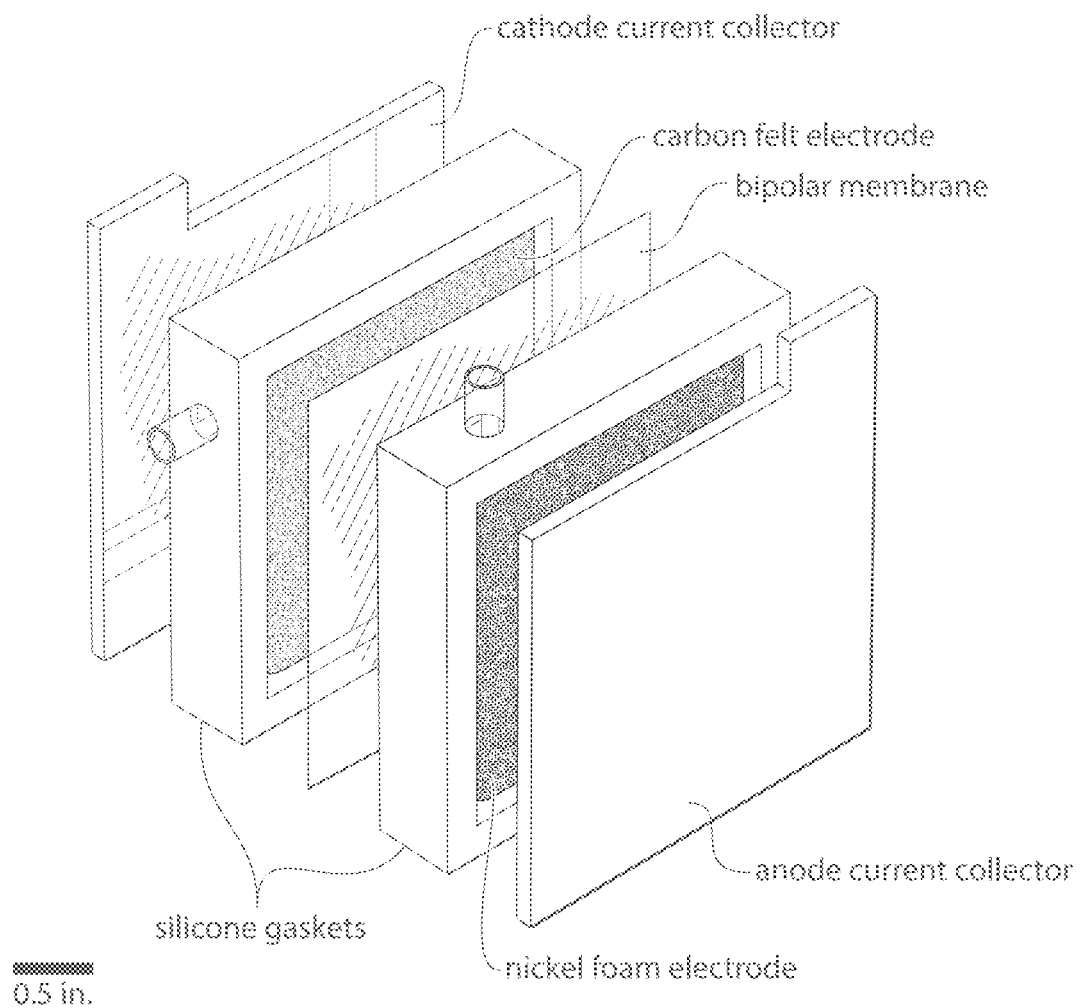
FIG. 11 shows a 3D exploded view of an electrochemical cell according to certain embodiments.

A custom flow electrochemical cell was fabricated for use in the system of this example. FIG. 11 shows a 3D exploded schematic of the custom flow electrochemical cell. Two 3"×3", ⅛" thick, 316 stainless steel sheets were used as current collectors. Two 3"×3", ½" thick, high-temperature silicone rubber sheets (50A Durometer) were used to make the anodic and cathodic half cells (i.e., the second electrode compartment and first electrode compartment, respectively). Cavities (2"×2") were made in the silicone sheets to accommodate the electrode material; four 2"×2" graphite battery felt pieces for the anode, and three 2"×2" nickel foam sheets for the anode. Polypropylene inlet and outlet fittings were inserted into the sides of the silicone sheets to allow for anolyte and catholyte circulation flows. The two half-cells were separated by a 3"×3" bipolar membrane.

Electrochemical analysis was performed potentiostatically using VersaSTAT 3 Potentiostat Galvanostat from Ametek®, and the results were analysed in VersaStudio by Princeton Applied Research.

Surge tanks in the flow system were charged with the appropriate solutions, shown in Table 1. The 20 mM of quinone dissolved in the organic phases was prepared by shaking 5 vol % of 1 M quinone in 0.1 M $HClO_4$ with the organic phase.

TABLE 1

Priming solutions in surge tanks.

| Tank | Solution | Volume (ml) |
|---|---|---|
| S-1 | 0.1M NaOH (aq) | 150 |
| S-2 | 20 mM AQ-2,7-DS/0.1M $HClO_4$ (aq) | 150 |
| S-3 | 20 mM AQ-2,7-DS/0.1M TBACl (hexanol) | 150 |
| S-4 | 20 mM AQ-2,7-DS/0.1M TBACl (hexanol) | 150 |
| PL | Water w/stabilizer (1 mM $Na_2$EDTA, 3 mM citric acid) | 2000* |

*When running the closed peroxide loop, 150 ml of water w/stabilizer is used.

The mixer-settlers were then primed by syringe addition of 100 mL of each 20 mM AQ-2,7-DS/0.1 M $HClO_4$ and 20 mM AQ-2,7-DS/0.1 M TBACl/hexanol in MS-1, 110 mL of each of stabilized water and 0.1 M TBACl/hexanol in MS-2. The pumps were run at 10 ml/min for 20 mins to allow the system to reach equilibrium before electrochemistry or $O_2$ sparging were commenced. Tanks S-2, S-3 and S-4 were constantly bubbled with nitrogen to prevent oxygen from M-S 2, carried by the organic phase, from entering the electrochemical cell during the operation of the system. The flow system was kept at the ambient temperature of 20-22° C. without any heating or cooling.

EXAMPLE 2

This example describes further experimentation and measurements relating to the system for producing hydrogen peroxide using an electrochemical flow process described in Example 1.

Figure 9:
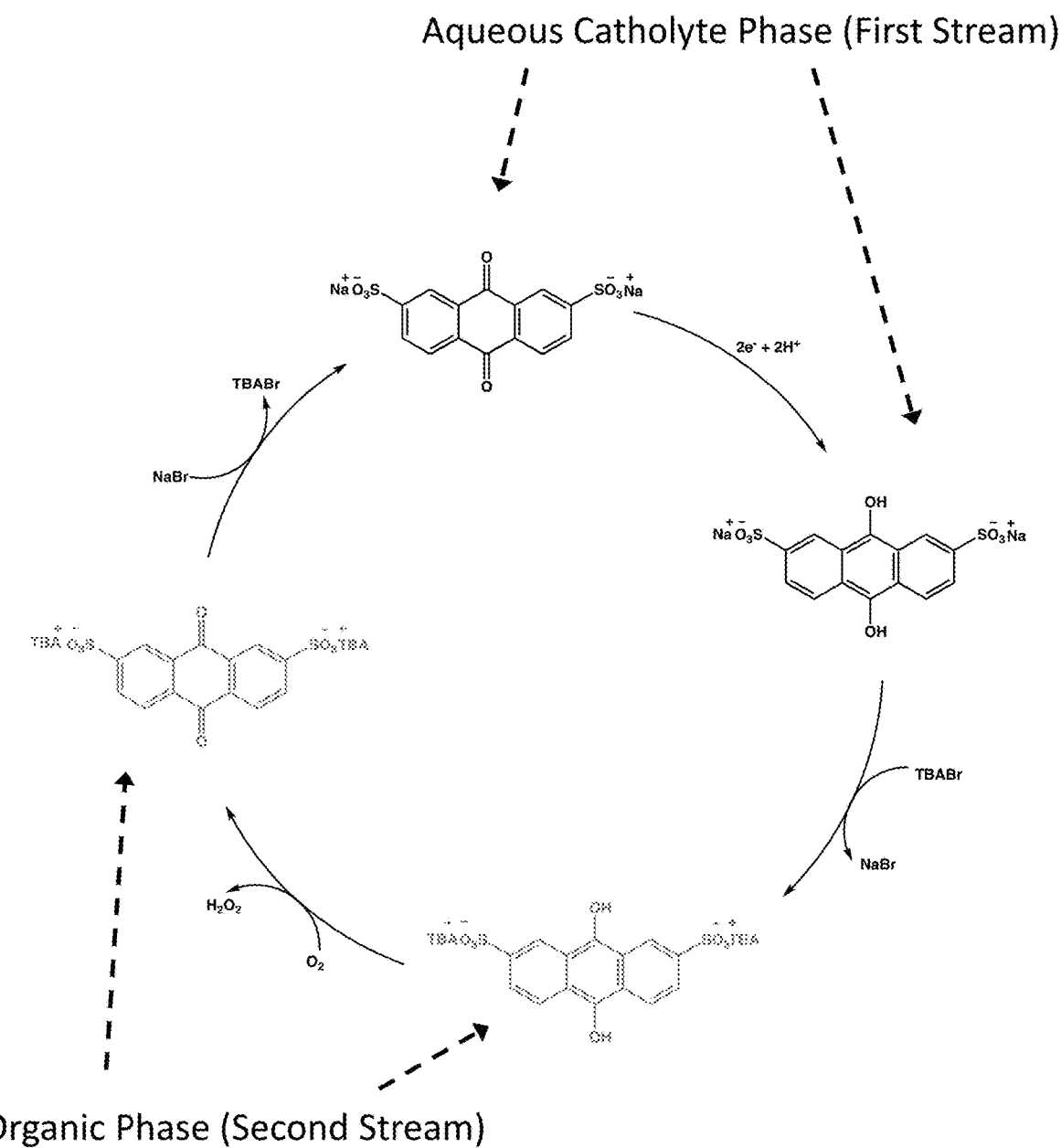
FIG. 9 depicts an exemplary mechanistic cycle for an electrochemical process involving the phase transfer of a redox mediator, according to certain embodiments.

To generate hydrogen peroxide, a set constant potential was applied across the cell concurrent with the commencement of $O_2$ bubbling. In the anodic half-cell, water was electrolyzed to produce oxygen and protons. Oxygen was vented out of the anolyte in S-1 (see FIG. 8). Protons were transferred across the bipolar membrane and into the cathodic half-cell, where the quinone (anthraquinone-2,7-disulfonate) was reduced to the corresponding hydroquinone upon acquiring two electrons and two protons. The catholyte stream carried the reduced quinone to MS-1 where it is contacted with hexanol. Both reduced and oxidized anthraquinone-2,7-disulfonate partitioned among the two phases (the aqueous catholyte and the organic hexanol stream) according to the partition equilibria shown in FIG. 13. The organic stream, now enriched with reduced quinone (the hydroquinone form of anthraquinone-2,7-disulfonate), was pumped into MS-2 where it was contacted with water and sparged with oxygen. A three-phase reaction took place in MS-2, where $O_2$ dissolved in the aqueous phase and diffused to the aqueous-organic interface, where reduced anthraquinone on the organic phase side of the interface was oxidized and the oxygen on the aqueous side of the interface was reduced and acquired the protons from the quinone to form hydrogen peroxide and the quinone form of the anthraquinone-2,7-disulfonate. In effect, the process described in this example involved the transfer of protons from the electrolyzed water in the anolyte, across the bipolar membrane, in the cell, and two organic-aqueous interfaces, in the mixer-settlers, to the oxygen with quinone redox mediator serving as a mass transfer and energy mediator. FIG. 9 shows cycle for the overall reaction, including the cycling of the anthraquinone-2,7-disulfonate between its active (quinone) and non-active (anthraquinone-2,7-disulfonate) forms during the production of hydrogen peroxide, as well as the different counter cations of the anthraquinone-2,7-disulfonate anion in the first stream ($Na^+$) and the second stream (tetrabutylammonium, TBA). The flow rate of oxygen was maintained at 10 ml/min to achieve the complete oxidation of the quinone, while excess gas left the mixer of MS-2 through a headspace outlet port.

After the mixing and settling in MS-2, the organic phase carried the oxidized quinone back into MS-1, where it partitioned among the two phases (the catholyte and the organic streams). This partitioning introduced freshly oxidized quinone into the catholyte, which was reduced again in the electrochemical cell.

Quantitative analysis of the system was then performed. The flow rates of the streams were changed for the different experiments as seen in Table 2. The different experiments included a configuration for steady-state $H_2O_2$ production, in which the water stream was not recycled back into MS-2 after exiting MS-2, as well as a "looping" configuration in which the water stream, after exiting the outlet of MS-2, was recycled back into the inlet of MS-2 so that $H_2O_2$ would accumulate in the water stream over the course of numerous cycles.

TABLE 2

Flow rate variation with experiment.

| Experiment | Flow rates (ml/min) | | | | τ (min) | |
|---|---|---|---|---|---|---|
| | Anolyte | Catholyte | Organic | Water | Water | Quinone |
| Variation of current | 10 | 10 | 10 | 10 | 11 | 70 |
| Steady-state $H_2O_2$ production | 10 | 10 | 10 | 10 | 11 | 70 |
| Looping | 10 | 10 | 10 | 10 | 11 | 70 |
| Flow rate variation | 10 | 10 | 10 | 20 | 5.5 | 70 |
| | 10 | 10 | 10 | 10 | 11 | 70 |
| | 10 | 10 | 10 | 5 | 22 | 70 |
| | 10 | 10 | 10 | 2.5 | 44 | 70 |

The residence time, τ, of a stream in a unit was obtained as the ratio of holdup volume, V, of the unit to the flow rate stream, F.

$$\tau = \frac{V}{F} \quad (1)$$

The residence time of the water stream was calculated by using the water flow rate and half the total holdup volume in MS-2 (110 ml), because equal volumes of the phases were maintained in the mixer-settlers. As for the residence time of quinone, which in this example refers to the time it takes for a molecule of quinone to make it around the entire process once, the half holdup volumes of both mixer-settlers were used as well as tanks S-2, S-3, S-4, the electrochemical cell, and the connecting tubing, resulting in a total holdup volume of ~700 ml. For flow rates, because all quinone carrying streams were flowing at the same rate in all the experiments, the catholyte flow rate was used.

$H_2O_2$ was quantified by iodometric titration, generating $I_2$ from the addition of an aliquot of solution to KI and $H_2SO_4$ and quenching the formed $I_2$ with 0.1 M $Na_2S_2O_3$, according to a standard procedure, which is described in Chen, Z., Chen, S., Siahrostami, S., Chakthranont, P., Hahn, C., Nordlund, D., Dimosthenis, S., Norskov, Bao, Z., & Jaramillo, T. F. (2017). *Development of a reactor with carbon catalysts for modular-scale, low-cost electrochemical generation of $H_2O_2$. Reaction Chemistry & Engineering,* 2(2), 239-245, which is incorporated by reference herein in its entirety. To further ensure accuracy, and to ensure no oxidant interference, peroxide titrations were periodically cross-checked by the use of peroxidase-based semi-quantitative test strips (Millipore MQuant™, 0-100 ppm/100-1000 ppm, LaMotte InstaTest™ 0-90 ppm, 1 mM=34 ppm).

The rate of $H_2O_2$ production (in μmol/s) was calculated from the measured peroxide concentration, $C_{H_2O_2}$, (in mM) and the flow rate of the product stream, $F_{water}$ (in ml/min).

$$R_{H_2O_2} = \frac{F_{water} C_{H_2O_2}}{60} \quad (2)$$

The current density (in mA/cm²) was calculated from the ratio of the current, I, (in mA) and the geometric area of the electrode 2"×2"=25.81 cm².

$$j = \frac{I}{25.81} \quad (3)$$

The Faradaic efficiency (% $H_2O_2$ production) was calculated from the ratio of the calculated rate of the peroxide production, $R_{H_2O_2}$, to the theoretical rate, $R_{H_2O_2,th}$.

$$FE = \frac{R_{H_2O_2}}{R_{H_2O_2,th}} \quad (3)$$

where, $$R_{H_2O_2,th} = \frac{I}{96.485} \quad (4)$$

Figure 14:
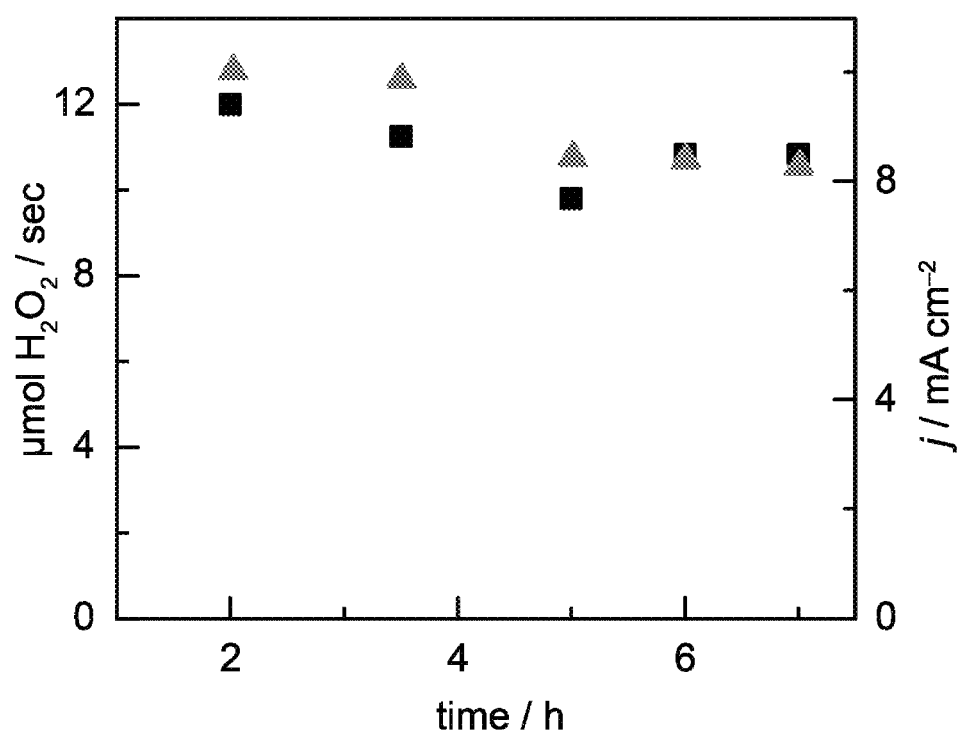
FIG. 14 shows a plot overlaying the rate of hydrogen peroxide production in water and the current density recorded in an electrochemical flow system as a function of time, according to certain embodiments.

FIG. 14 shows a plot of the rate of production of $H_2O_2$ (black squares) vs. time using the steady-state (non-recycled) configuration for the water stream (2000 mL), with an electrical potential of 2.3 V applied. FIG. 14 also shows the current density vs. time (triangles) for the same experiment, showing relatively constant quinone re-reduction and good correspondence between the current density in the electrochemical cell and the rate of $H_2O_2$ production.

Figure 15A:
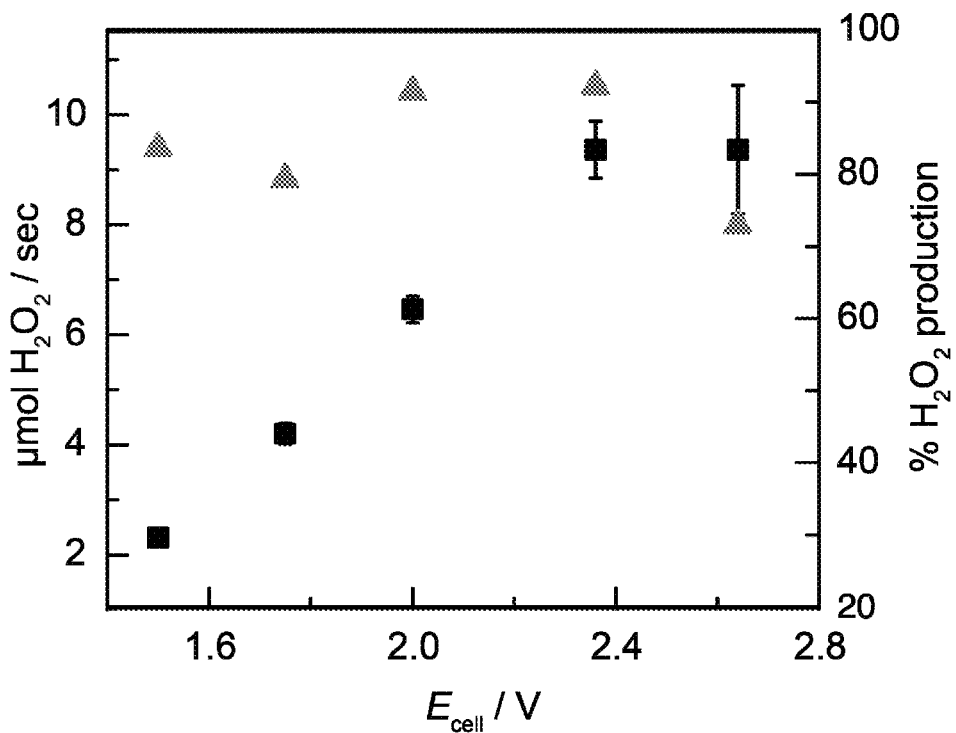
FIG. 15A shows a plot overlaying the rate of hydrogen peroxide production in water and the faradaic efficiency in an electrochemical flow system as a function of time, according to certain embodiments.
Figure 15B:
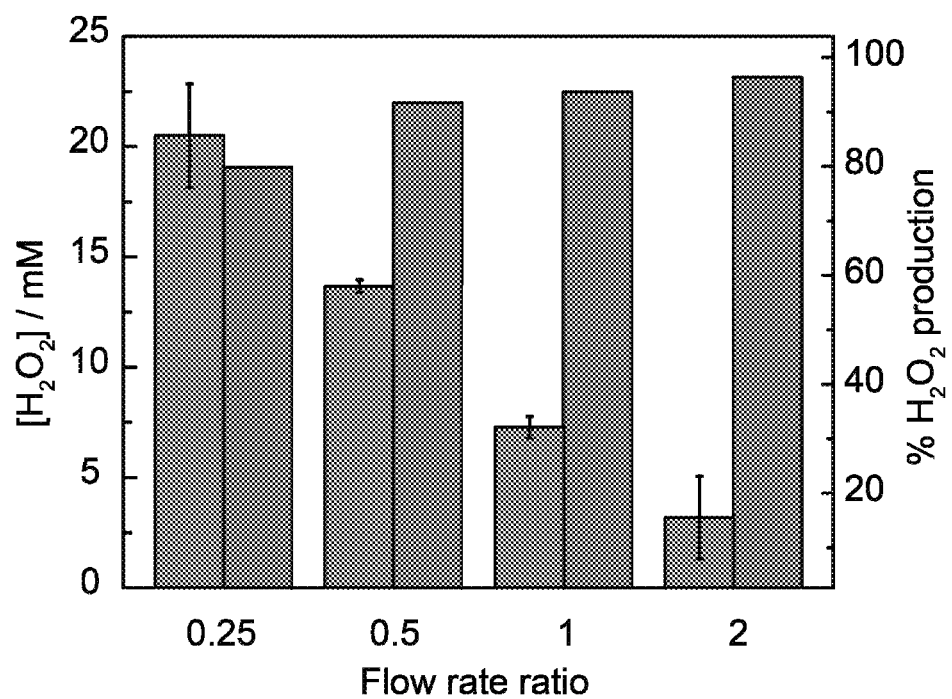
FIG. 15B shows a plot depicting the concentration of hydrogen peroxide produced in water and the faradaic efficiency in an electrochemical flow system as a function of a ratio of flow rates, according to certain embodiments.

FIG. 15A shows a plot of the rate of production of $H_2O_2$ (black squares) vs. a varying electrical potential of ranging from 1.5-2.7 V applied using the steady-state (non-recycled) configuration for the water stream (2000 mL). FIG. 15A also shows the faradaic efficiency for $H_2O_2$ production vs. potential applied for the same experiment. The results shown in FIG. 15A indicate that, under certain conditions, the efficiency of the system is potential-dependent, while the rate of hydrogen peroxide generation is less sensitive to the applied potential. Moreover, faradaic efficiencies of over 80% are achievable. FIG. 15B shows a plot of $H_2O_2$ concentration (left bars at each flow rate ratio) vs. ratio of flow rates of the organic stream and water stream for the steady-state configuration for the water stream (2000 mL), with an electrical potential of 2.3 V applied. FIG. 15B also shows a plot of $H_2O_2$ concentration (right bars at each flow rate ratio) vs. ratio of flow rates of the organic stream and water stream for the same experiment. The results shown in FIG. 15B suggest that it is possible to vary the concentration of $H_2O_2$ produced in the water stream by simply adjusting the flow rates of the water stream and the organic stream accordingly.

Figure 16A:
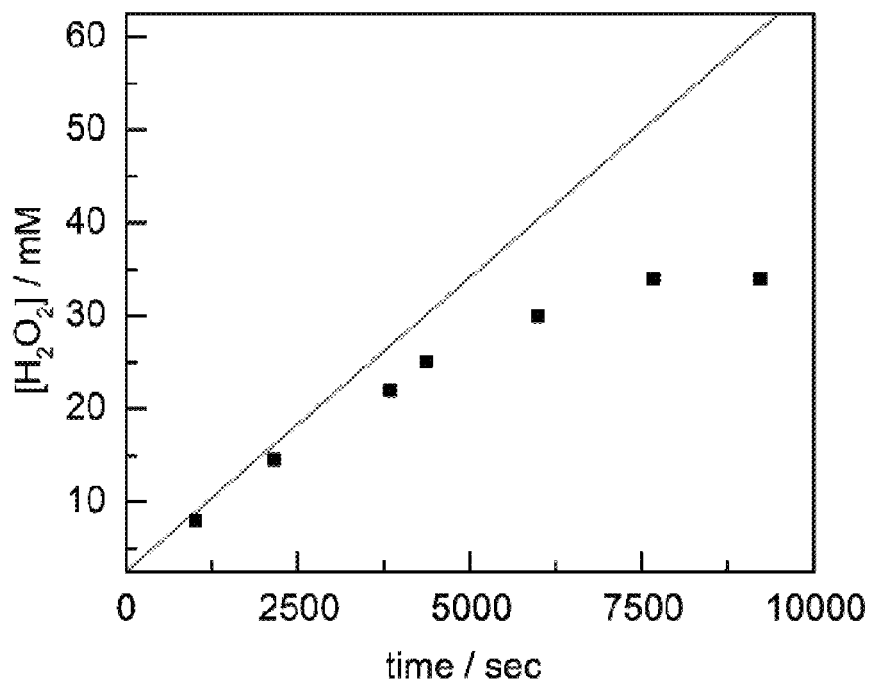
FIG. 16A shows a plot overlaying the concentration of hydrogen peroxide produced in an electrochemical flow system as a function of time, according to certain embodiments.
Figure 16B:
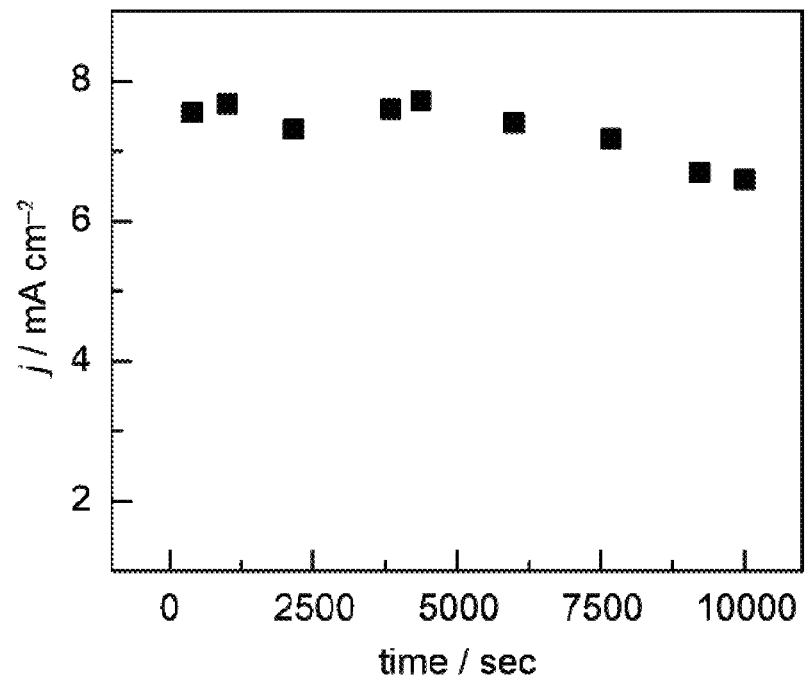
FIG. 16B shows a plot of current density in an electrochemical flow system as a function of time, according to certain embodiments.

FIG. 16A shows a plot of $H_2O_2$ concentration (black squares) vs. time using a looped configuration for the water stream (150 mL), with an electrical potential of 2.25 V (vs. RHE) applied. The solid line in FIG. 16A is a guide to the eye showing approximate steady state current. FIG. 16B shows the current density vs. time for the same experiment, showing relatively constant quinone re-reduction.

EXAMPLE 3

This non-limiting example describes one embodiment of a system for continuously producing hydrogen peroxide in water using an electrochemical flow process involving the flowing of a sequence of slugs of fluid through an electrochemical cell comprising an immobilized redox mediator.

Figure 17A:
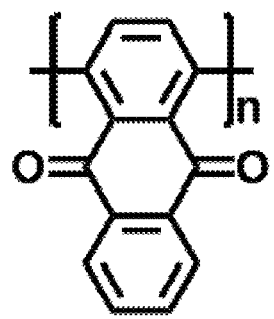
FIG. 17A shows a chemical structure of an exemplary polymer that can be used as a redox mediator, according to certain embodiments.
Figure 17B:
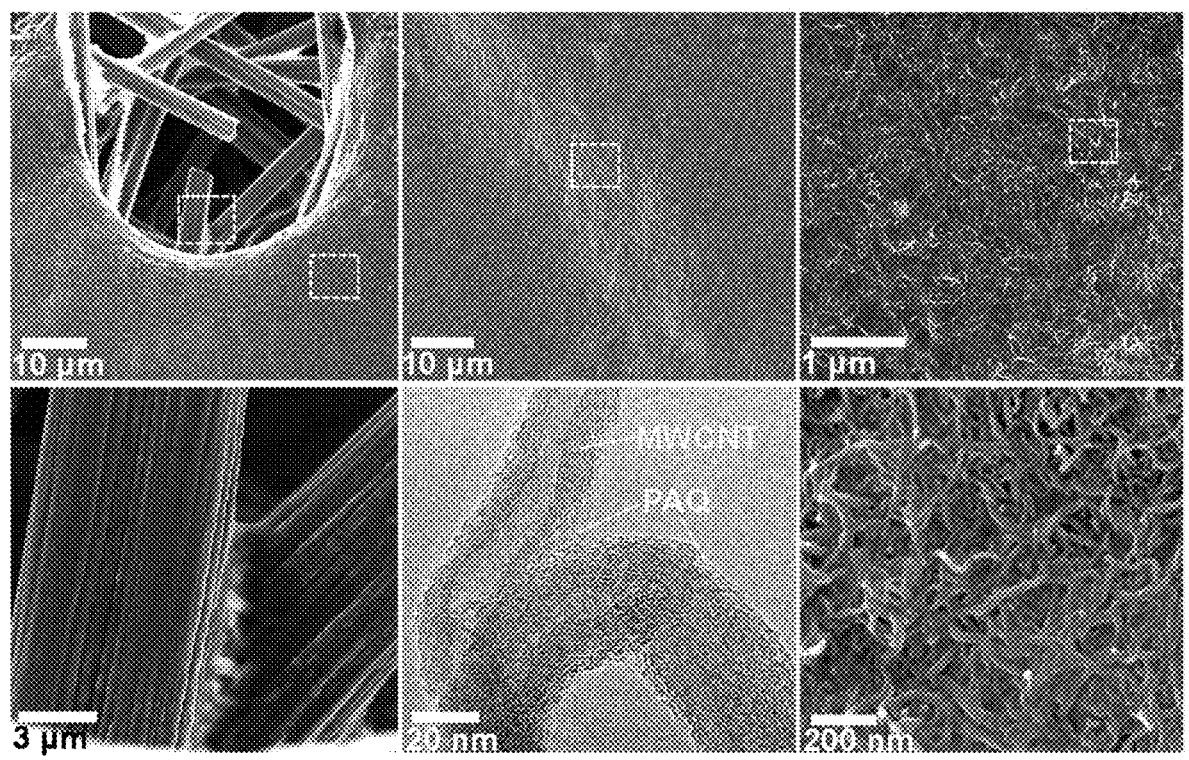
FIG. 17B shows scanning electron microscopy (SEM) images of a coating on an electrode comprising a redox mediator, according to certain embodiments.

An electrochemical cell containing two electrodes, separated in different compartments (i.e., half cells) by a bipolar membrane was used as part of the electrochemical flow system. The cathode was fabricated by first making a polyanthraquinone-carbon nanotube composite material (PAQ-CNT). The composite material was produced by synthesizing poly(1,4-anthraquinone) (P14AQ) and mixing the P14AQ with multi-walled carbon nanotubes in N-methyl-2-pyrrolidine to form an ink. P14AQ can be synthesized according to procedures described in Yamamoto, T., & Etori, H. (1995). *Poly(anthraquinone)s Having a pi.-Conjugation System along the Main Chain. Synthesis by Organometallic Polycondensation, Redox Behavior, and Optical Properties.* Macromolecules, 28(9), 3371-3379., which is incorporated herein by reference in its entirety. Non-woven carbon fiber mat electrode substrates of thickness 150 μm (35 g/m²) were dip-coated in the ink and dried very slowly to obtain a composite that uniformly coats the substrate at ~1.2 mg/cm², thereby forming the cathode. FIG. 17A depicts the chemical structure of P14AQ, while FIG. 17B shows scanning electron microscopy (SEM) images of a cathode upon which the PAQ-CNT composite material was deposited.

Figure 19:
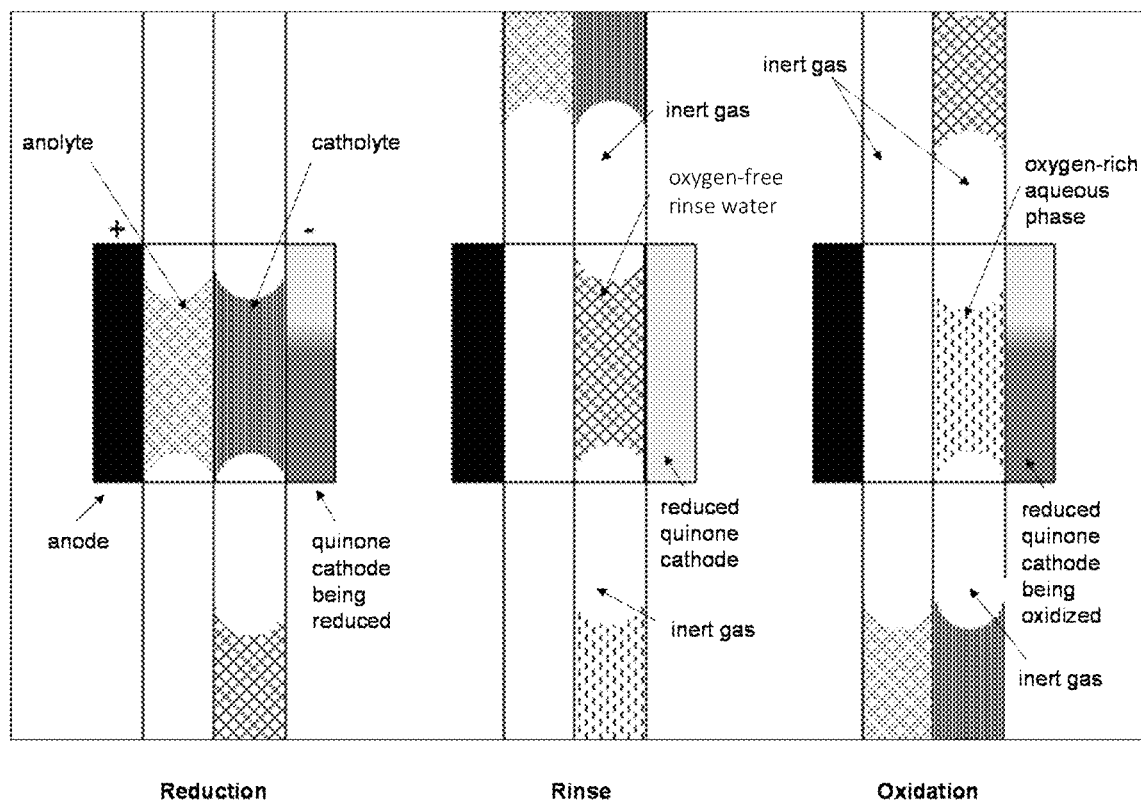
FIG. 19 shows an exemplary cross-sectional illustration of the flow of sequences of slugs through an electrochemical flow system, according to certain embodiments.

The electrochemical flow system included one main unit, the electrochemical cell, in addition to ancillary pumps, valves and tubing. FIG. 18 shows an schematic diagram of the electrochemical flow system of this example. The electrochemical cell contained the abovementioned immobilized-quinone electrode (the cathode coated with PAQ-CNT) as its cathode, a FeNi on carbon oxygen evolution catalyst electrode as its anode, and a bipolar membrane, as mentioned above. The electrochemical flow process of this example relied on alternating the flow into the half cells between slugs containing aqueous electrolyte, flush, and oxygen-rich water in the cathode half-cell, and slugs containing aqueous basic electrolyte and inert gas in the anode half-cell. FIG. 19 shows a diagram showing the operation of the electrochemical flow system of this example, including the sequence of slugs described herein, at three different time points going from left to right. The flush part of the cycle included a slug of inert gas followed by a rinse with oxygen-free water, then another slug of inert gas. A single cycle of reduction and oxidation involved the flow of a catholyte slug while applying an electrical potential difference across the cell (thereby reducing the immobilized anthraquinone moieties of the P14AQ polymer to their corresponding hydroquinones), followed by a flush, and then the flow of a slug containing an oxygen-rich water stream. Contact between the slug containing the oxygen-rich water stream and the cathode coated with the reduced immobilized anthraquinone-based polymer (right diagram of FIG. 19) caused the re-oxidation of the anthraquinone-immobilized electrode and the reduction of oxygen to hydrogen peroxide. This was achieved by synchronizing flow rates and switching of valves. When both half-cells were full of electrolyte—this was configured to occur at the same time for both half-cells—the electrical potential was applied and anthraquinone on the cathode was reduced, while oxygen generation occurred at the anode as a counter-reaction. Upon the full reduction of the anthraquinone electrode, the cell was disconnected, and the two half-cells were flushed of electrolyte via slugs of inert gas and oxygen-free water (rinse slug). The rinse slug was kept oxygen-free to avoid the oxidation of the anthraquinone electrode during the flush portion of the process. Next, a slug of oxygen-rich water was introduced into the cathodic half-cell while the anodic half-cell still had a flow of inert gas. The reduced immobilized-anthraquinone was now oxidized, and hydrogen peroxide was generated in the water slug. The electrolyte slugs of both half-cells were collected at the outlet and recirculated. The inert gas and the rinse water was either be vented/dumped or recirculated. The slugs of aqueous solution of hydrogen peroxide were collected.

Figure 20:
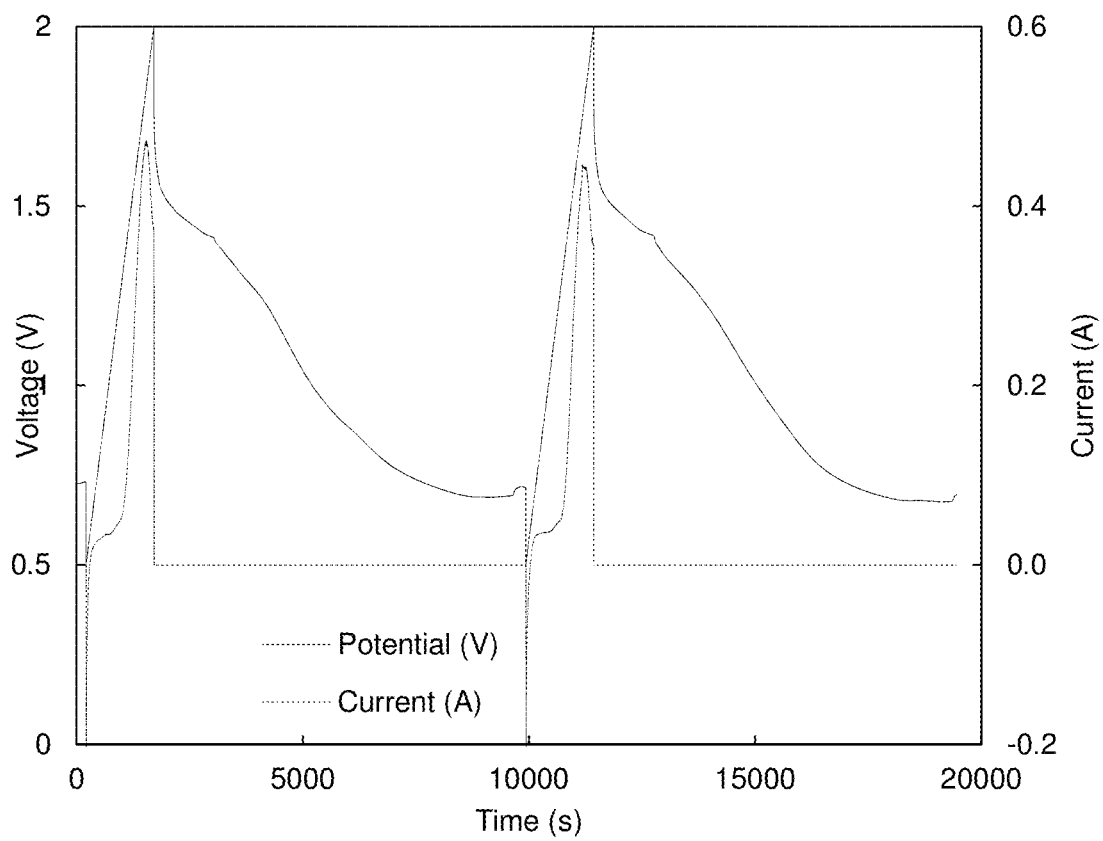
FIG. 20 shows a plot of voltage and current versus time during two cycles of an exemplary electrochemical flow system, according to certain embodiments.

The assembled system was tested for two cycles of reduction and oxidation. FIG. 20 is a plot showing the variation of potential and current vs. time during the two cycles. The reduction was achieved by a linear voltage sweep across the cell. This showed a Faradaic current response. For the remainder of the cycle, the open circuit potential of the cell was monitored. During the flush step, the only change observed was due to the double layer relaxation, after which the potential remained constant until oxygen-rich water was introduced into the cathodic half-cell. During this step, the change in the potential followed a Nernstian profile as the concentration of reduced and oxidized anthraquinone moieties varied with time as a result of the oxidation caused by the oxygen in the aqueous slug. The rate of the re-oxidation was dependent on the concentration of oxygen in water and the flow rate of the oxygen-rich aqueous phase. The concentration of hydrogen peroxide in the product stream (i.e., the oxygen-rich aqueous slug after traveling through the cathode half-cell), however, was dependent on the concentration of the dissolved oxygen, which at ambient conditions was 1.0-1.5 mM. Due to the solubility limits of oxygen in water, the concentration in this stream could not exceed ~50 ppm in a single pass. This could, in principle, be overcome by recycling the aqueous stream multiple time to build up the concentration of peroxide, with the concentration of hydrogen peroxide increasing by ~50 ppm with each pass.

In this test, single pass oxidation resulted in outlet concentrations of hydrogen peroxide of 20-30 ppm in the product stream, and a faradaic efficiency for the production of hydrogen peroxide of ~60%. The concentration of hydrogen peroxide was measured using the same procedures described above in Example 2.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the phrase "at least a portion" should be understood to mean at least some or all, and, in some embodiments, at least 10%, at least 25%, at least 50%, at least 75%, at least 90%, at least 95%, or at least 99%.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for producing a chemical product, comprising:
    applying, in an electrochemical cell, an electrical potential to a first electrode in contact with solution from a first fluid stream, the solution comprising a redox mediator, such that an active form of the redox mediator is generated;
    contacting the solution from the first fluid stream with solution from a second fluid stream, the solution from the first fluid stream being essentially immiscible with the solution from the second fluid stream, wherein during the step of contacting the solution from the first fluid stream with the solution from the second fluid stream, at least a portion of the active form of the redox mediator is transferred from the solution from the first fluid stream to the solution from the second fluid stream; and
    contacting the solution from the second fluid stream comprising the at least a portion of the active form of the redox mediator with solution from a third fluid stream after the at least a portion of the active form of the redox mediator is transferred to the solution from the second fluid stream from the solution from the first fluid stream, such that the active form of the redox mediator reacts with a reactant to produce the chemical product.

2. The method of claim 1, comprising transporting the first fluid stream to a first module fluidically connected to the electrochemical cell such that the step of contacting the solution from the first fluid stream with the solution from the second fluid stream occurs in the first module.

3. The method of claim 1, wherein the third fluid stream comprises the reactant.

4. The method of claim 1, wherein the solution from the second fluid stream is essentially immiscible with the solution from the third fluid stream.

5. The method of claim 2, comprising transporting the second fluid stream from the first module to a second module fluidically connected to the first module such that the step of contacting the solution from the second fluid stream with the solution from the third fluid stream occurs in the second module.

6. The method of claim 1, wherein the chemical product produced is hydrogen peroxide and the reactant is oxygen gas.

7. The method of claim 1, wherein the partition equilibrium of the active form of the redox mediator between the solution from the first fluid stream and the solution from the second fluid stream and/or the partition equilibrium of an inactive form of the redox mediator between the solution from the first fluid stream and the solution from the second fluid stream varies with the concentration of a phase transfer catalyst in the solution from the second fluid stream.

8. The method of claim 1, wherein the redox mediator comprises an optionally-substituted quinone, and the active form of the redox mediator comprises the corresponding hydroquinone of the optionally-substituted quinone.

9. The method of claim 8, wherein the optionally-substituted quinone and the corresponding hydroquinone of the optionally-substituted quinone have the structures of formula (1A) and formula (1B), respectively:

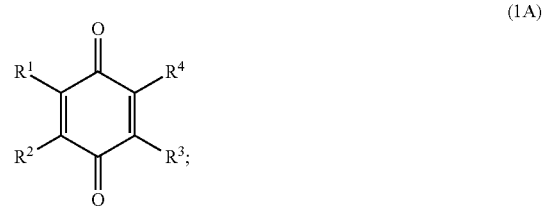

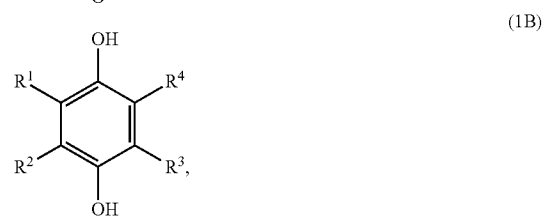

wherein groups $R^1$, $R^2$, $R^3$, and/or $R^4$ can the same or different and are halo, hydroxyl, carboxylate/carboxylic acid, sulfonate/sulfonic acid, alkylsulfonate/alkylsulfonic acid, phosphonate/phosphonic acid, alkylphosphonate/alkylphosphonic acid, amino, quaternary ammonium, alkyl, heteroalkyl, alkoxy, glycoxy, polyalkyleneglycoxy, imino, polyimino, alkenyl, alkynyl, aryl, heteroaryl, heterocyclyl, nitro, nitrile, thiyl, and/or carbonyl groups, any of which is optionally substituted, or, any two adjacent groups of $R^1$-$R^4$ can be joined together to form an optionally-substituted ring.

10. The method of claim 1, wherein the redox mediator comprises an optionally-substituted anthraquinone, and the active form of the redox mediator comprises the corresponding hydroquinone of the optionally-substituted anthraquinone.

11. The method of claim 10, wherein the optionally-substituted anthraquinone comprises one or more sulfonate groups, carboxylate groups, and/or phosphonate groups.

12. The method of claim 1, wherein the electrochemical cell comprises a first electrode compartment and a second electrode compartment, the first electrode compartment comprising the first electrode, and the second electrode compartment comprising a second electrode.

13. The method of claim 12, wherein the first electrode compartment and the second electrode compartment are separated by a bipolar membrane.

14. The method of claim 1, comprising transporting solution from the first fluid stream that has already contacted solution from the second fluid stream back into the electrochemical cell.

15. The method of claim 12, comprising performing the oxygen evolution reaction in the second electrode compartment.

16. The method of claim 2, wherein the first module comprises a mixer-settler or comprises a hollow tubule comprising a porous wall.

17. The method of claim 1, wherein the method is performed using a system comprising:
   the electrochemical cell, wherein the electrochemical cell comprises the first electrode, a second electrode, a first inlet, and a first outlet; and
   a first module fluidically connected to the electrochemical cell, wherein the first module comprises a first inlet, a first outlet, a second inlet, and a second outlet, and is configured to contact the solution from the first fluid stream with the solution from the second fluid stream, such that the active form of a redox mediator is transferred from the first fluid stream to the second fluid stream.

18. The method of claim 1, wherein the method is performed using a system comprising:
   the electrochemical cell, wherein the electrochemical cell comprises the first electrode, a second electrode, a first inlet, and a first outlet; and
   a first module, wherein the first module comprises a first inlet, a first outlet, a second inlet, and a second outlet, wherein the first outlet of the electrochemical cell is fluidically connected to the first inlet of the first module, and wherein the first module comprises a mixer-settler and/or comprises a hollow tubule comprising a porous wall.

19. A method for producing a chemical product, comprising:
   applying, in an electrochemical cell, an electrical potential to a first electrode in contact with solution from a first fluid stream, the solution comprising a redox mediator, such that an active form of the redox mediator is generated; and
   contacting the solution from the first fluid stream with solution from a second fluid stream, the solution from the first fluid stream being essentially immiscible with the solution from the second fluid stream, such that the active form of the redox mediator reacts with a reactant to produce the chemical product,
   wherein the partition equilibrium of the active form of the redox mediator between the solution from the first fluid stream and the solution from the second fluid stream and/or the partition equilibrium of an inactive form of the redox mediator between the solution from the first fluid stream and the solution from the second fluid stream varies with the concentration of a phase transfer catalyst in the solution from the second fluid stream.

20. The method of claim 19, wherein the chemical product produced is hydrogen peroxide and the reactant is oxygen gas.

* * * * *